US007976383B2

(12) United States Patent
Fujimoto et al.

(10) Patent No.: US 7,976,383 B2
(45) Date of Patent: Jul. 12, 2011

(54) GAMING MACHINE AND CONTROL METHOD THAT ACCUMULATIVELY ADDS A FRACTIONAL VALUE

(75) Inventors: Jun Fujimoto, Tokyo (JP); Yukinori Inamura, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 892 days.

(21) Appl. No.: 11/929,389

(22) Filed: Oct. 30, 2007

(65) Prior Publication Data

US 2008/0254857 A1 Oct. 16, 2008

Related U.S. Application Data

(60) Provisional application No. 60/907,669, filed on Apr. 13, 2007.

(51) Int. Cl.
*A63F 13/00* (2006.01)

(52) U.S. Cl. ................ 463/25; 463/16; 463/17; 463/18; 463/19; 463/20; 463/23

(58) Field of Classification Search .............. 463/16–20, 463/23, 25
See application file for complete search history.

(56) References Cited

U.S. PATENT DOCUMENTS

| | | | |
|---|---|---|---|
| 4,283,709 | A | 8/1981 | Lucero et al. |
| 4,624,459 | A | 11/1986 | Kaufman |
| 4,669,731 | A | 6/1987 | Clarke |
| 4,837,728 | A | 6/1989 | Barrie et al. |
| 4,964,638 | A | 10/1990 | Ishida |
| 5,178,390 | A | 1/1993 | Okada |
| 5,280,909 | A | 1/1994 | Tracy |
| 5,564,700 | A | 10/1996 | Celona |
| 5,611,730 | A | 3/1997 | Weiss |
| 5,639,088 | A | 6/1997 | Schneider et al. |
| 5,695,402 | A | 12/1997 | Stupak |
| 5,702,303 | A | 12/1997 | Takemoto et al. |
| 5,770,533 | A | 6/1998 | Franchi |
| 5,820,459 | A | 10/1998 | Acres et al. |
| 5,836,817 | A | 11/1998 | Acres et al. |
| 5,890,963 | A | 4/1999 | Yen |
| 5,910,048 | A | 6/1999 | Feinberg |
| 6,001,016 | A | 12/1999 | Walker et al. |
| 6,003,013 | A | 12/1999 | Boushy et al. |
| 6,089,980 | A | 7/2000 | Gauselmann |
| 6,224,482 | B1 | 5/2001 | Bennett |
| 6,234,896 | B1 | 5/2001 | Walker et al. |
| 6,244,957 | B1 | 6/2001 | Walker et al. |
| 6,254,483 | B1 | 7/2001 | Acres |
| 6,257,981 | B1 | 7/2001 | Acres et al. |

(Continued)

FOREIGN PATENT DOCUMENTS

| | | | |
|---|---|---|---|
| DE | 3242890 | A1 | 5/1984 |

(Continued)

*Primary Examiner* — Dmitry Suhol
*Assistant Examiner* — David Duffy
(74) *Attorney, Agent, or Firm* — NDQ&M Watchstone LLP

(57) ABSTRACT

A gaming machine switchable between an insurance mode and a non-insurance mode and which activates insurance compensation irrespective of a result of a game when a predetermined condition is established and a playing method thereof are disclosed. In accordance therewith, when a bet value or a payout value to be paid out includes a value less than one credit, that value is accumulatively stored as a fractional value, and the mode is switched from an insurance mode to a non-insurance mode when the accumulatively added fractional values reach a predetermined value or the number of unit games in which the fractional value is accumulatively added reaches a predetermined number.

5 Claims, 38 Drawing Sheets

U.S. PATENT DOCUMENTS

| | | | | |
|---|---|---|---|---|
| 6,270,409 | B1 | 8/2001 | Shuster | |
| 6,273,820 | B1 | 8/2001 | Haste, III | |
| 6,695,697 | B1 | 2/2004 | Okada | |
| 6,932,704 | B2 | 8/2005 | Walker et al. | |
| 6,932,707 | B2 | 8/2005 | Duhamel | |
| 2003/0069068 | A1 | 4/2003 | Kaminkow | |
| 2003/0069073 | A1 | 4/2003 | Okada | |
| 2003/0224852 | A1 * | 12/2003 | Walker et al. | 463/20 |
| 2003/0228901 | A1 * | 12/2003 | Walker et al. | 463/25 |
| 2004/0235551 | A1 * | 11/2004 | Walker et al. | 463/16 |
| 2006/0287045 | A1 * | 12/2006 | Walker et al. | 463/16 |
| 2007/0004505 | A1 * | 1/2007 | Walker et al. | 463/26 |
| 2008/0254864 | A1 * | 10/2008 | Fujimoto et al. | 463/25 |
| 2008/0254867 | A1 * | 10/2008 | Fujimoto et al. | 463/27 |
| 2008/0254868 | A1 * | 10/2008 | Fujimoto et al. | 463/27 |

FOREIGN PATENT DOCUMENTS

| | | | |
|---|---|---|---|
| DE | 3712841 | A1 | 11/1988 |
| DE | 4137010 | A1 | 8/1992 |
| DE | 10049444 | A1 | 11/2001 |
| EP | 0 631 798 | A1 | 1/1995 |
| EP | 0 840 264 | A1 | 5/1998 |
| EP | 1 192 975 | A1 | 4/2002 |
| EP | 1 302 914 | A2 | 4/2003 |
| EP | 1 351 180 | A2 | 10/2003 |
| EP | 1 477 947 | A2 | 11/2004 |
| EP | 1 544 811 | A2 | 6/2005 |
| GB | 2 326 830 | A | 1/1999 |
| JP | 2719450 | | 11/1997 |
| JP | 2005-192645 | A | 7/2005 |
| WO | WO03/083795 | A1 | 10/2003 |
| WO | WO2004/095383 | A1 | 11/2004 |

* cited by examiner

Fig. 3

| | PAY TABLE | | | Payout rate |
|---|---|---|---|---|
| *1* | *SMILE* | *SMILE* | *SMILE* | *500* |
| *2* | *HEART* | *HEART* | *HEART* | *300* |
| 3 | SUN | SUN | SUN | 24 |
| 4 | BAR | BAR | BAR | 15 |
| 5 | MOON | MOON | MOON | 12 |
| 6 | STAR | STAR | STAR | 8 |
| 7 | CROWN | CROWN | CROWN | 6 |
| 8 | JEWEL | JEWEL | JEWEL | 4 |
| 9 | RIBBON | RIBBON | RIBBON | 2 |
| 10 | GIFT BONUS | | | 44.138 |

Fig. 25

| Code No. | Index | Number of steps (※) |
|---|---|---|
| 00 | 1 | 0 |
| 01 | | 18 |
| 02 | | 36 |
| 03 | | 54 |
| 04 | | 72 |
| 05 | | 91 |
| 06 | | 109 |
| 07 | | 127 |
| 08 | | 145 |
| 09 | | 163 |
| 10 | | 182 |
| 11 | 2 | 200 |
| 12 | | 218 |
| 13 | | 236 |
| 14 | | 254 |
| 15 | | 273 |
| 16 | | 291 |
| 17 | | 309 |
| 18 | | 327 |
| 19 | | 345 |
| 20 | | 364 |
| 21 | | 382 |

※ The number of steps regarding index 1 as basis of reference

GAMING MACHINE AND CONTROL METHOD THAT ACCUMULATIVELY ADDS A FRACTIONAL VALUE

CROSS-REFERENCE TO RELATED APPLICATIONS

This application claims benefit of priority based on U.S. Provisional Patent Application No. 60/907,669 filed on Apr. 13, 2007. The contents of this application are incorporated herein by reference in their entirety.

BACKGROUND OF THE INVENTION

1. Field of the Invention

The present invention relates to a gaming machine and a game control method thereof.

2. Discussion of the Background

Conventionally, in a facility where a gaming machine such as a slot machine is installed, a variety of game media such as coins or cash are inserted into the slot machine to play a game. Each slot machine is configured to conduct a payout according to a winning state (game result) occurring along with progression of games.

In a casino where a plurality of gaming machines are installed, a so-called "jackpot" is adopted where part of credits consumed in each gaming machine is reserved and when the reserved amount reaches a certain amount, an amount too large to be paid out according to normal winning is paid out. In such a gaming machine, in the normal case, each winning occurs with its set probability, and the player carries on a game with expectation that the winning will occur. The Jackpot winning occurs on any of the gaming machines at certain timing according to a determination different from the normal winning determination based on the probability set in each gaming machine.

Further, among conventional gaming machines, there have been gaming machines which offer a return to a player playing a game in the gaming machine, when the loss of game media reaches a certain value.

Examples of the gaming machine having a function of offering a return are described in, for example, U.S. Pat. No. 5,820,459, U.S. Pat. No. 6,695,697, US 2003/0069073-A1, EP 1192975-A, U.S. Pat. No. 6,254,483, U.S. Pat. No. 5,611,730, U.S. Pat. No. 5,639,088, U.S. Pat. No. 6,257,981, U.S. Pat. No. 6,234,896, U.S. Pat. No. 6,001,016, U.S. Pat. No. 6,273,820, U.S. Pat. No. 6,224,482, U.S. Pat. No. 4,669,731, U.S. Pat. No. 6,244,957, U.S. Pat. No. 5,910,048, U.S. Pat. No. 5,695,402, U.S. Pat. No. 6,003,013, U.S. Pat. No. 4,283,709, EP 0631798-A, DE 4137010-A1, GB 2326830-A, DE 3712841-A1, U.S. Pat. No. 4,964,638, U.S. Pat. No. 6,089,980, U.S. Pat. No. 5,280,909, U.S. Pat. No. 5,702,303, U.S. Pat. No. 6,270,409, U.S. Pat. No. 5,770,533, U.S. Pat. No. 5,836,817, U.S. Pat. No. 6,932,704, U.S. Pat. No. 6,932,707, U.S. Pat. No. 4,837,728, EP 1302914-A, U.S. Pat. No. 4,624,459, U.S. Pat. No. 5,564,700, WO 03/083795-A, DE 3242890-A1, EP 0840264-A, DE 10049444-A1, WO 04/095383-A, EP 1544811-A, U.S. Pat. No. 5,890,963, EP 1477947-A, and EP 1351180-A.

It is an object of the present invention to provide a gaming machine and a game control method which have a function of offering a return, thereby offering new entertainments.

The contents of U.S. Pat. No. 5,820,459, U.S. Pat. No. 6,695,697, US 2003/0069073-A1, EP 1192975-A, U.S. Pat. No. 6,254,483, U.S. Pat. No. 5,611,730, U.S. Pat. No. 5,639,088, U.S. Pat. No. 6,257,981, U.S. Pat. No. 6,234,896, U.S. Pat. No. 6,001,016, U.S. Pat. No. 6,273,820, U.S. Pat. No. 6,224,482, U.S. Pat. No. 4,669,731, U.S. Pat. No. 6,244,957, U.S. Pat. No. 5,910,048, U.S. Pat. No. 5,695,402, U.S. Pat. No. 6,003,013, U.S. Pat. No. 4,283,709, EP 0631798-A, DE 4137010-A1, GB 2326830-A, DE 3712841-A1, U.S. Pat. No. 4,964,638, U.S. Pat. No. 6,089,980, U.S. Pat. No. 5,280,909, U.S. Pat. No. 5,702,303, U.S. Pat. No. 6,270,409, U.S. Pat. No. 5,770,533, U.S. Pat. No. 5,836,817, U.S. Pat. No. 6,932,704, U.S. Pat. No. 6,932,707, U.S. Pat. No. 4,837,728, EP 1302914-A, U.S. Pat. No. 4,624,459, U.S. Pat. No. 5,564,700, WO 03/083795-A, DE 3242890-A1, EP 0840264-A, DE 10049444-A1, WO 04/095383-A, EP 1544811-A, U.S. Pat. No. 5,890,963, EP 1477947-A, and EP 1351180-A are incorporated herein by reference in their entirety.

SUMMARY OF THE INVENTION

According to the present invention, there is provided a gaming machine having the following configuration.

Namely, the aforementioned gaming machine includes a controller programmed to conduct the following processing of: (A) determining, when game media in number corresponding to a natural-number multiple of a predetermined minimum BET unit are BET on a plurality of BET objects of which game results are determined independently of each other, a value of BETTING on each of the BET objects based on the amount of game media BET and the number of the BET objects, and the game results of the respective BET objects, determining an amount of a payout for each of the BET objects on the basis of the value of BETTING and the game result thereof, and determining an amount of an expected payout for a single unit game by summing up the amounts of the payouts; (B) determining a fractional value obtained by division of the amount of the expected payout for the single unit game determined in the processing (A) by the minimum BET unit; (C) paying out, to a player, an amount determined by subtraction of the fractional value determined in the processing (B) from the amount of the expected payout for the single unit game determined in the processing (A), as an amount of a payout for the single unit game; (D) accumulatively adding the fractional value determined in the processing (B); (E) shifting a mode to an insurance mode from a non-insurance mode, on condition that the fractional value accumulatively added in the processing (D) or the number of unit games in which the fractional value is accumulatively added in the processing (D) has reached a predetermined value; and (F) executing a bonus game which is relatively advantageous for the player, when a predetermined trigger condition is established in the insurance mode.

Further, preferably, the gaming machine according to the present invention has the following configuration.

The controller is further programmed to conduct processing of (G) counting, in said insurance mode, the number of unit games executed after shifting the mode to the insurance mode. Further, the processing (F) is processing for executing the bonus game, when the number of unit games counted in said processing (G) reaches a specific number.

In addition, preferably, the gaming machine according to the present invention has the following configuration.

The controller is further programmed to conduct processing of (G) counting, in the insurance mode, the number of unit games played with BETs by game media in number equal to a maximum number of BETs, after shifting the mode to the insurance mode. Further, the processing (F) is processing for executing the bonus game, when the number of unit games counted in the processing (G) reaches the specific number.

Further, preferably, the gaming machine according to the present invention has the following configuration.

The controller is further programmed to conduct processing of paying out, to the player, game media in number corresponding to the fractional value accumulatively added in said processing (D), during the bonus game.

Further, according to the present invention, there is provided a game control method as follows.

Namely, the aforementioned game control method includes a controller programmed to conduct the following steps of: (A) determining, when game media in number corresponding to a natural-number multiple of a predetermined minimum BET unit are BET on a plurality of BET objects of which game results are determined independently of each other, a value of BETTING on each of the BET objects based on the amount of game media BET and the number of the BET objects, and the game results of the respective BET objects, determining an amount of a payout for each of the BET objects on the basis of the value of BETTING and the game result thereof, and determining an amount of an expected payout for a single unit game by summing up the amounts of the payouts; (B) determining a fractional value obtained by division of the amount of the expected payout for the single unit game determined in the step (A) by the minimum BET unit; (C) paying out, to a player, an amount determined by subtraction of the fractional value determined in the step (B) from the amount of the expected payout for the single unit game determined in the step (A), as an amount of a payout for the single unit game; (D) accumulatively adding the fractional value determined in the step (B); (E) shifting a mode to an insurance mode from a non-insurance mode, on condition that the fractional value accumulatively added in the step (D) or the number of unit games in which the fractional value is accumulatively added in the step (D) has reached a predetermined value; and (F) executing a bonus game which is relatively advantageous for the player, when a predetermined trigger condition is established in the insurance mode.

According to the present invention, there is provided a gaming machine having the following configuration.

Namely, the aforementioned gaming machine includes a controller programmed to conduct the following processing of: (A) determining, when game media are BET on a plurality of BET objects of which game results are determined independently of each other, a value of BETTING on each of the BET objects; (B) determining a total value of BETTING on a single unit game by summing up the values of BETTING on the respective BET objects; (C) determining a part of the total value of BETTING determined in the processing (B) as a BET fractional value, the part being equal to or less than a predetermined digit place of the total value of BETTING; (D) accumulatively adding the BET fractional value determined in the processing (C); (E) counting the number of the unit game which have been executed; and (F) executing a bonus game which is relatively advantageous for the player, when the number of unit games counted in the processing (E) reaches a specific number.

BRIEF DESCRIPTIONS OF DRAWINGS

FIG. 3 is a view for explaining a payout table in the present embodiment.

FIG. 25 is a schematic view showing a correspondence table of the number of steps and code No.

DESCRIPTION OF THE EMBODIMENTS

Figure 1:
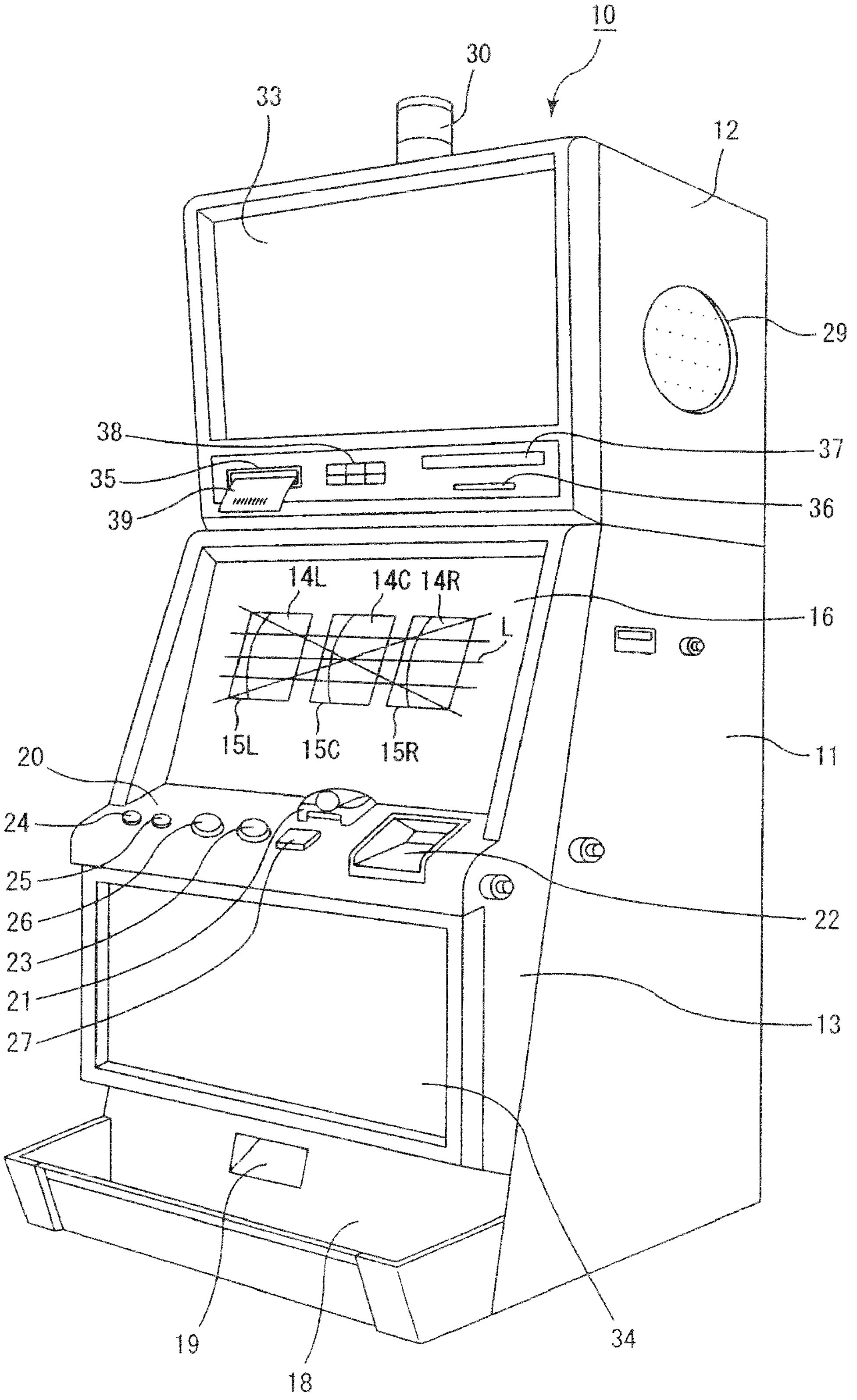
FIG. 1 is a perspective view schematically showing a slot machine according to one embodiment of the present invention.

FIG. 1 is a perspective view schematically showing a slot machine according to one embodiment of the present invention.

In a slot machine 10, a coin, a bill, or electronic valuable information corresponding to those is used as a game medium. However, in the present invention, the game medium is not particularly limited. Examples of the game medium may include a medal, a token, electronic money and a ticket. It is to be noted that the ticket is not particularly limited, and examples thereof may include a ticket with a barcode as described later.

In the following description, a minimum amount of game media which can be BET in the slot machine 10 will be referred to as one credit. In the present embodiment, one credit corresponds to a single coin. One credit corresponds to the minimum BET unit according to the present invention. Further, as will be described with reference to FIG. 4, a value less than one credit corresponds to the fractional value according to the present invention. Further, the slot machine 10 is a gaming machine according to the present invention.

The slot machine 10 comprises a cabinet 11, a top box 12 installed on the upper side of the cabinet 11, and a main door 13 provided at the front face of the cabinet 11. Inside the cabinet 11, three reels 14 (14L, 14C, 14R) as a symbol display device are rotatably provided. On the peripheral face of each of the reels 14, a symbol sequence consisting of 22 figures (hereinafter also referred to as symbols) is drawn.

A lower image display panel 16 is provided at the front of the respective reels 14 on the main door 13. The lower image display panel 16 is provided with a transparent liquid crystal panel to which a variety of information concerning a game, an effect image and the like are displayed during the game.

On the lower image display panel 16, three display windows 15 (15L, 15C, 15R) are formed in which their back faces are visible, and three symbols drawn on the peripheral face of each of the reels 14 are respectively displayed via each of the display windows 15. In the lower image display panel 16, there are formed a total of five pay lines L composed of three pay lines L horizontally across the three display windows 15 and two pay lines L obliquely across the display windows 15. These pay lines L define combinations of symbols. When a combination of symbols stop-displayed along any of the pay lines L is a predetermined combination, an amount of a payout for each of the pay lines L are determined, on the basis of the combination and the value of BETTING on each pay line L. Then, on the basis of the value of BETTING on each pay line L, an amount of an expected payout and a fractional value are determined. This determination method will be described later, in more detail, with reference to FIG. 4.

Moreover, although not shown, a touch panel 69 is provided at the front face of the lower image display panel 16. The player can operate the touch panel 69 to input a variety of commands.

Below the lower image display panel 16, there are provided a control panel 20 comprised of a plurality of buttons 23 to 27 with each of which a command according to game progress is inputted by the player, a coin receiving slot 21 through which a coin is accepted into the cabinet 11, and a bill validator 22.

The control panel 20 is provided with a spin button 23, a change button 24, a CASHOUT button 25, a 1-BET button 26 and a maximum BET button 27. The spin button 23 is used for inputting a command to start rotation of the reels 14. The change button 24 is used for making a request of staff in the recreation facility for exchange. The CASHOUT button 25 is used for inputting a command to pay out credited coins to a coin tray 18.

The 1-BET button 26 is used for inputting a command to bet one coin on a game out of credited coins. The maximum BET button 27 is used for inputting a command to bet the maximum number of coins that can be bet on one game (three coins in the present embodiment) out of credited coins. In addition, the maximum number of BETs may be configured so as to be set by the operator, staff or the like of the casino.

The bill validator 22 not only discriminates a regular bill from a false bill, but also accepts the regular bill into the cabinet 11. It is to be noted that the bill validator 22 may be configured so as to be capable of reading a later-described ticket 39 with a barcode. At the lower front of the main door 13, namely below the control panel 20, there is provided a belly glass 34 on which a character or the like of the slot machine 10 is drawn.

An upper image display panel 33 is provided at the front face of the top box 12. The upper image display panel 33 is provided with a liquid crystal panel to display, for example, an effect image, an image representing introduction of contents of a game, and explanation of a rule of the game.

Also, a speaker 29 is provided on the top box 12. Under the upper image display panel 33, there are provided a ticket printer 35, a card reader 36, a data display 37, and a key pad 38. The ticket printer 35 prints on a ticket a barcode as coded data of the number of credits, a date, an identification number of the slot machine 10, and the like, and outputs the ticket as the ticket 39 with a barcode. The player can make another slot machine read the ticket 39 with a barcode to play a game thereon, or exchange the ticket 39 with a barcode with a bill or the like at a predetermined place in the recreation facility (e.g. a cashier in a casino).

The card reader 36 reads data from a smart card and writes data into the smart card. The smart card is a card owned by the player, and for example, data for identifying the player and data concerning a history of games played by the player are stored therein. Data corresponding to a coin, a bill or a credit may be stored in the smart card. Further, a magnetic stripe card may be adopted in place of the smart card. The data display 37 is comprised of a fluorescent display and the like, and displays, for example, data read by the card reader 36 or data inputted by the player via the key pad 38. The key pad 38 is used for inputting a command and data concerning issuing of a ticket, and the like.

Figure 2:
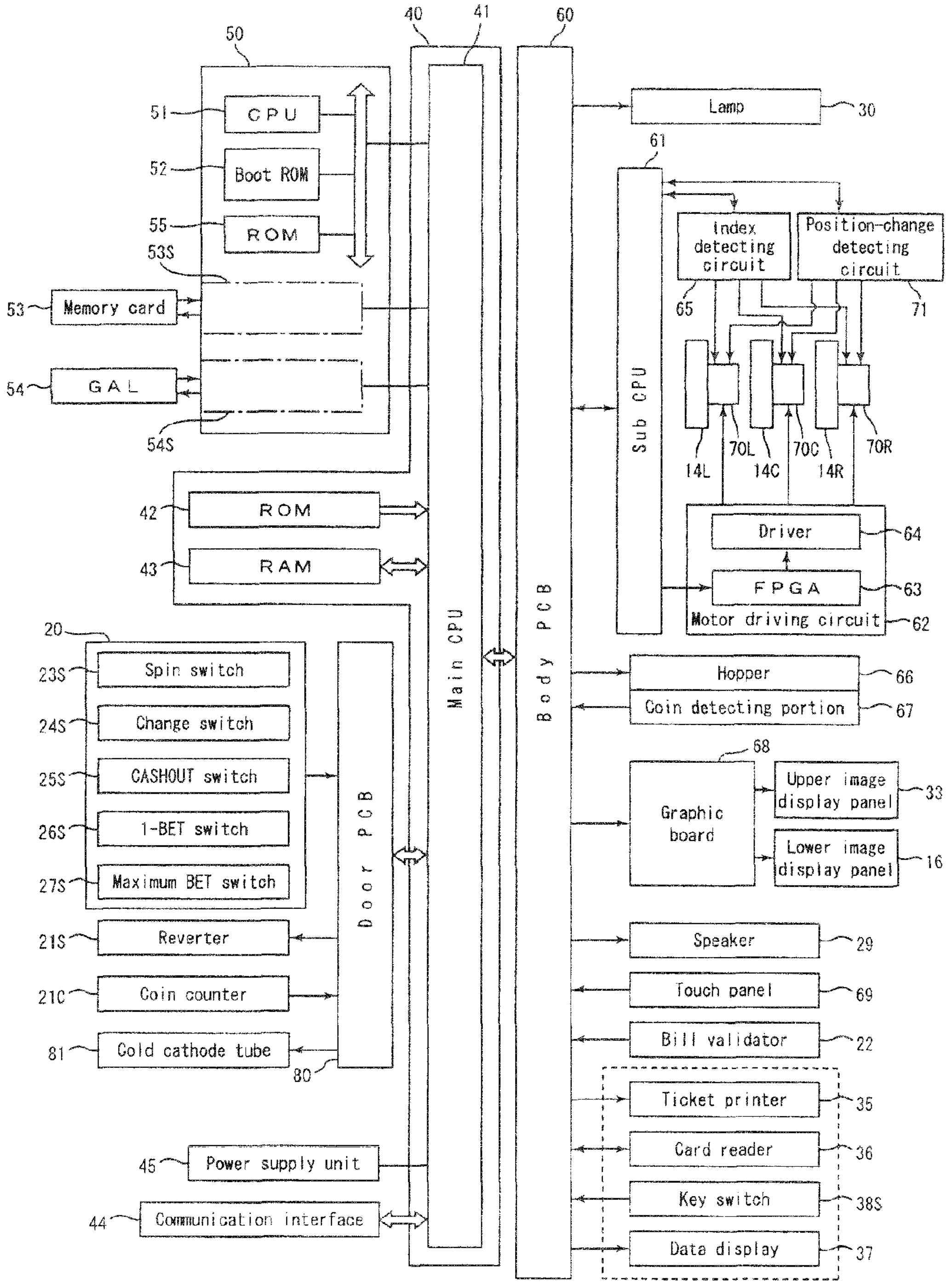
FIG. 2 is a block diagram showing the internal configuration of the slot machine shown in FIG. 1.

FIG. 2 is a block diagram showing the internal configuration of the slot machine shown in FIG. 1.

A gaming board 50 is provided with a CPU (Central Processing Unit) 51, a ROM 55, and a boot ROM 52 which are interconnected to one another by an internal bus, a card slot 53S corresponding to a memory card 53, and an IC socket 54S corresponding to a GAL (Generic Array Logic) 54.

The memory card 53 is comprised of a nonvolatile memory such as CompactFlash (registered trade mark), and stores a game program and a game system program. The game program includes a to-be-stopped symbol determination program. The to-be-stopped symbol determination program is a program for determining a symbol (code No. corresponding to the symbol) on each of the reels 14 to be stop-displayed along the pay line L. The to-be-stopped symbol determination program includes symbol weighing data respectively corresponding to a plurality of types of payout ratios (e.g. 80%, 84%, 88%). The symbol weighing data is data showing the corresponding relation between code No. of each symbol (see FIG. 25) and one or a plurality of random numbers belonging to a predetermined numerical range (0 to 255), for each of the three reels 14. The payout ratio is set based on payout ratio setting data which is outputted from a GAL 54, and a symbol to be stop-displayed is determined based on the symbol weighing data corresponding to the payout ratio.

Further, the card slot 53S is configured so as to allow the memory card 53 to be inserted thereinto or ejected therefrom, and is connected to the mother board 40 by an IDE bus.

Therefore, the memory card 53 can be ejected from the card slot 53S, and then another game program and another game system program are written into the memory card 53, and the memory card 53 can be inserted into the card slot 53S, to change the type and contents of a game played on the slot machine 10. Further, the memory card 53 storing one game program and one game system program can be exchanged with the memory card 53 storing another game program and another game system program, to change the type and contents of a game played on the slot machine 10.

The game program includes a program according to progression of the game. Further, the game program includes image data and sound data to be outputted during the game, and image data and sound data for notifying that the mode has been shifted to the insurance mode, and the like.

The GAL 54 is a type of a PLD having an OR fixed type array structure. The GAL 54 is provided with a plurality of input ports and output ports. When predetermined data is inputted into the input port, the GAL 54 outputs, from the output port, data corresponding to the inputted data. The data outputted from the output port is the above-mentioned payout ratio setting data.

Further, the IC socket 54S is configured such that the GAL 54 can be mounted thereonto and removed therefrom, and the IC socket 54S is connected to the mother board 40 through the PCI bus. Therefore, the GAL 54 can be removed from the IC socket 54S, and then a program to be stored into the GAL 54 is rewritten, and the GAL 54 is then mounted onto the IC socket 54S, to change the payout ratio setting data outputted from the GAL 54. Further, the GAL 54 can be exchanged with another GAL 54 to change the payout ratio setting data.

The CPU 51, the ROM 55 and the boot ROM 52 interconnected to one another by an internal bus are connected to the mother board 40 through the PCI bus. The PCI bus not only conducts signal transmission between the mother board 40 and the gaming board 50, but also supplies power from the mother board 40 to the gaming board 50. In the ROM 55, country identification information and an authentication program are stored. In the boot ROM 52, an auxiliary authentication program and a program (boot code) to be used by the CPU 51 for activating the auxiliary authentication program, and the like are stored.

The authentication program is a program (falsification check program) for authenticating a game program and a game system program. The authentication program is written along a procedure (authentication procedure) for checking and proving that a game program and a game system program to be subject to authentication loading processing have not been falsified, namely authenticating the game program and the game system program. The auxiliary authentication program is a program for authenticating the above-mentioned authentication program. The auxiliary authentication program is written along a procedure (authentication procedure) for proving that an authentication program to be subject to the authentication processing has not been falsified, namely authenticating the authentication program.

The mother board 40 is configured using a commercially available general-purpose mother board (a print wiring board on which fundamental components of a personal computer are mounted), and comprises a main CPU 41, a ROM (Read Only Memory) 42, a RAM (Random Access Memory) 43, and a communication interface 44. The main CPU 41, the ROM 42 and the RAM 43 mounted on the mother board 40 constitute the controller of the present invention.

The ROM 42 is comprised of a memory device such as a flash memory, and stores a program such as a BIOS (Basic Input/Output System) executed by the main CPU 41 and permanent data. When the BIOS is executed by the main CPU 41, processing for initializing a predetermined peripheral device is conducted, concurrently with start of processing for loading the game program and the game system stored in the memory card 53 via the gaming board 50. It should be noted that, in the present invention, the ROM 42 may or may not be data rewritable one.

The RAM 43 stores data and a program to be used at the time of operation of the main CPU 41. Further, the RAM 43 is capable of storing an authentication program to be read via the gaming board 50, a game program and a game system program.

Further, the RAM 43 is provided with a storage area for an insurance mode flag. The insurance mode flag is a flag for indicating whether the mode is the insurance mode or the non-insurance mode. The storage area for the insurance mode flag is, for example, composed of a storage area of a predetermined number of bits, and the insurance mode flag is turned "ON" or "OFF," according to the stored contents of the storage area. The insurance mode flag being "ON" indicates the insurance mode, and the insurance mode flag being "OFF" indicates the non-insurance mode.

Further, the RAM 43 is provided with a storage area for data showing the number-of-games C. Furthermore, the RAM 43 is provided with a storage area for data indicative of the total sum of fractional values (the accumulative fractional value) and a storage area for data indicative of the number of games resulting in a fractional value (the accumulative number of games resulting in a fractional value). The accumulative fractional value and the accumulative number of games resulting in a fractional-value will be described later, with reference to FIG. 4.

Moreover, the RAM 43 stores data of the number of credits, the number of coin-ins and coin-outs in one game, and the like. The communication interface 44 serves to communicate with an external device such as a server of the casino, via the communication line 101.

Moreover, the mother board 40 is connected with a later-described body PCB (Printed Circuit Board) 60 and a door PCB 80 through respective USBs. Further, the mother board 40 is connected with a power supply unit 45. When power is supplied from the power supply unit 45 to the mother board 40, the main CPU 41 of the mother board 40 is activated concurrently with supply of power to the gaming board 50 via the PCI bus to activate the CPU 51.

The body PCB 60 and the door PCB 80 are connected with an equipment and a device that generate an input signal to be inputted into the main CPU 41 and an equipment and a device operations of which are controlled by a control signal outputted from the main CPU 41. The main CPU 41 executes the game program and the game system program stored in the RAM 43 based on the input signal inputted into the main CPU 41, and thereby executes the predetermined arithmetic processing, stores the result thereof into the RAM 43, or transmits a control signal to each equipment and device as processing for controlling each equipment and device.

The body PCB 60 is connected with a lamp 30, a sub CPU 61, a hopper 66, a coin detecting portion 67, a graphic board 68, a speaker 29, a touch panel 69, a bill validator 22, a ticket printer 35, a card reader 36, a key switch 38S and a data display 37. The lamp 30 is lighted in a predetermined pattern based on a control signal outputted from the main CPU 41.

The sub CPU 61 serves to control rotation and stop of the reels 14 (14L, 14C, 14R). A motor driving circuit 62 having an FPGA (Field Programmable Gate Array) 63 and a driver 64 are connected to the sub CPU 61. The FPGA 63 is an electronic circuit such as a programmable LSI, and functions as a control circuit of a stepping motor 70. The driver 64 functions as an amplification circuit of a pulse to be inputted into the stepping motors 70. The stepping motors 70 (70L, 70C, 70R) for rotating the respective reels 14 are connected to the motor driving circuit 62. The stepping motor 70 is a one-two phase excitation stepping motor.

In the present invention, the excitation method of the stepping motor is not particularly limited, and for example, a two phase excitation method, one phase excitation method or the like may be adopted. Further, a DC motor may be adopted in place of the stepping motor. In the case of adopting the DC motor, a deviation counter, a D/A converter, and a servo amplifier are sequentially connected to the sub CPU 61, and the DC motor is connected to the servo amplifier. Further, a rotational position of the DC motor is detected by a rotary encoder, and a current rotational position of the DC motor is supplied as data from the rotary encoder to the deviation counter.

Further, an index detecting circuit 65 and a position-change detecting circuit 71 are connected to the sub CPU 61. The index detecting circuit 65 detects the position (later-described index) of the reels 14 during rotation, and is further capable of detecting a loss of synchronism of the reels 14. It should be noted that the control of rotation and stoppage of reels 14 will be described later in detail using the figures.

The position-change detecting circuit 71 detects the change of the stop positions of the reel 14, after the stop of the rotation of the reels 14. For example, the position-change detecting circuit 71 detects the change of the stop positions of the reels 14, in a case such that a player forcibly changes the stop positions of reels 14 to create a combination of symbols in a winning state, even though the actual combination of symbols is not in the winning state, or in some other cases. The position-change detecting circuit 71 is configured, for example, to detect fins (not shown) mounted to the inner sides of the reels 14 at predetermined intervals so as to detect the change of the stop positions of the reels 14.

The hopper 66 is installed inside the cabinet 11, and pays out a predetermined number of coins based on the control signal outputted from the main CPU 41, from the coin payout exit 19 to the coin tray 18. The coin detecting portion 67 is provided inside the coin payout exit 19, and outputs an input signal to the main CPU 41 in the case of detecting payout of the predetermined number of coins from the coin payout exit 19.

The graphic board 68 controls image display to the upper image display panel 33 and the lower image display panel 16 based on the control signal outputted from the main CPU 41. The number of credits stored in the RAM 43 is displayed to the number-of-credits display portion 31 of the lower image display panel 16. Further, an accumulative-fractional-value display portion 360 indicates the total sum of accumulatively-added fractional values. Further, the number of payouts of coins is displayed to the number-of-payouts display portion 32 of the lower image display panel 16. Furthermore, an accumulative-number-of-games-resulting-in-fractional-value display portion 361 indicates the number of games resulting in a fractional value.

The graphic board 68 comprises a VDP (Video Display Processor) for generating image data based on the control signal outputted from the main CPU 41, a video RAM for temporarily storing image data generated by the VDP, and the like. It is to be noted that image data used in generation of the image data by the VDP is included in the game program read from the memory card 53 and stored into the RAM 43.

The bill validator 22 not only discriminates a regular bill from a false bill, but also accepts the regular bill into the cabinet 11. Upon acceptance of the regular bill, the bill validator 22 outputs an input signal to the main CPU 41 based on a face amount of the bill. The main CPU 41 stores in the RAM 43 the number of credits corresponding to the face amount of the bill transmitted with the input signal.

The ticket printer 35, based on the control signal outputted from the main CPU 41, prints on a ticket a barcode formed by encoding data such as the number of credits stored in the RAM 43, a date, and an identification number of the slot machine 10, and outputs the ticket as the ticket 39 with a barcode. The card reader 36 reads data from the smart card and transmits the read data to the main CPU 41, and writes data onto the smart card based on the control signal from the main CPU 41. The key switch 38S is provided on the key pad 38, and outputs a predetermined input signal to the main CPU 41 when the key pad 38 is operated by the player. The data display 37 displays data read by the card reader 36 and data inputted by the player via the key pad 38 based on the control signal outputted from the main CPU 41.

The door PCB 80 is connected with a control panel 20, a reverter 21S, a coin counter 21C, and a cold cathode tube 81. The control panel 20 is provided with a spin switch 23S corresponding to the spin button 23, a change switch 24S corresponding to the change button 24, a CASHOUT switch 25S corresponding to the CASHOUT button 25, a 1-BET switch 26S corresponding to the 1-BET button 26, and the maximum BET switch 27S corresponding to the maximum BET button 27. The respective switches 23S to 27S output input signals to the main CPU 41 when each of the buttons 23 to 27 corresponding thereto is operated by the player.

The coin counter 21C is provided inside the coin receiving slot 21, and discriminates a regular coin from a false coin inserted into the coin receiving slot 21 by the player. Coins other than the regular coin are discharged from the coin payout exit 19. Further, the coin counter 21C outputs an input signal to the main CPU 41 in detection of the regular coin.

The reverter 21S operates based on the control signal outputted from the main CPU 41, and distributes a coin recognized by the coin counter 21C as the regular coin into a cash box (not shown) or the hopper 66, which are disposed in the slot machine 10. Namely, when the hopper 66 is filled with coins, the regular coin is distributed into the cash box by the reverter 21S. On the other hand, when the hopper 66 is not filled with coins, the regular coin is distributed into the hopper 66. The cold cathode tube 81 functions as a back light installed on the rear face side of the lower image display panel 16 and the upper image display panel 33, and is lit up based on the control signal outputted from the main CPU 41.

FIG. 3 is a view for explaining a payout table in the present embodiment.

In the payout table, “SMILE”, “HEART”, “SUN”, “BAR”, “MOON”, “STAR”, “CROWN”, “JEWEL” and “RIBBON” indicate the types of symbols drawn on the reels 14. It is to be noted that, other than the above-mentioned symbols, a jackpot trigger, which is a symbol corresponding to “GIFT BONUS”, and other symbols are also drawn on the reels 14. In the payout table, “ANY BAR” represents the “3BAR”, “2BAR” or “1BAR”, and “ANY” represents an arbitrary symbol.

The combinations of symbols defined in the payout table indicate winning combinations, and payout rates are defined for the respective winning combinations. When a single winning combination is established along any of the pay lines L, the value of BETTING placed on this pay line L is multiplied by the payout rate for this combination to determine an amount of a payout for this pay line L.

When a combination of symbols on each of the reels 14 which are stop-displayed is the combination of "GIFT BONUS" jackpot triggers, a predetermined number of coins is paid out as a jackpot. It is to be noted that a numeric value corresponding to "GIFT BONUS" in the payout table indicates an expectation value of the number of coin-outs, and is constant regardless of the number of BETs. Therefore, a setting is made such that the probability for establishing "GIFT BONUS" is high and the number of coin-outs is small in the case of 1BET whereas the probability for establishing "GIFT BONUS" is low and the number of coin-outs is large in the case of the MAXBET. It should be noted that this probability setting is made by using symbol weighing data.

Further, four types of jackpots "GRAND", "MAJOR", "MINOR" and "MINI" are provided in decreasing order of the number of coin-outs. The larger the number of coin-outs, the lower the jackpot occurrence ratio is set, and which jackpot is to be established is determined randomly using a random number. It should be noted that the expectation value of the number of coin-outs according to each jackpot is constant.

When a game is started by pressing of the spin button 23 after pressing of a 1-BET button 26 or a maximum BET button 27, the sequence of symbols drawn on each of the reels 14 is scroll-displayed downwardly in the display windows 15 with rotation of the reels 14, and after the lapse of a predetermined period of time, the sequence of symbols drawn on each of the reels 14 is stop-displayed in the display windows 15 with the stop of rotation of the reels 14. Further, various types of winning combinations are preliminarily defined based on combinations of symbols and, when a combination of symbols corresponding to a winning combinations are stopped along any of pay lines L, an amount of a payout for each of the pay lines are determined according to the combination, and the amounts of the payouts for the respective pay lines are summed up to determine an amount of an expected payout for this game. Subsequently, an amount of a payout calculated on the basis of the amount of the expected payout is added to the credits owned by the player. When the combination of "GIFT BONUS" jackpot triggers is established, a predetermined number of coin-outs are added to the credits owned by the player.

Combinations of symbols in italic in the payout table are combinations of which the number of coin-outs to be conducted is equal to or more than 180 when established in a game played with a MAXBET.

In the game played with a MAXBET in the insurance mode, when any one of those combinations of symbols is established, the mode is shifted from the insurance mode to the non-insurance mode.

Figure 4:
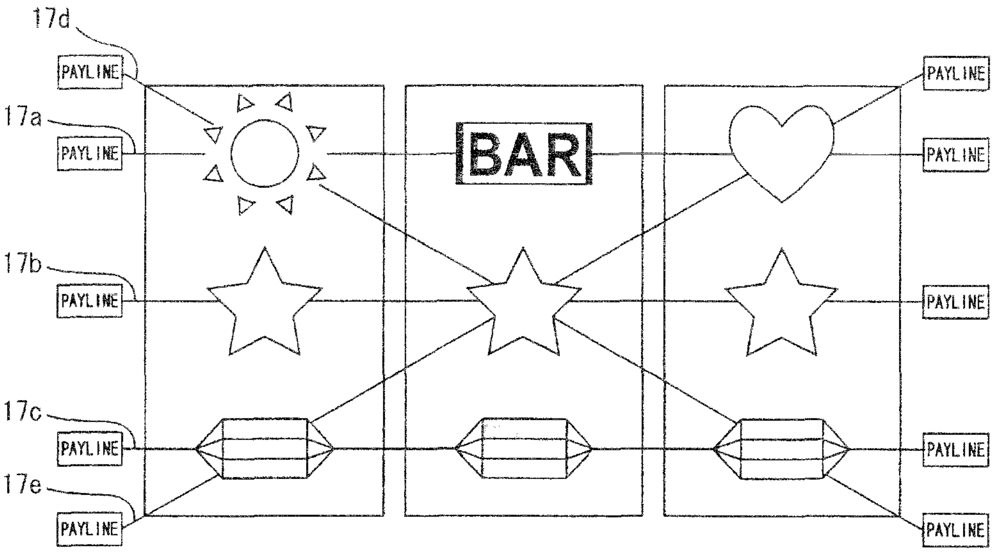
FIG. 4 is a view showing exemplary symbols being displayed through display windows.

FIG. 4 is a view illustrating exemplary symbols being displayed through the display windows.

In the present embodiment, a total of 9 symbols along 3 columns and 3 rows are displayed, through the display windows 15 (15L, 15C and 15R). Further, on the display windows 15, there are defined 3 pay lines L (pay lines L17*a*, L17*b* and L17*c*) along the respective columns. Further, there are defined two pay lines L (17*d* and 17*e*) obliquely across the display windows. Namely, in the present embodiment, there are defined a total of 5 pay lines.

Hereinafter, there will be described the fractional value according to the present invention.

As an example, there will be described a case where a MAXBET has been placed as BETs and symbols illustrated in FIG. 4 are stop-displayed.

First, when a MAXBET, namely 3 coins (3 credits), are BET on the 5 pay lines L, this MAXBET is evenly assigned to the respective 5 pay lines L. Namely, $3/5=0.6$ credits are BET on each of the pay lines L. The pay lines L correspond to BET objects according to the present invention.

When a BET is placed, symbol sequences are stop-displayed on the display windows 15, along with the rotation and the stoppage of the reels 14. In the example illustrated in FIG. 4, "STAR"-"STAR"-"STAR" is established along the pay line L17*b* and "JEWEL"-"JEWEL"-"JEWEL" is established along the pay line L17*c*. As illustrated in FIG. 3, the payout rate for "STAR"-"STAR"-"STAR" is 8, and the payout rate for "JEWEL"-"JEWEL"-"JEWEL" is 4.

In this case, the amount of the payout for each pay line L is determined by multiplying the value of BETTING on each pay line L by the preliminarily defined payout rate corresponding to the winning combination established along the pay line L.

In the example illustrated in FIG. 4, the amount of the payout for the pay line L17*b* is $0.6\times8=4.8$ credits. Further, the amount of the payout for the pay line L17*c* is $0.6\times4=2.4$ credits.

After the amounts of the payouts for the respective pay lines L are determined, these amounts of the payouts are summed up to determine the amount of the expected payout for this game. In the example illustrated in FIG. 4, the amount of the expected payout is $4.8+2.4=7.2$ credits.

The fractional value according to the present invention is the remainder determined by the division of the amount of the expected payout by the minimum BET unit. In the present embodiment, the minimum BET unit is one credit. Accordingly, the fractional value is the decimal fraction part of the amount of the expected payout. In the example illustrated in FIG. 4, the fractional value is 0.2 credits. Such fractional values determined as described above are accumulatively added along with the progression of games and are stored as an accumulative fractional value in the RAM 43. Further, in the following description, determining the fractional value not to be 0 will be referred to as "resulting in a fractional value". The number of games resulting in a fractional value is stored as an accumulative number of games resulting in a fractional value in the RAM 43.

In the present embodiment, the value of BETTING on each pay line L is a value determined by division of the total value of BETTING placed on a single game by the number of the pay lines L and therefore, the values of BETTING on all the pay lines L become equal. However, in the present invention, the method for determining the value of BETTING on each pay line L is not limited to this example. For example, it is possible to provide a configuration which allows a player to operate so as to divide arbitrarily the total value of BETTING on a single game for the respective pay lines L.

Here, insurance in the slot machine 10 is described.

As for the insurance, the slot machine 10 has two modes: the insurance mode "RESCUE PAY ON"; and the non-insurance mode "RESCUE PAY OFF".

The non-insurance mode is set immediately after the power is turned on in the slot machine 10, and the mode is then shifted to the insurance mode, when a predetermined condition (see [P02] in FIG. 5) on the aforementioned accumulative fractional value is satisfied.

In the insurance mode, the number of games played after shifting the mode to the insurance mode is counted. In the present embodiment, games to be counted are those games played with a MAXBET placed thereon.

When the number of games counted in the insurance mode reaches 1000, the game is shifted to a bonus game. However, in the event of the occurrence of a game which results in a payout of coins in number equal to or more than 180, the number of counted games is cleared, and also, the mode is shifted to the non-insurance mode from the insurance mode. In a case where the total sum of fractional values is less than 360 credits, when the number of games counted in the insurance mode reaches 1000, the game in which the number of counted game reaches 1000 is not shifted to a bonus game. In this case, the game is continued in the insurance mode and, at the timing when the total sum of fractional values reaches 360 credits, the game is shifted to a bonus game.

The condition that the number of games counted in the insurance mode reaches 1000 and also the total sum of fractional values reach 360 credits corresponds to the trigger condition according to the present invention.

In the present embodiment, games to be counted in the insurance mode are games played with a MAXBET. However, in the present invention, games to be counted are not limited to the case. For example, all games which have been actually executed may be counted.

Also, it is possible to count the number of games in which no predetermined bonuses generate, such as a free game (game which can be played without consuming game media) and a mystery bonus. As described above, in the present invention, games to be counted in the insurance mode may be games which satisfy a predetermined condition.

However, the trigger condition according to the present invention is not limited to a condition that the number of games which have satisfied the predetermined condition reaches a specific number. For example, the trigger condition according to the present invention may be a condition that the total sum of the numbers of game media which have been BET reaches the specific number. In this case, only game media which have been BET in the insurance mode may be counted or all game media which have been BET may be counted.

Further, in the present embodiment, there has been described the case where the games after the shifting the mode to the insurance mode are counted. However, in the present invention, it is possible to count both the games which have been executed in the insurance mode and the games which have been executed in the non-insurance mode. In this case, game media may be paid out, when the total sum of the number of games counted in the insurance mode and the number of games counted in the non-insurance mode reaches the specific number.

Further, in the present embodiment, in the event of the occurrence of a game which results in a payout of coins in number equal to or more than 180, the number of counted games is cleared, and also, the mode is shifted to the non-insurance mode from the insurance mode. However, in the present invention, even in the event of the occurrence of a game which results in a payout of coins in number equal to or more than a predetermined number, it is not necessarily necessary that the number of counted games is cleared and the mode is shifted to the non-insurance mode from the insurance mode. Further, in the event of the occurrence of a game which results in a payout of coins in number equal to or more than the predetermined number, during games in the insurance mode, the mode may be shifted to the non-insurance mode from the insurance mode, without clearing the number of counted games.

Further, as described above, in the case of employing the configuration which counts the number of games which generate no predetermined bonuses, during games in the insurance mode, in the event of the occurrence of a predetermined bonus before the number of games reaches the predetermined number, the mode may be shifted to the non-insurance mode from the insurance mode and also the number of counted games may be cleared (set to 0) or the mode may be shifted to the non-insurance mode from the insurance mode while the number of counted games is maintained.

Further, in the present embodiment, when the number of counted games reaches 1000, the game is shifted to bonus games. However, in the present invention, the predetermined number is not limited to the case. Further, the predetermined number may be determined at random using random numbers at every time of shifting the mode to the insurance mode, for example.

As described above, in the present invention, the trigger condition may be a condition that the number of games which have been played with a MAXBET, the number of games which results in no predetermined bonus (for example, bonus game or free game) or the number of games which results in no establishment of a specific winning combination (for example, winning combination of which coin-outs is equal to or more than 180) reaches a predetermined number or the condition that the total sum of the numbers of game media BET in games reaches a predetermined number. However, in the present invention, these conditions may be employed as the condition required for shifting the mode to the insurance mode from the non-insurance mode, not as the trigger condition. For example, it is possible to start processing for accumulatively adding the fractional value relating to the condition required for shifting the mode to the insurance mode from the non-insurance mode, when the aforementioned conditions are satisfied. Also, when the aforementioned conditions are satisfied, the player is allowed to shift the mode to the insurance mode from the non-insurance mode by inserting a predetermined number of coins, even when the accumulatively-added fractional values or the number of games, in which the fractional values have been accumulatively added, have not reached the predetermined numbers.

Further, in the present embodiment, in a case where the total sum of fractional values is less than 360 credits when the number of games counted in the insurance mode reaches 1000, the game is not shifted to bonus games until the total sum of fractional values reaches 360 credits. Namely, the condition on the number of counted games and the condition on the total sum of fractional values are both employed as the trigger condition. However, in the present invention, it is not necessarily necessary to employ the condition on the total sum of fractional values, as the trigger condition according to the present invention.

In bonus games executed in the present embodiment, the payout rates defined for respective combinations are twice the payout rates illustrated in FIG. 3. For example, the payout rate for "HEART"-"HEART"-"HEART" is 600. Further, the number of bonus games to be executed equals to, at the maximum, the number of games which have resulted in a fractional value (including games in the insurance mode and games in the non-insurance mode). However, in the event of the occurrence of a game which results in a payout of coins in number equal to or more than 360 during a period of bonus games, the bonus games end in the current game. Further, in a case where bonus games in number equal to the number of games which have resulted in fractional values are executed, when the total number of coins paid out during bonus games is less than 360, coins in number equal to the deficient number to be 360 are paid out, at the end of the bonus games. Namely, at least 360 coins are paid out in bonus games.

Next, the flow [P01] to [P19] of a game played on the slot machine 10 is described by using FIGS. 5 to 13.

FIGS. 5 to 13 are views showing images displayed to the upper image display panel 33 and the lower image display panel 16 provided in the slot machine 10.

In the figures, a numeral 15 (15L, 15C, 15R) denotes a display window. A numeral 31 denotes a number-of-credits display portion. A numeral 32 denotes a number-of-payouts display portion. A symbol L denotes a winning line. A numeral 360 denotes the accumulative-fractional-value display section. A numeral 361 denotes an accumulative-number-of-games-resulting-in-fractional-value display portion.

[P01]

Figure 5A:
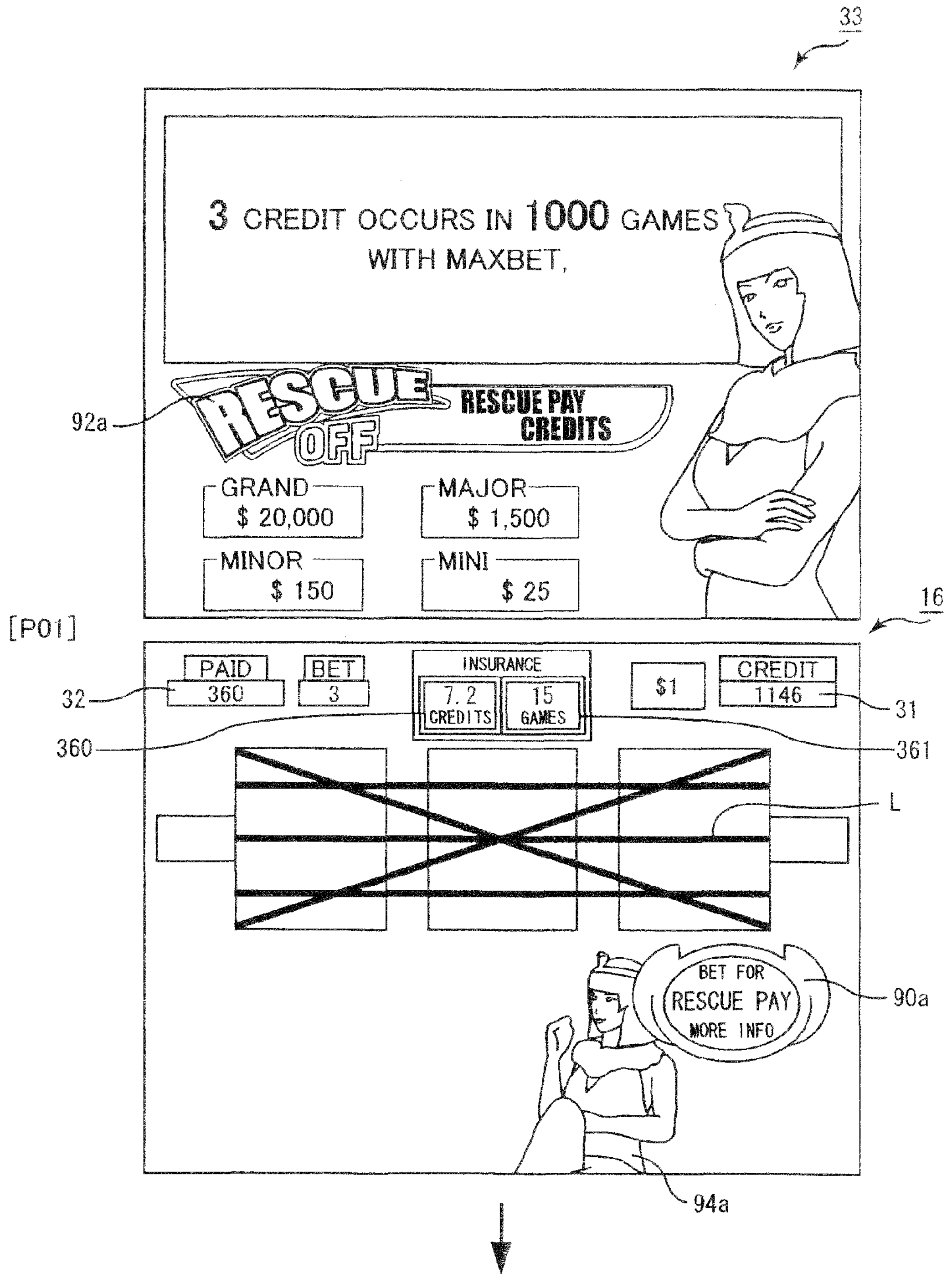
FIGS. 5A-5B (collectively FIG. 5) are views showing exemplary images displayed to the slot machine shown in FIG. 1.
Figure 5B:
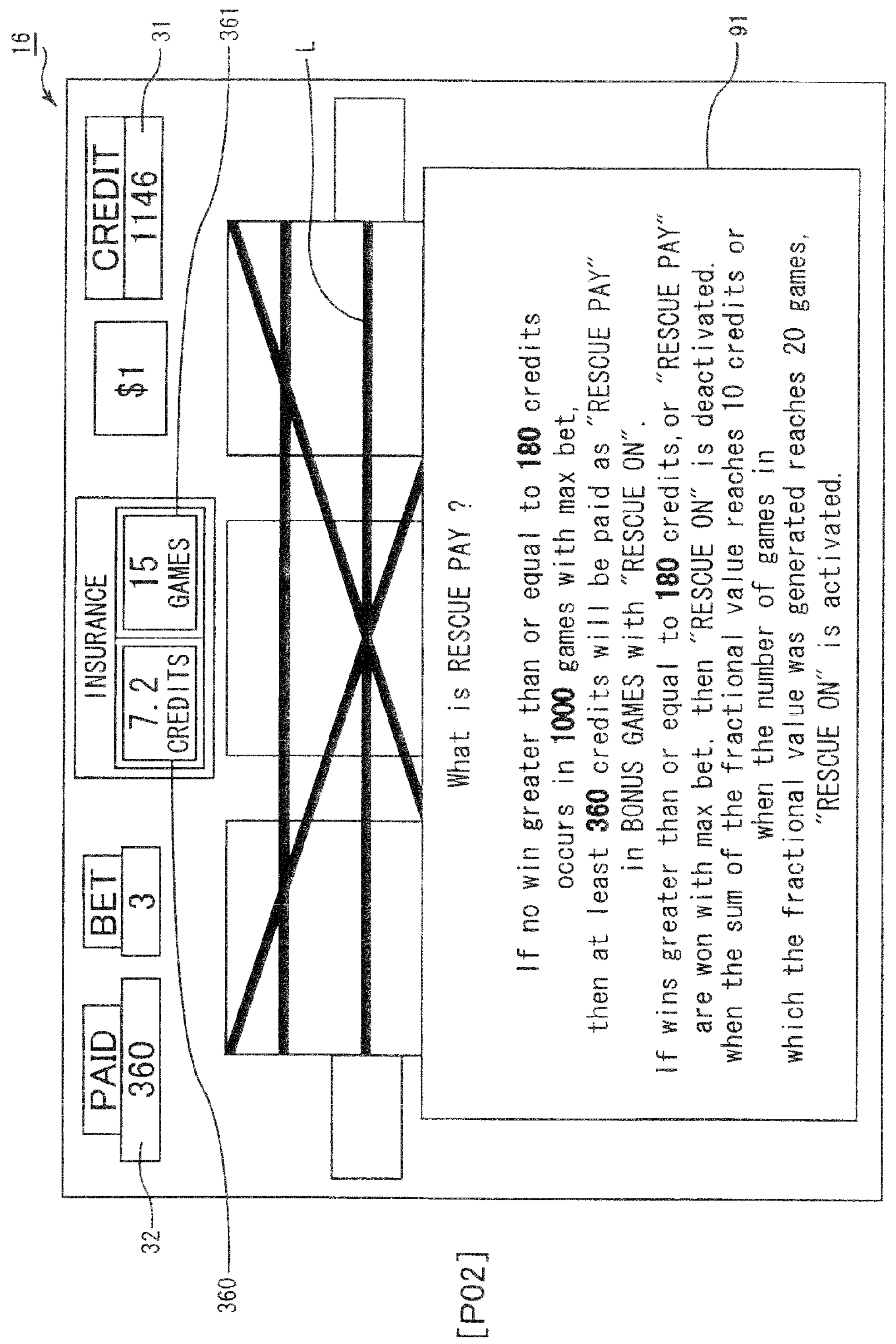

In the non-insurance mode, as shown in FIG. 5, an image 92*a* showing "RESCUE OFF" is displayed to the upper image display panel 33. The image 92*a* is an image showing that the current gaming state is the non-insurance mode.

Further, a normal effect image 94*a* is displayed to the lower image display panel 16.

Moreover, a button type image 90*a* showing "BET FOR RESCUE PAY MORE INFO" is displayed to the lower right portion of the lower image display panel 16. The image 90*a* is an image to request an input of a command to output information concerning the insurance mode. The player can input the command to output information concerning the insurance mode by touching a predetermined place of the touch panel 69 (not shown) corresponding to the display area of the button type image 90*a*.

[P02]

When the above-mentioned command is inputted, an image 91 showing information concerning the insurance mode is displayed to the lower image display panel 16.

The image 91 includes information concerning the insurance mode as follows:

(I) the number of games required for shifting the game to a bonus game, namely a specific number (1000);

(II) a minimum number of coins to be paid out when the number of games reaches the specific number (360);

(III) clearing the number of games when a game with coin-outs in number equal to or more than 180 is played before the number of games reaches the specific number, namely a number-of-games clearing condition;

(IV) shifting the mode from the insurance mode to the non-insurance mode when a game with coin-outs in number equal to or more than 180 is played before the number of games reaches the specific number, namely an insurance canceling condition;

(V) counting the number of games with a MAXBET placed thereon and coin-outs in number less than a predetermined number (180), namely games to be counted; and (VI) the total sum of fractional values (10 credits) and the number (20 games) of games which have resulted in the fractional value, both of which is required for shifting the mode to the insurance mode from the non-insurance mode.

[P03]

Figure 6A:
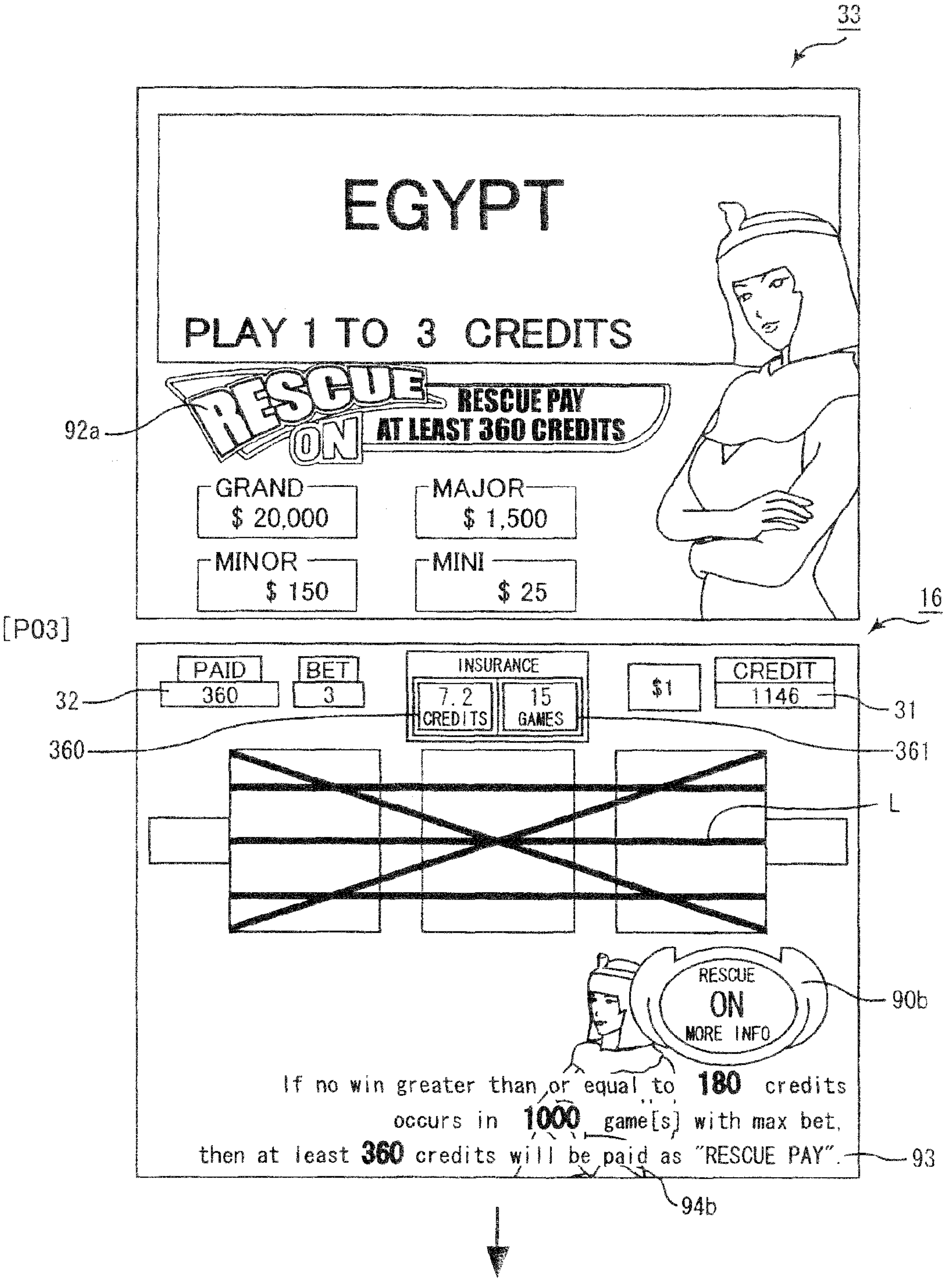
FIGS. 6A-6B (collectively FIG. 6) are views showing exemplary images displayed to the slot machine shown in FIG. 1.
Figure 6B:
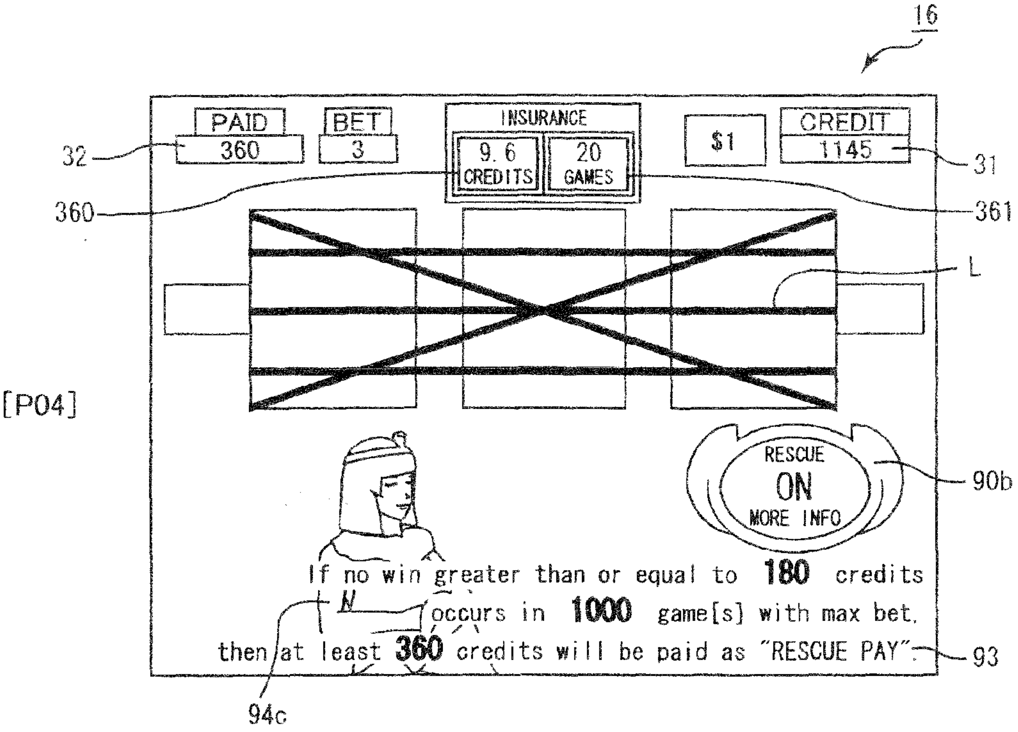
Figure 6B:
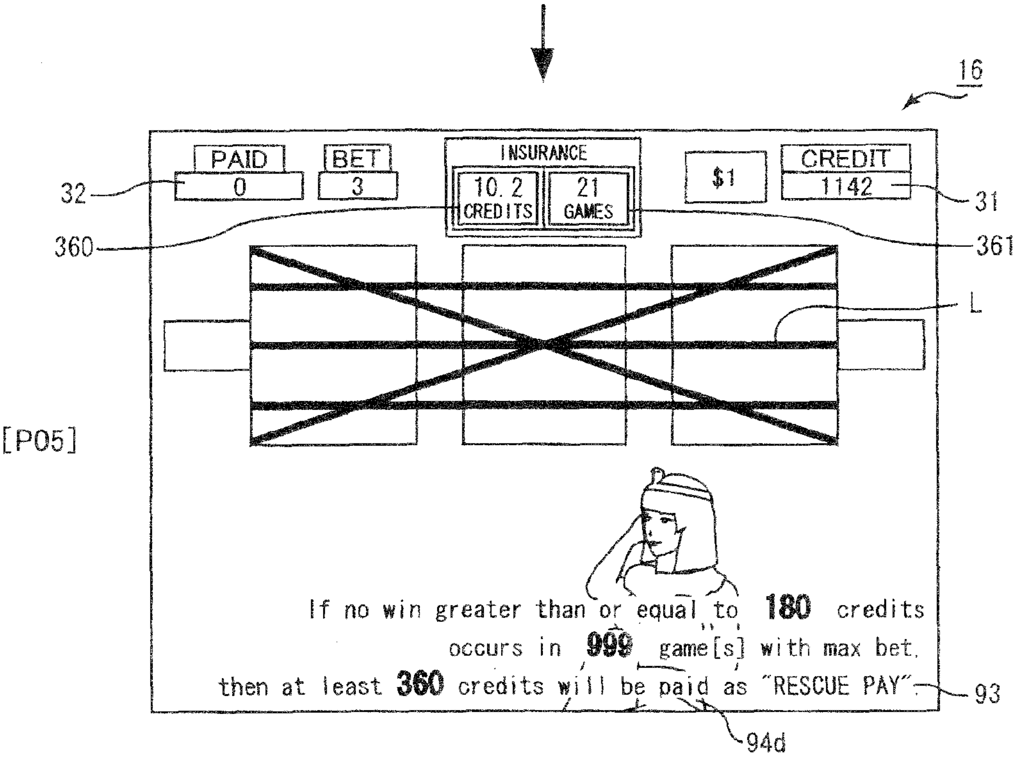

When the mode is shifted to the insurance mode, as shown in FIG. 6, an image 92*b* showing "RESCUE ON" is displayed to the upper image display panel 33. The image 92*b* is an image showing that the current gaming state is the insurance mode.

Further, a normal effect image 94*b* is displayed to the lower image display panel 16. While the normal effect image 94*b* in the insurance mode differs from a normal effect image 94*a* in the non-insurance mode, these are selected randomly by using random numbers, not based on whether the mode is the insurance mode or the non-insurance mode.

Further, a button type image 90*b* is displayed to the lower right portion of the lower image display panel 16. The button type image 90*b* is an image for showing that the current gaming state is the insurance mode and also for inputting a command to output information concerning the insurance mode.

When a predetermined place of the touch panel 69 corresponding to the display area of the button type image 90*b* is touched by the player, an image shown in [P02] is displayed to the lower image display panel 16.

Further, an image 93 is displayed below the button type image 90*b*, which shows that bonus games are to be conducted when the number of games with the MAXBET (games to be counted) reaches a specific number.

[P04]

When the game is started in the insurance mode, in a first game in the insurance mode, a normal effect image 94*c* is displayed to the lower image display panel 16, and the button type image 90*b* and the image 93 are continuously displayed. The image 93 shows that bonus games are to be conducted when the games to be counted are played 1000 times from now on.

[P05]

In a second game in the insurance mode, a normal effect image 94*d* is displayed and the image 93 is continuously displayed. The image 93 shows that bonus games are to be conducted when the games to be counted are played 999 times from now on.

As thus described, in the slot machine 10, the image 93 is displayed to the lower image display panel 16, the image 93 showing the number of games to be played from the time point of starting the game in the insurance mode until the number of games to be counted reaches a specific number. Subsequently, the number of games left to be played is counted down on the image 93 so long as the above-mentioned number-of-games clearing condition or insurance canceling condition is not established. It is to be noted that as thus described, the normal effect image 94 is displayed in the insurance mode until the number of games reaches 990 (notice set value).

[P06]

Figure 7A:
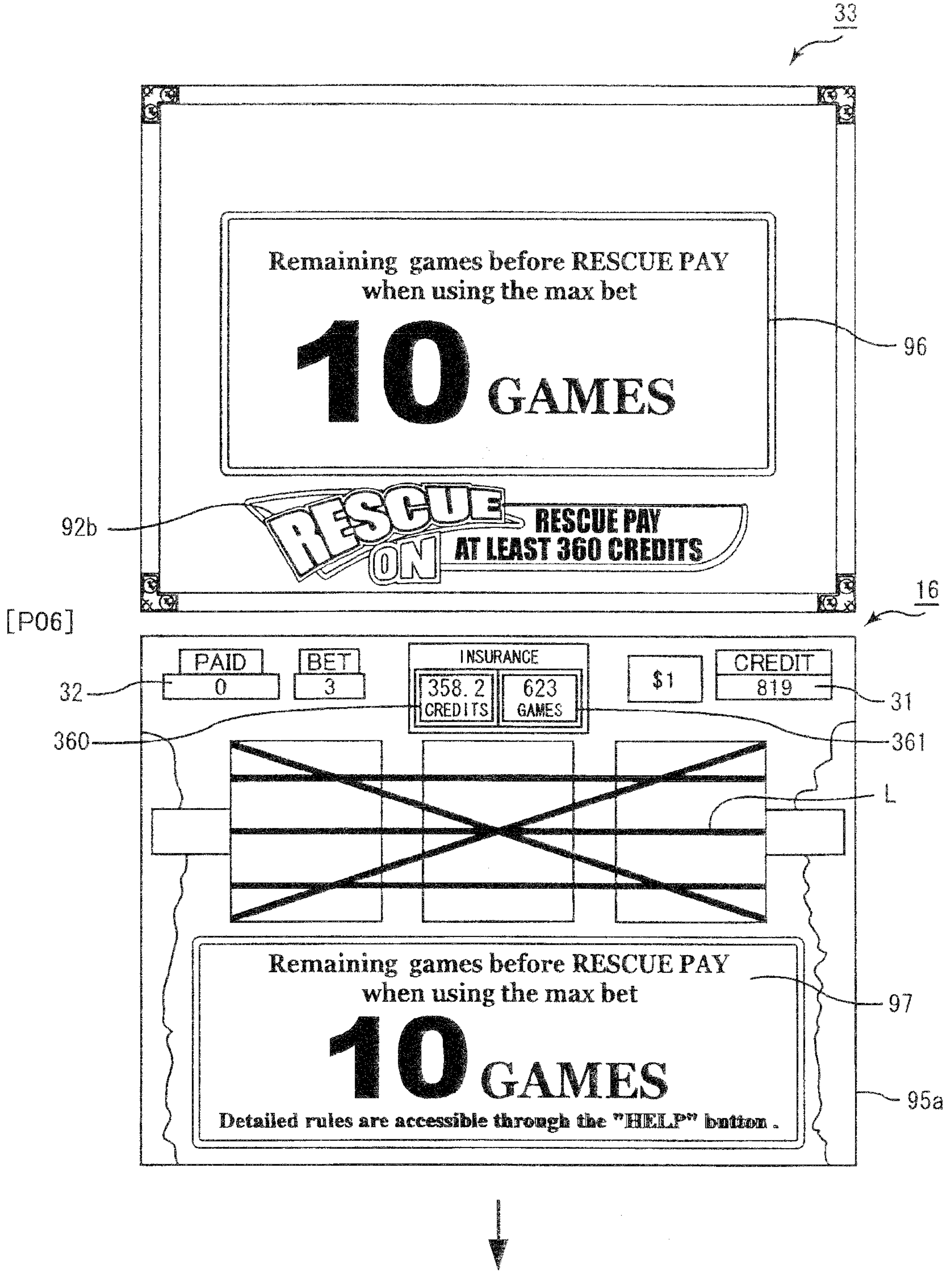
FIGS. 7A-7B (collectively FIG. 7) are views showing exemplary images displayed to the slot machine shown in FIG. 1.
Figure 7B:
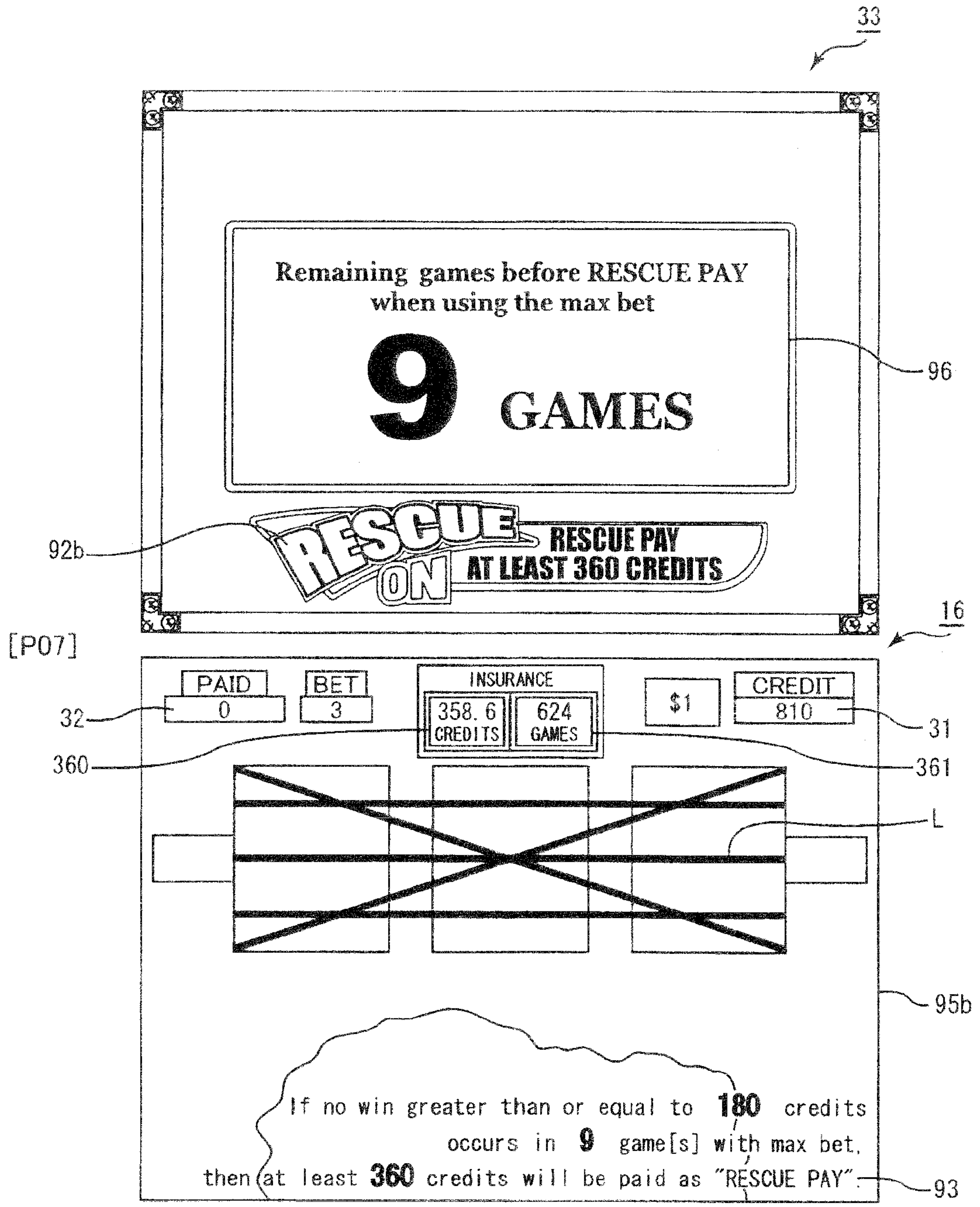
Figure 8A:
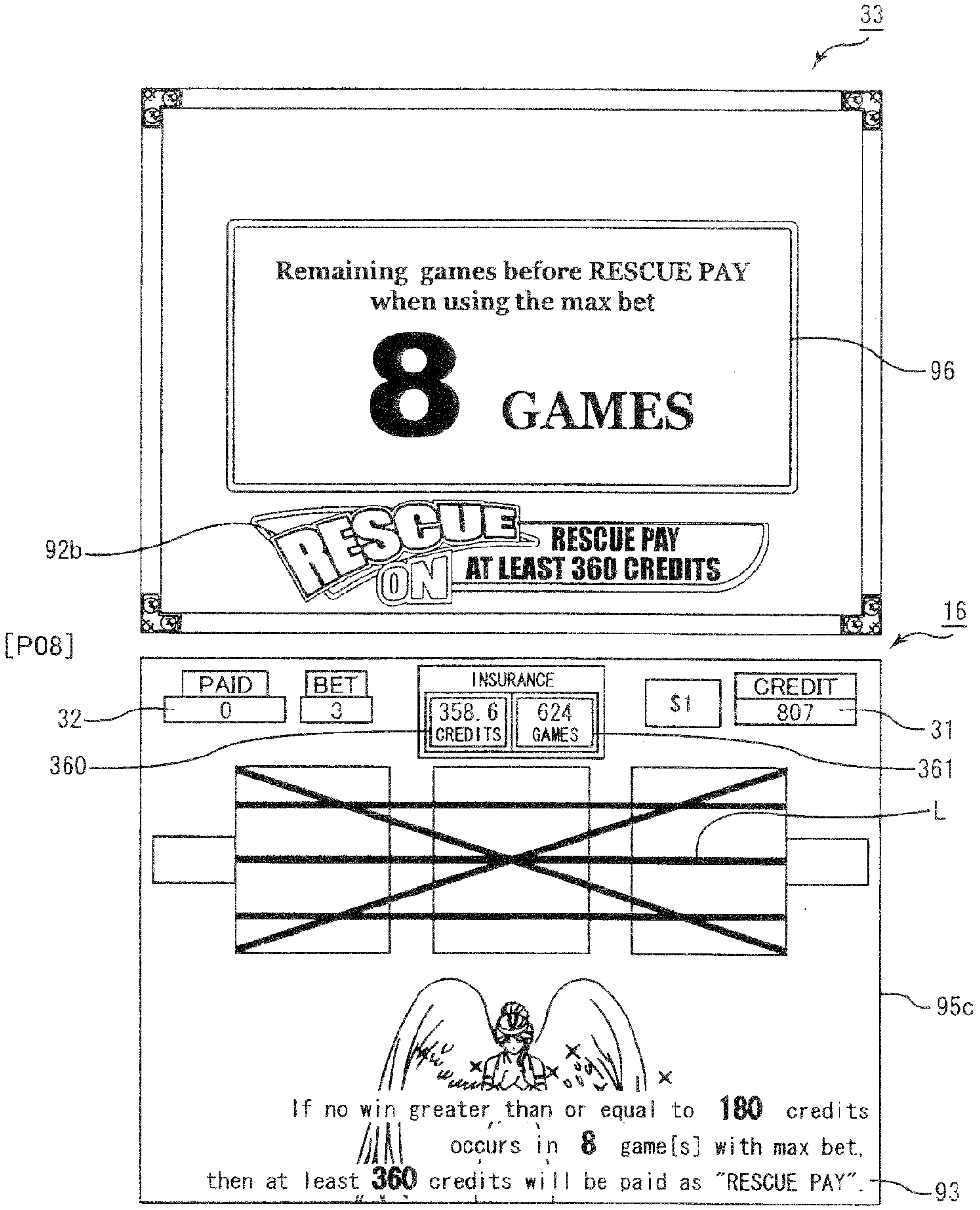
FIGS. 8A-8C (collectively FIG. 8) are views showing exemplary images displayed to the slot machine shown in FIG. 1.
Figure 8B:
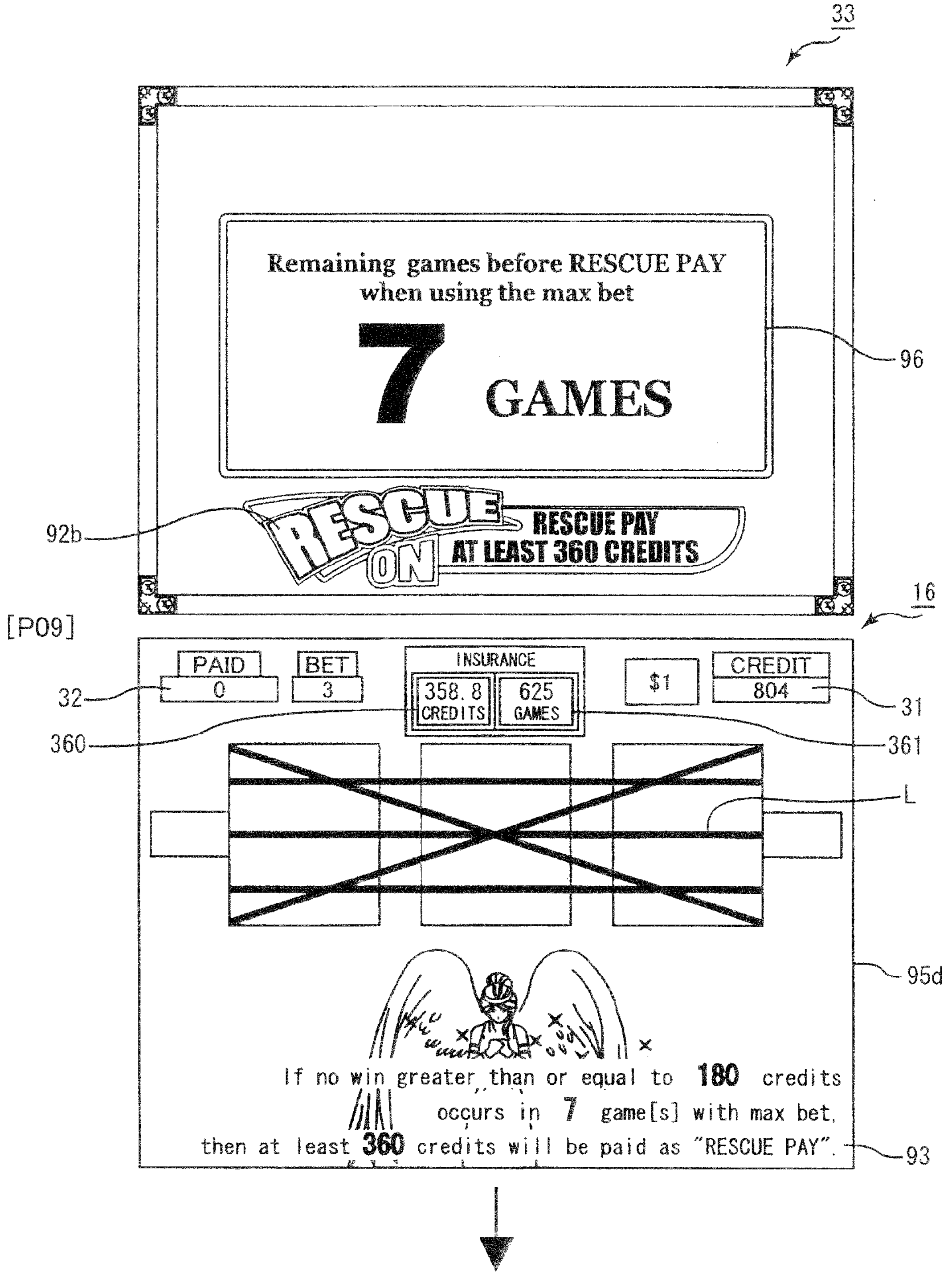
Figure 8C:
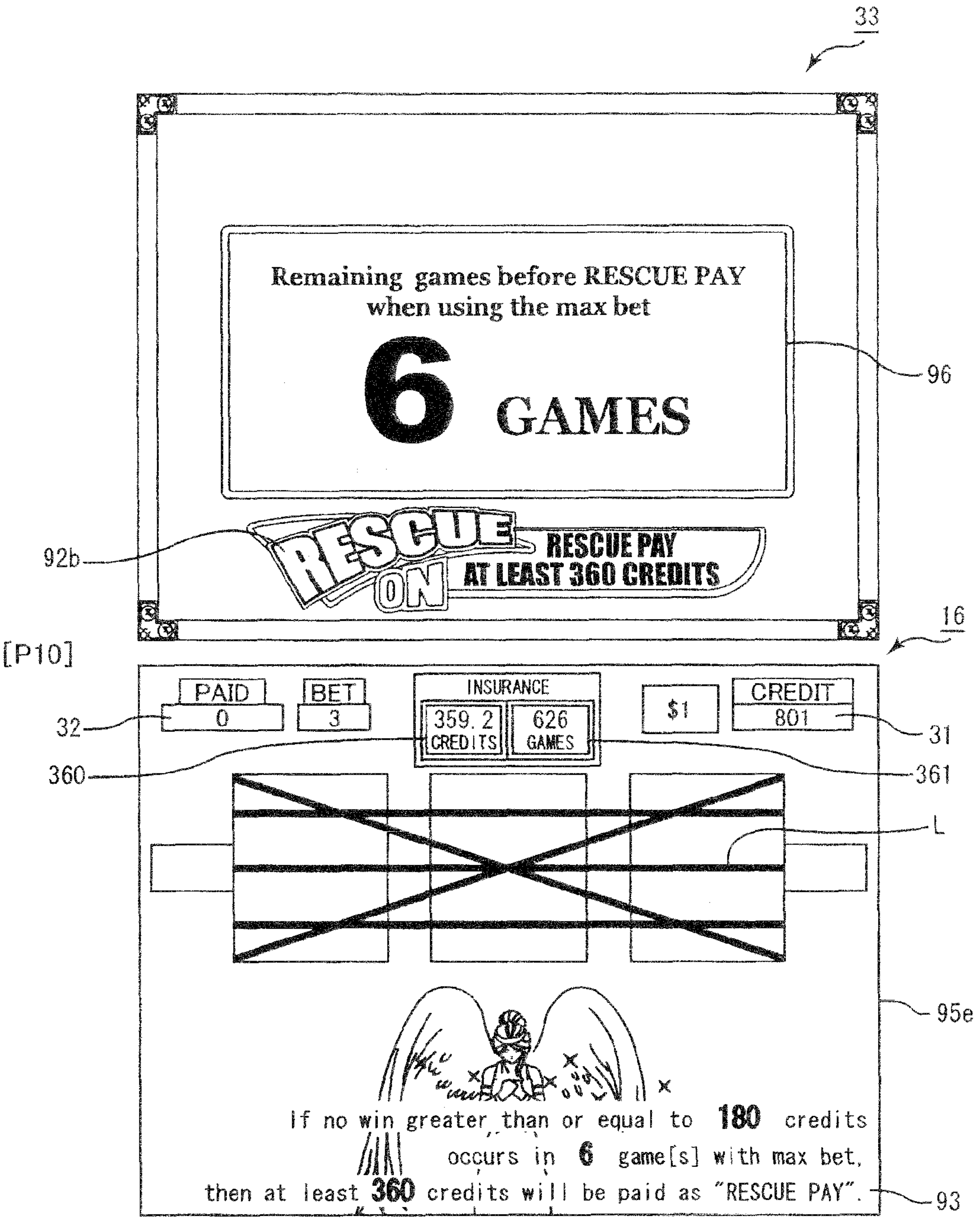
Figure 9A:
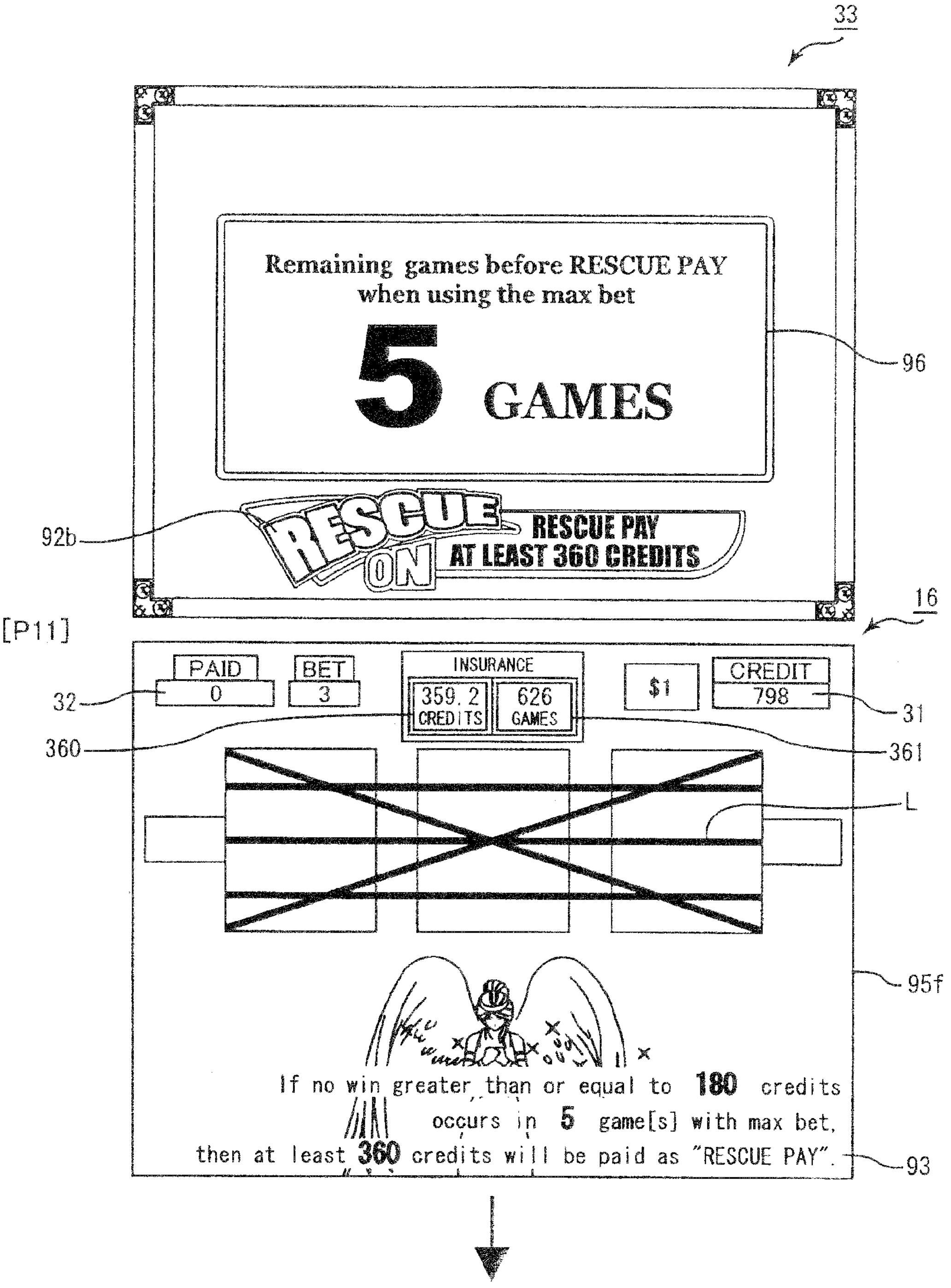
FIGS. 9A-9B (collectively FIG. 9) are views showing exemplary images displayed to the slot machine shown in FIG. 1.
Figure 9B:
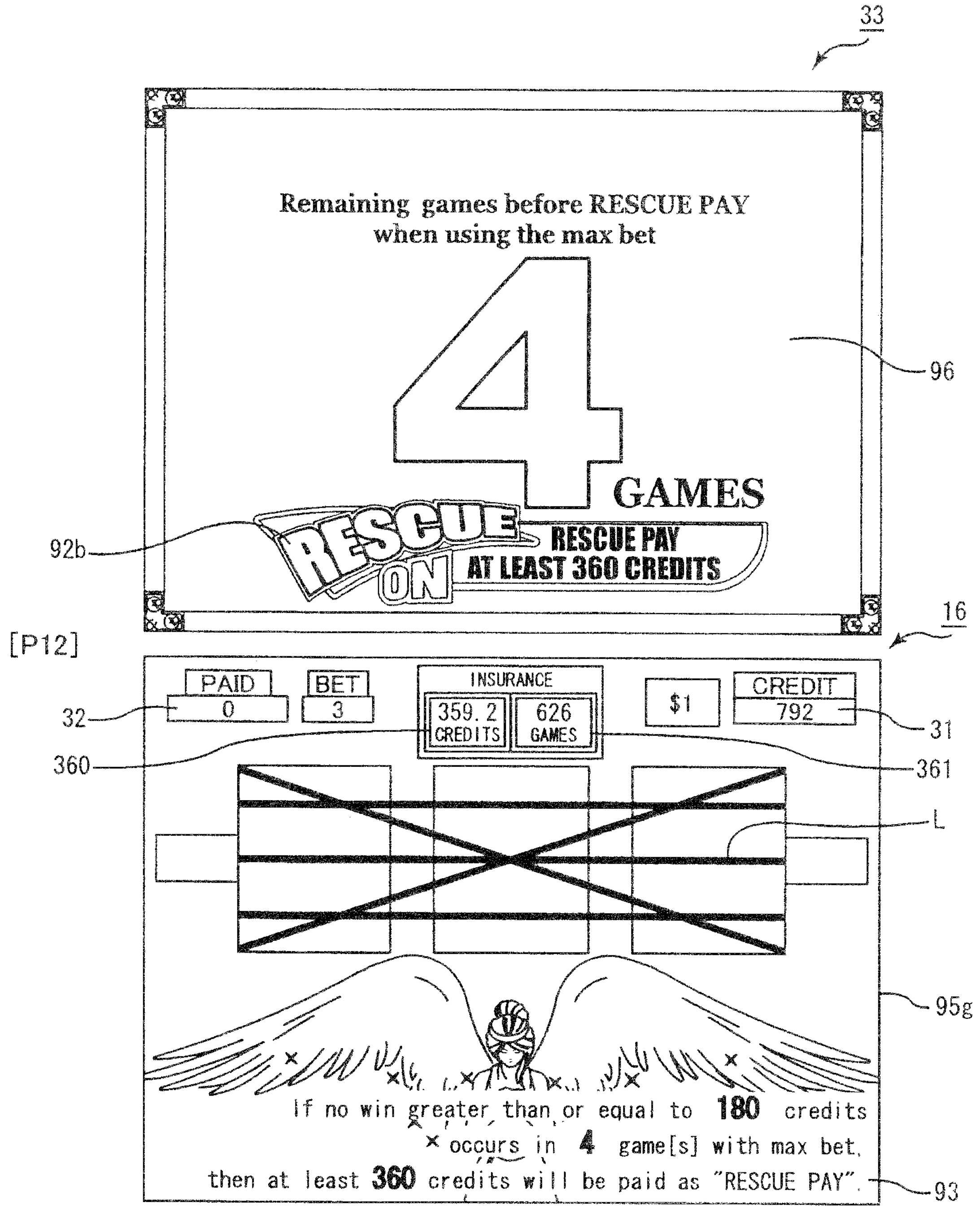
Figure 10A:
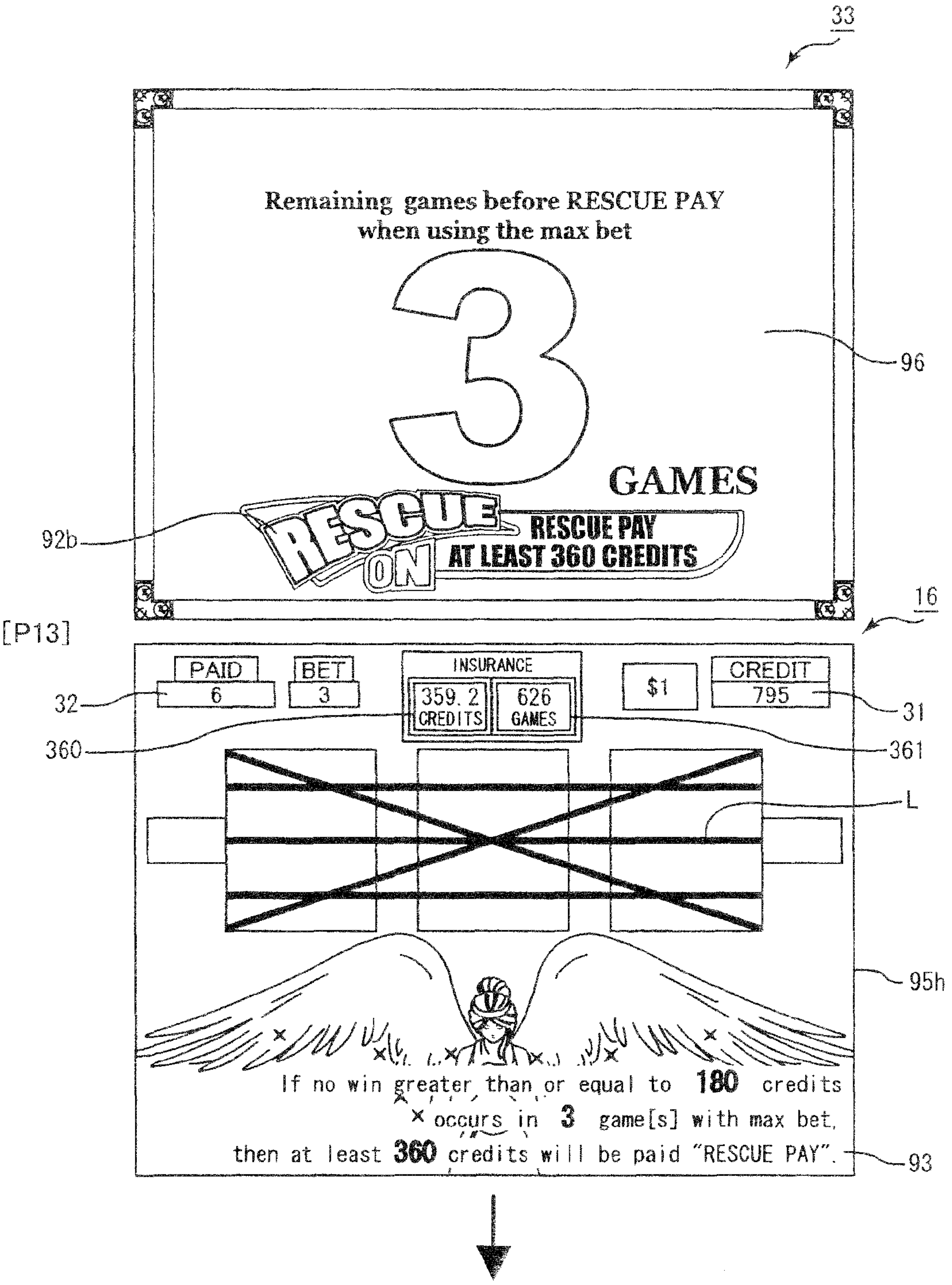
FIGS. 10A-10B (collectively FIG. 10) are views showing exemplary images displayed to the slot machine shown in FIG. 1.
Figure 10B:
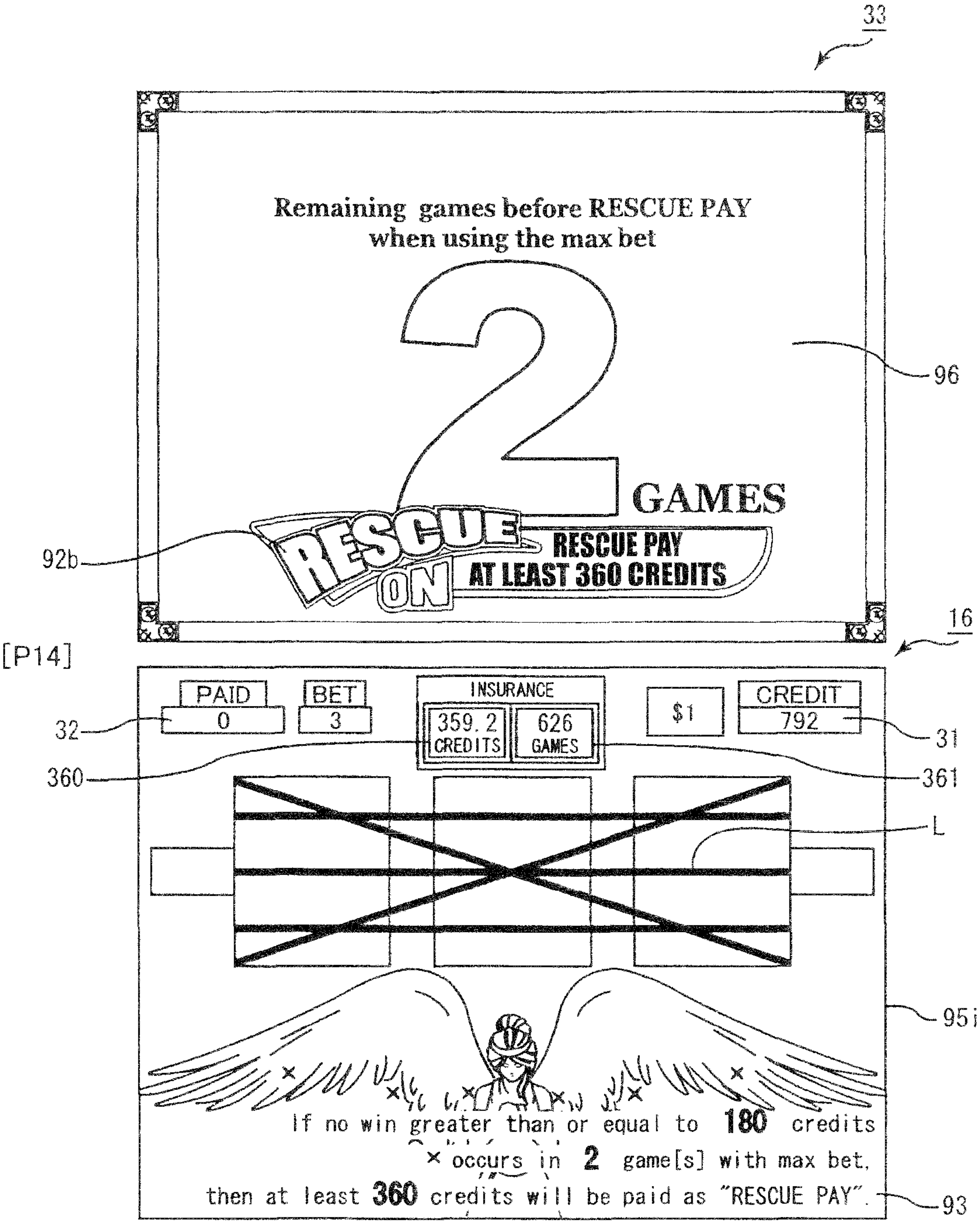
Figure 11:
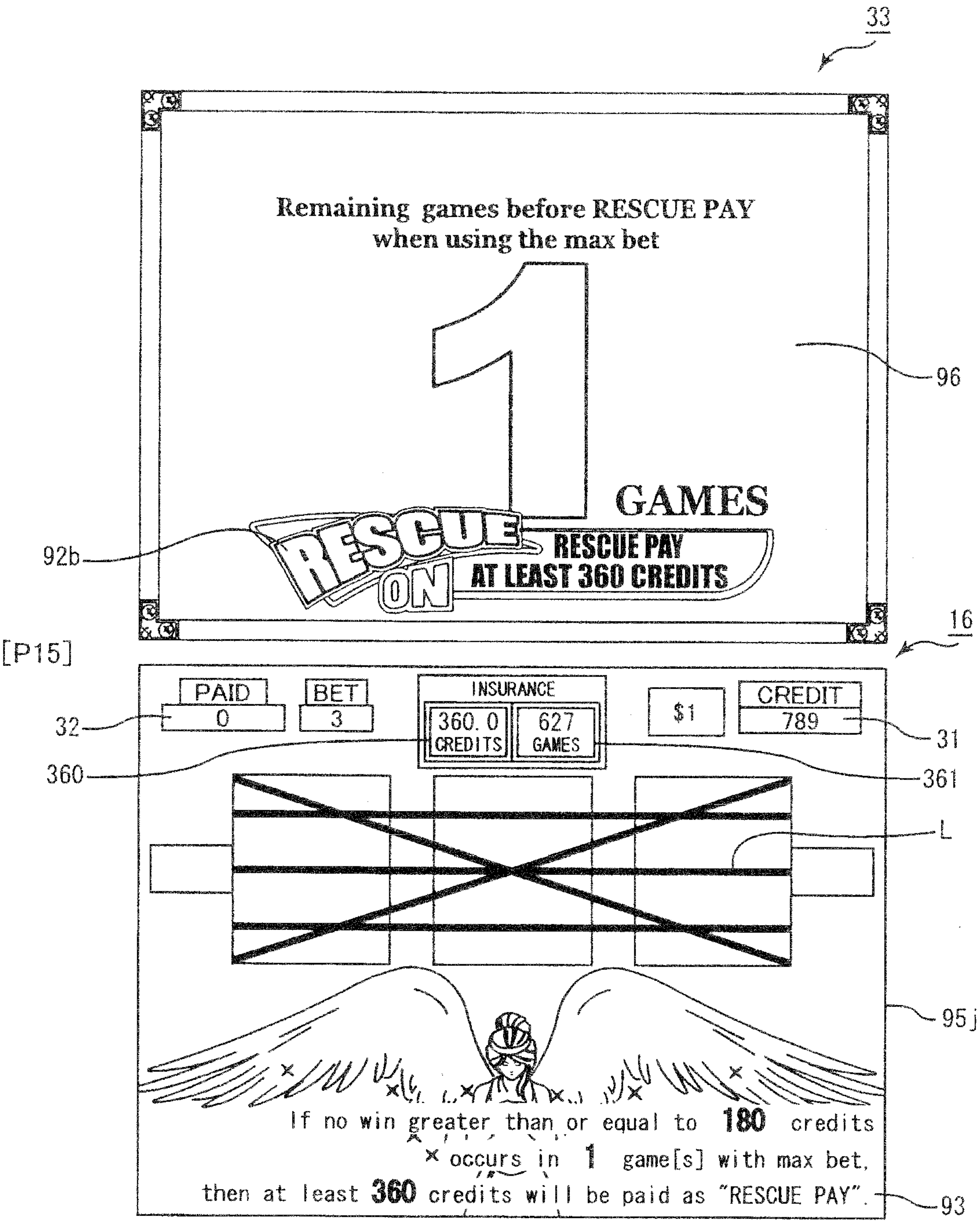
FIG. 11 is another view showing exemplary images displayed to the slot machine shown in FIG. 1.

When the number of games in the insurance mode reaches 990 (notice set value), as shown in FIG. 7, to the upper image display panel 33, the image 92*b* is displayed which shows that the current gaming state is the insurance mode and an image 96 is displayed which shows that the number of games left to be played until the number of games to be counted reaches the specific number is ten.

Further, also to the lower image display panel 16, an image 97 is displayed which shows that the number of games left to be played until the number of games to be counted reaches the specific number is ten.

Moreover, a specific effect image 95*a* is displayed to the lower image display panel 16. The specific effect image 95 is displayed after the number of games to be counted has reached the notice set value, in the insurance mode.

[P07]

When the number of games played in the insurance mode becomes 991, the number of games left to be played which is shown by the image 96 displayed to the upper image display panel 33 changes from ten to nine.

Further, also to the lower image display panel 16, the image 93 is displayed which shows that the number of games left to be played until the number of games to be counted reaches the specific number is nine.

Moreover, a specific effect image 95*b* is displayed to the lower image display panel 16.

The specific effect image 95*b* is a video picture with its contents continued from the specific effect image 95*a* in [P06]

[P08] to [P15]

Subsequently, as the number of games in the insurance mode increases, the number of games left to be played shown by the image 96 displayed to the upper image display panel 33 gradually decreases as shown in FIGS. 8 to 11. Further, in the lower image display panel 16, the number of remaining games shown by image 93 is gradually decreased. Moreover, to the lower image display panel 16, specific effect images 95*c* to 95*j* are sequentially displayed according to the number of games left to be played.

The specific effect image 95 is a video picture where a character (angel) performs a series of actions (action of appearing and spreading her wings), and specific effect images 95*a* to 95*j* are made by dividing the specific effect image 95 into a plurality of images along the time axis.

Figure 12A:
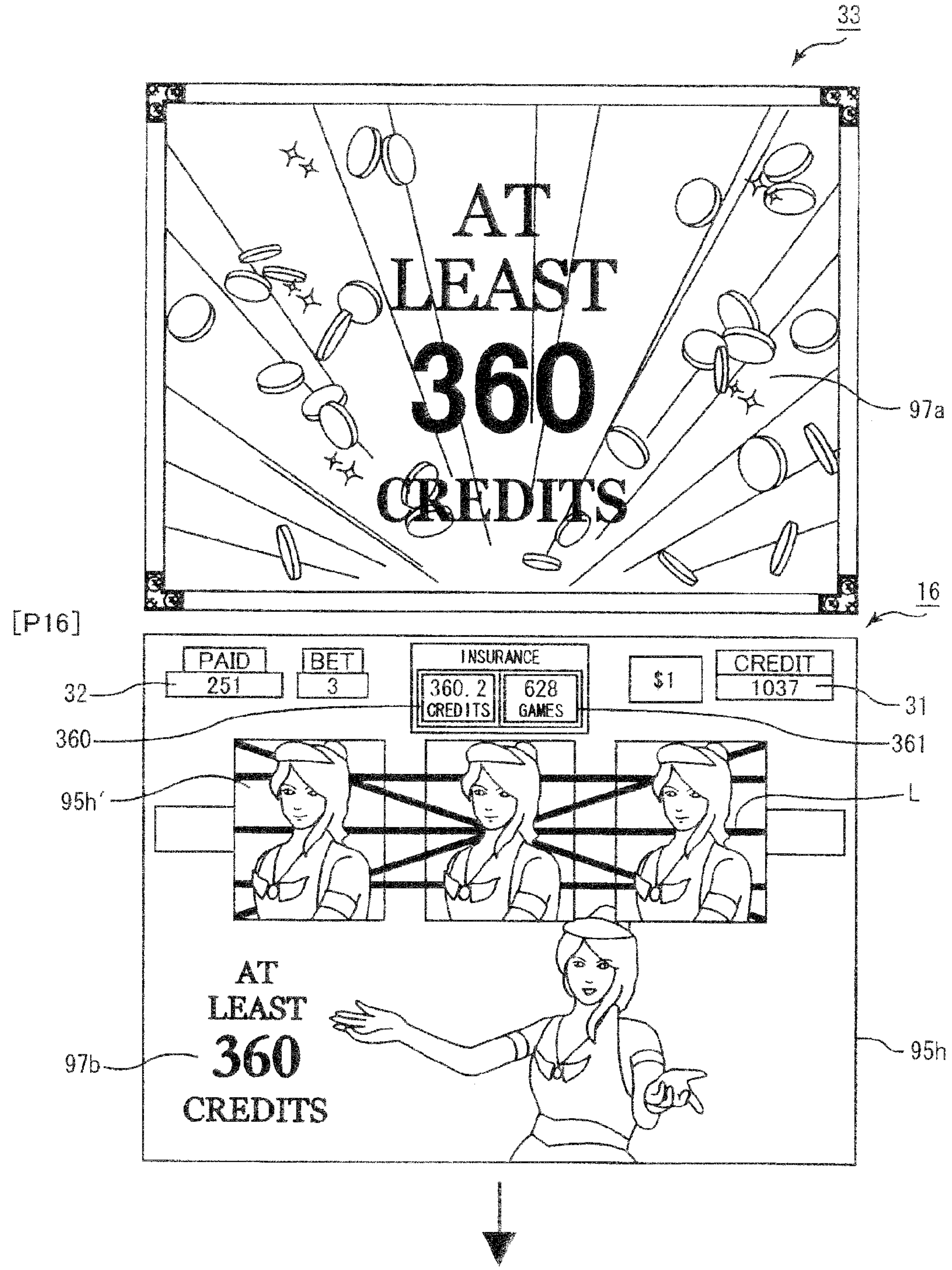
FIGS. 12A-12B (collectively FIG. 12) are views showing exemplary images displayed to the slot machine shown in FIG. 1.
Figure 12B:
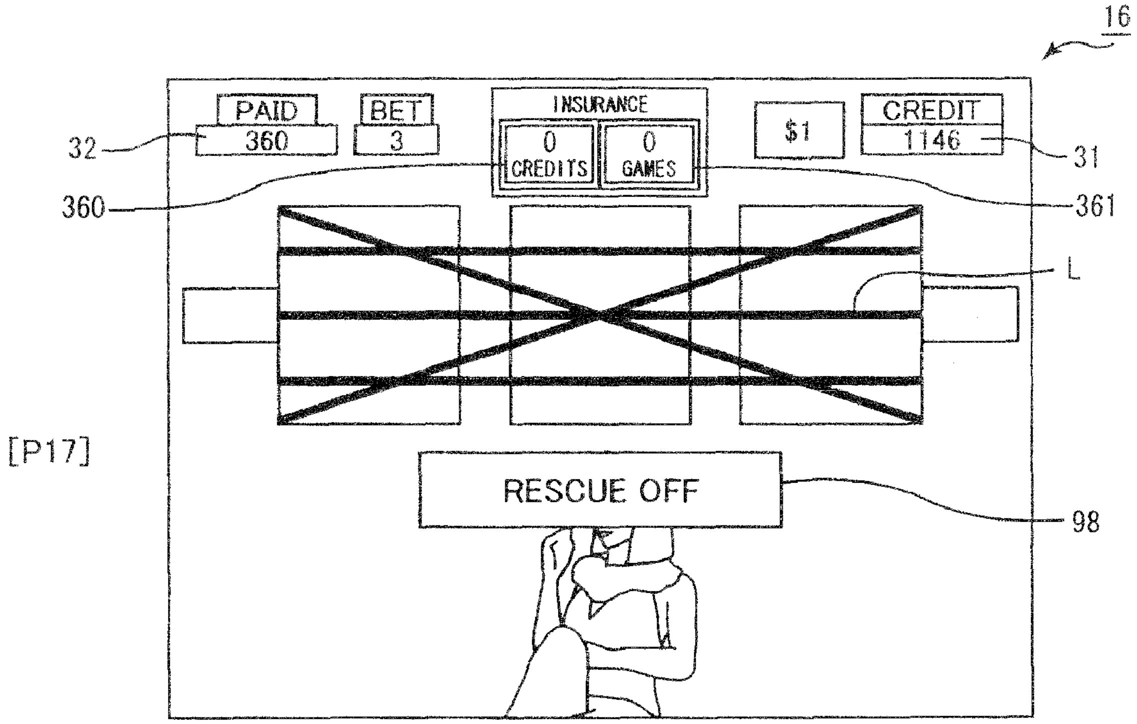

When the number of games in the insurance mode reaches the specific number, the game is shifted to a bonus game. As described above, in bonus games, at least 360 coins are paid out. As illustrated in FIG. 12, an image 97*a* indicative of this fact is displayed to the upper image display panel 33. Further, a similar image 97*b* is also displayed to the lower left side of the lower image display panel 16.

Moreover, to the lower image display panel 16, a specific effect image 95*h* with its contents continued from the specific effect images 95*a* to 95*j*. Furthermore, a specific effect image 95*h*' is displayed in the display windows 15 (15L, 15C, 15R)

[P17]

Upon the end of the bonus games, the number-of-games C is cleared and the mode is shifted to the non-insurance mode from the insurance mode.

At this time, an image 98 showing "RESCUE OFF" is displayed to the lower image display panel 16. The image 98 is an image showing that the mode has been shifted from the insurance mode to the non-insurance mode.

[P18]

Figure 13A:
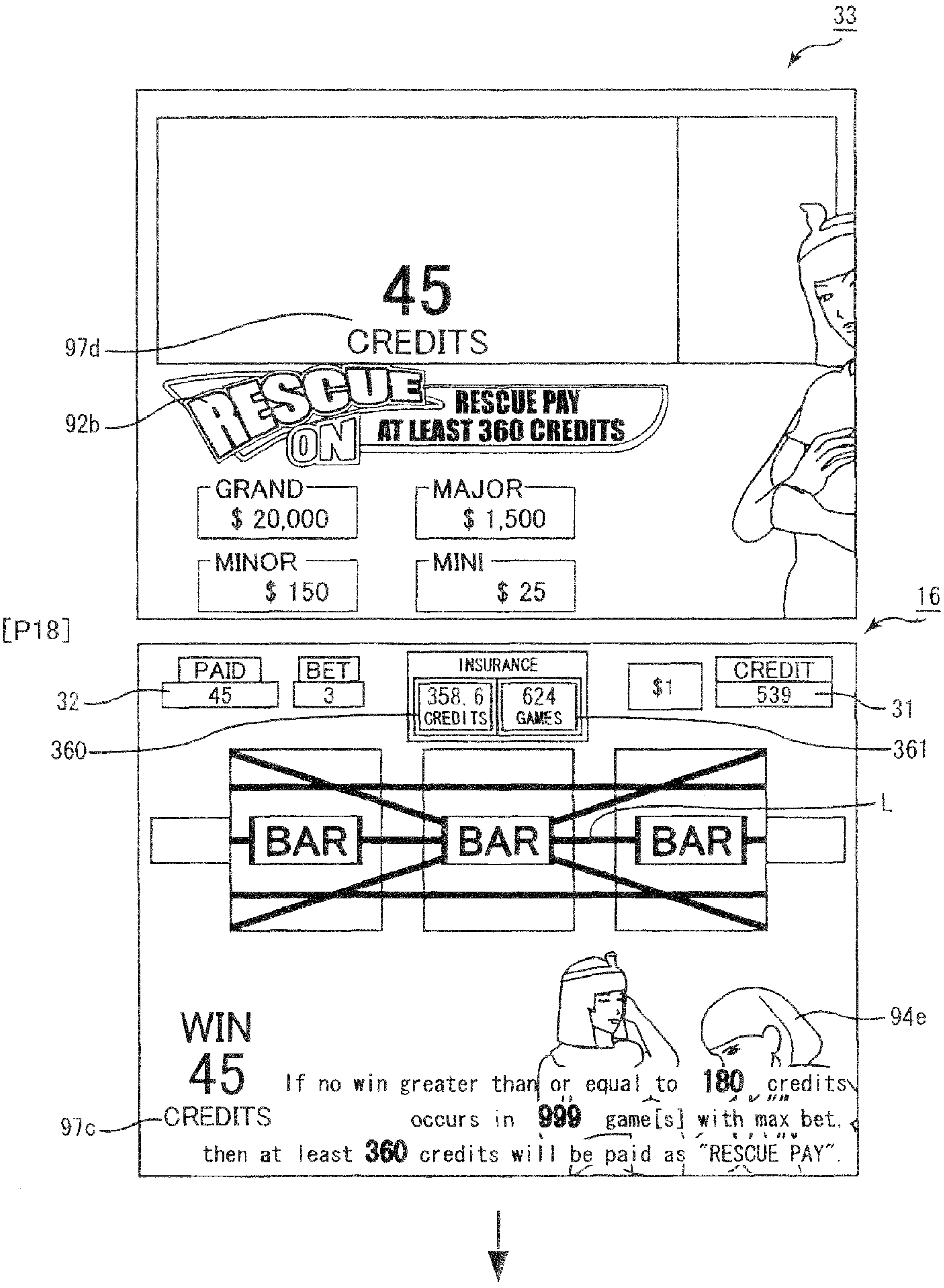
FIGS. 13A-13B (collectively FIG. 13) are views showing exemplary images displayed to the slot machine shown in FIG. 1.
Figure 13B:
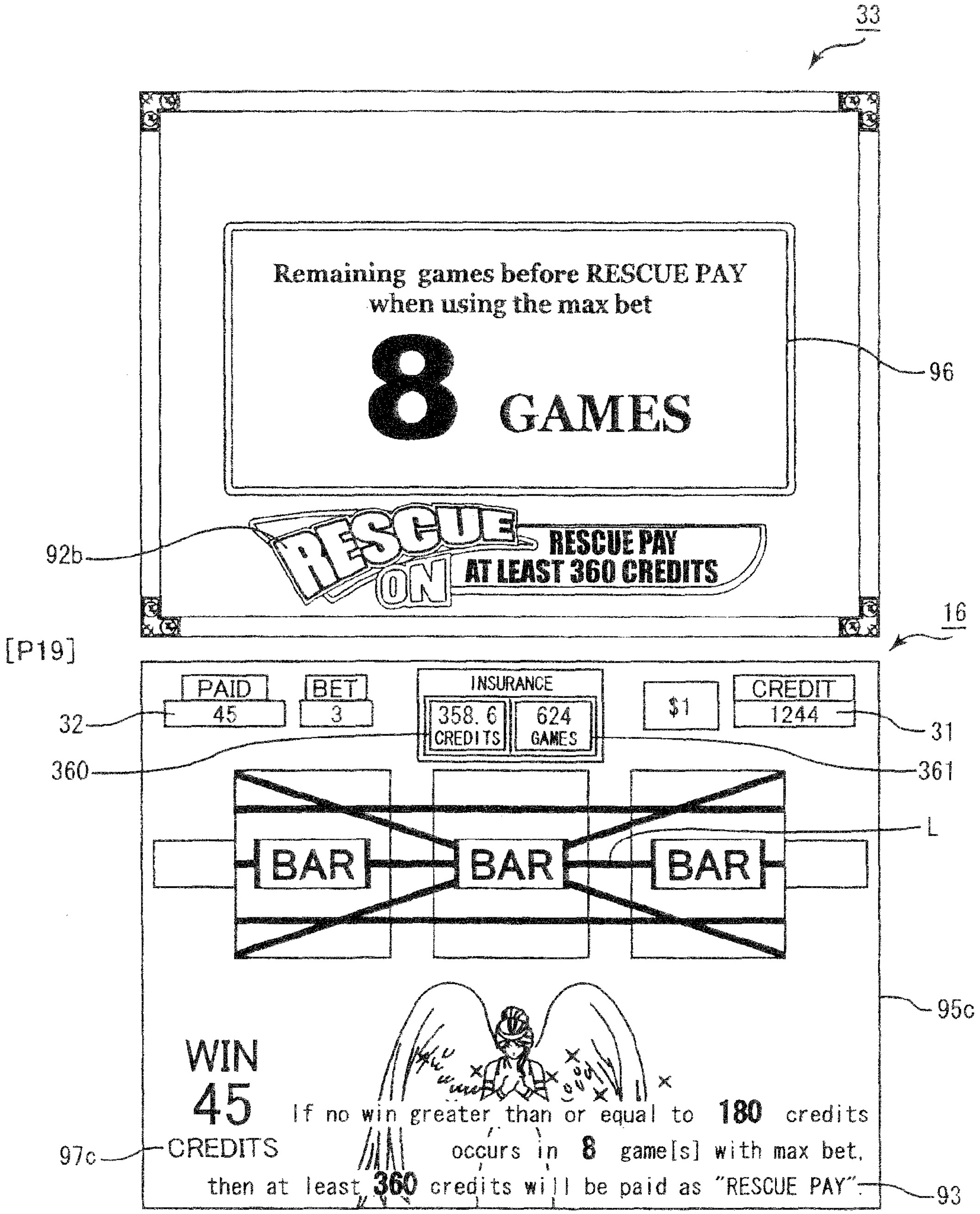

In a case where the number of games has not reached 990 (notice set value) in the insurance mode, when the combination of symbols "BAR"-"BAR"-"BAR" accompanied by coin-outs is established, an image 97*d* showing "45 CREDITS" is displayed to the upper image display panel 33 as shown in FIG. 13.

The image 97*d* is an image showing the number of coins to be paid out according to the combination of symbols "BAR"-"BAR"-"BAR".

Further, the image 92*b* showing "RESCUE ON" is displayed to the upper image display panel 33. The image 92*b* is an image showing that the current gaming state is the insurance mode.

An effect image 94*e* corresponding to "BAR"-"BAR"-"BAR" is displayed to the lower image display panel 16.

Moreover, to the lower image display panel 16, the image 93 is displayed which shows the number of games left to be played until the number of games to be counted reaches the specific number, and the image 97*c* is displayed which shows the number of coin-outs according to the combination of symbols "BAR"-"BAR"-"BAR"

[P19]

After the number of games has reached 990 (notice set value), when the combination of symbols "BAR"-"BAR"-"BAR" accompanied by coin-outs is established in the insurance mode as in [P19], the image 97*c* is displayed to the lower image display panel 16, the image 97*c* showing the number of coin-outs according to the combination of symbols "BAR"-"BAR"-"BAR".

However, an effect image 94*e* corresponding to the combination of symbols "BAR"-"BAR"-"BAR" is not displayed, and the specific effect image 95*c* is displayed as in [P08] (see FIG. 7). Other images are also displayed as in [P 08].

Next, processing conducted in the slot machine 10 are described.

[Main Processing]

Figure 14:
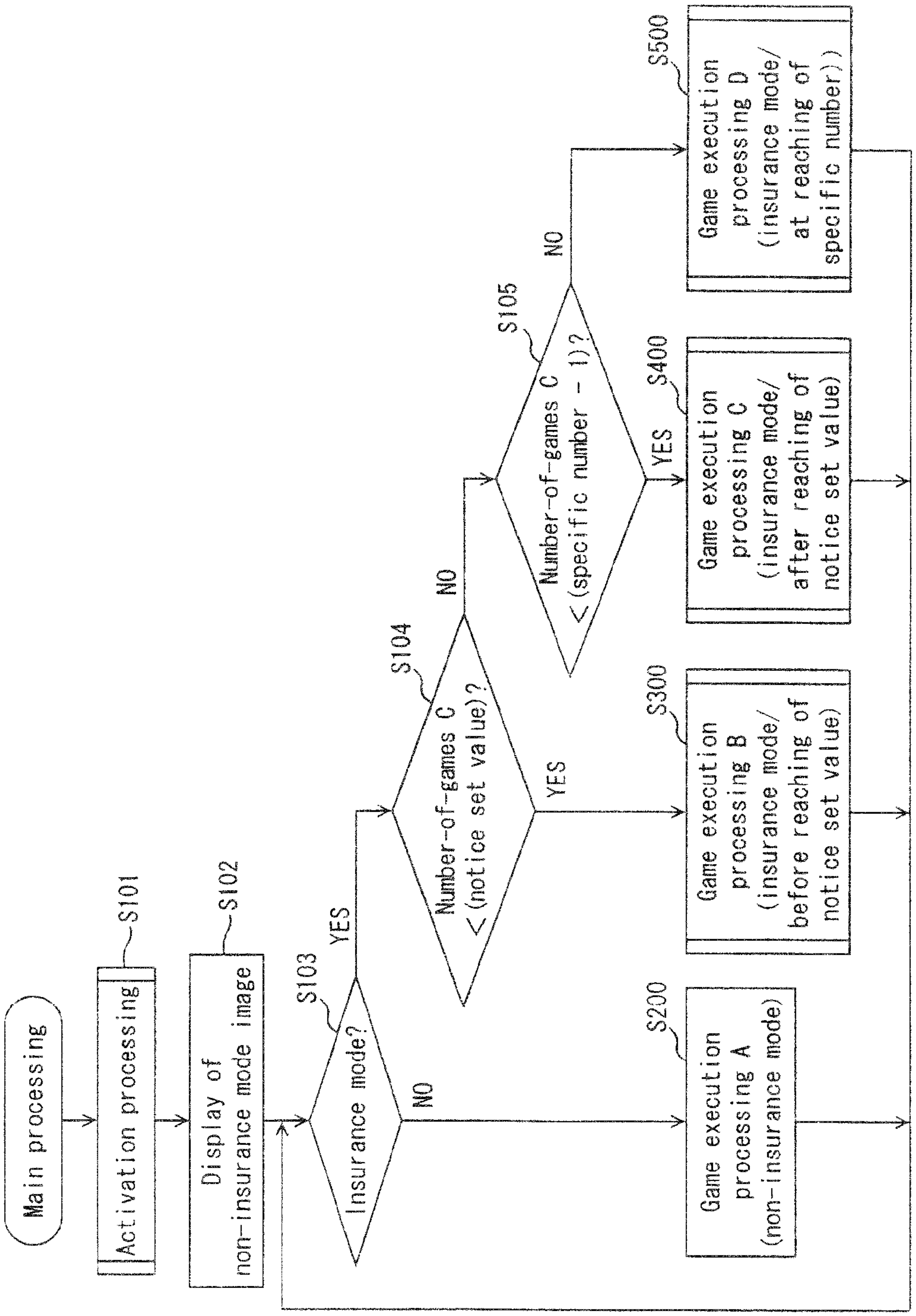
FIG. 14 is a flowchart showing main processing executed in the slot machine shown in FIG. 1.

FIG. 14 is a flowchart showing main processing performed in the slot machine 10.

First, activation processing is conducted in the slot machine 10 (step S101). The activation processing is specifically described later by using FIG. 21.

It is to be noted that, upon receipt of a detection signal outputted from the coin counter 21C when a coin inserted into the coin receiving slot 21 is detected by the coin counter 21C after the activation processing, the main CPU 41 conducts processing for adding the amount of inserted coins to the number of credits stored in the RAM 43 as interruption processing.

After the processing of step S101, the non-insurance mode is displayed in the slot machine 10 (step S102). In this processing, the main CPU 41 transmits a drawing command of the non-insurance mode image to the graphic board 68. On the graphic board 68, based on the above-mentioned drawing command, the VDP extracts image data from the RAM 43, expands it into a video RAM, generates image data of one frame, and outputs this image data to the upper image display panel 33 and the lower image display panel 16. This results in display of an image, for example as shown in [P01] (see FIG. 5), to the upper image display panel 33 and the lower image display panel 16.

Next, the main CPU 41 determines whether or not the current gaming state is the insurance mode, namely whether or not the insurance mode flag stored in the RAM 43 is "ON" (step S103).

When determining that the current gaming state is not the insurance mode in step S103, the main CPU 41 executes game execution processing A (non-insurance mode) (step S200), and then returns the processing to step S103. The game execution processing A is specifically described later by using FIG. 15.

On the other hand, when determining that the current gaming state is the insurance mode in step S103, the main CPU 41 then determines whether or not the number-of-games C stored in the RAM 43 is less than the notice set value (990 in the present embodiment) (step S104).

When determining that the number-of-games C is less than the notice set value in step S104, the main CPU 41 executes game execution processing B (insurance mode/before reaching the notice set value) (step S300), and then returns the processing to step S103. The game execution processing B is specifically described later by using FIG. 16.

On the other hand, when determining that the number-of-games C is not less than the notice set value in step S104, namely the number-of-games C is equal to or more than the notice set value, the main CPU 41 determines whether or not the number-of-games C stored in the RAM 43 is less than a value (999) smaller than the specific number by one (step S105).

When determining that the number-of-games C is less than the value smaller than the specific number by one in step S105, the main CPU 41 executes game execution processing C (insurance mode/after reaching the notice set value) (step S400) since the number-of-games C will not reach the specific number in the next game, and then main CPU 41 returns the processing to step S103. The game execution processing C is specifically described later by using FIG. 17.

When the main CPU 41 determines that the number-of-games C is equal to or more than a value smaller by one than the specific number, then the main CPU 41 conducts game execution processing D (the insurance mode/at reaching of specific number) (step S500) and thereafter returns the processing to the step S103, since the next game may be shifted to a bonus game. The game execution processing D is specifically described later by using FIG. 19.

Figure 15A:
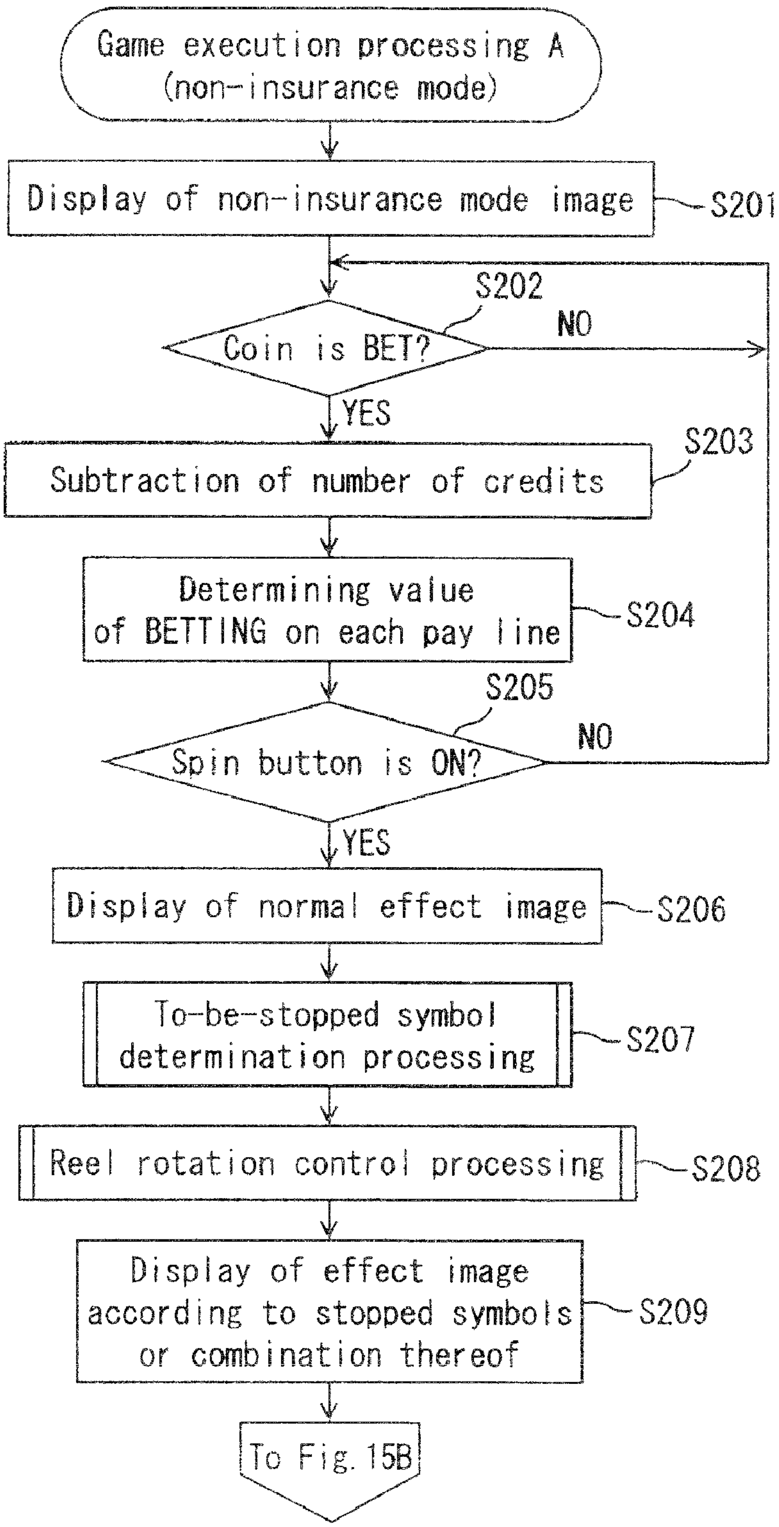
FIGS. 15A and 15B are flowcharts showing a subroutine of game execution processing A (non-insurance mode).
Figure 15B:
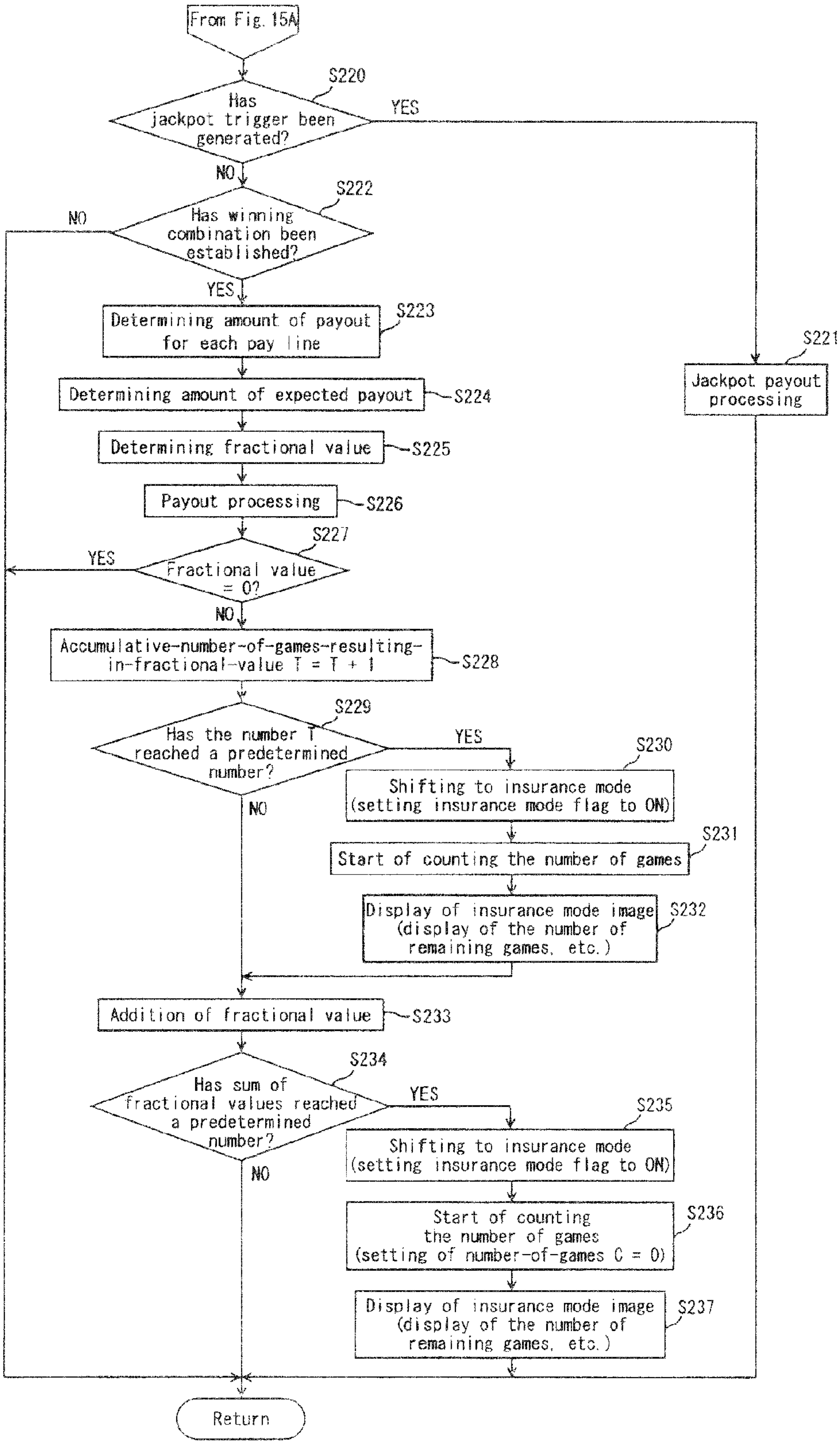

FIGS. 15A and 15B are flowcharts illustrating the game execution processing A which is called and conducted in step S200 in the subroutine illustrated in FIG. 14.

First, the main CPU 41 conducts processing for displaying non-insurance-mode images (see [P01] in FIG. 5), to the upper image display panel 33 and the lower image display panel 16 (step S201).

Next, the main CPU 41 determines whether or not coins are BET (step S202).

In this processing, the main CPU 41 determines whether or not it has received an input signal output from the 1-BET switch 26S when the 1-BET button 26 has been operated or an input signal output from the maximum BET switch 27S when the maximum BET button 27 has been operated. When the main CPU 41 determines that no coin is BET, then the main CPU 41 returns the processing to the step S202.

On the other hand, when the main CPU 41 determines in step S202 that coins are BET, the main CPU 41 conducts processing for subtracting the number of credits stored in the RAM 43, according to the number of coins BET (step S203). Further, in a case where the number of coins BET is greater than the number of credits stored in the RAM 43, the main CPU 41 returns the processing to the step S202, without conducting the processing for subtracting the number of credits stored in the RAM 43. Further, in a case where the number of coins BET exceeds an upper limit of the number of coins which can BET on a single game (3 coins, in the present embodiment), the main CPU 41 carries forward the processing to step S204, without conducting the processing for subtracting the number of credits stored in the RAM 43.

Next, the main CPU 41 determines the value of BETTING for each pay line L (step S204). More specifically, the main CPU 41 determines the value obtained by division of the number of credits BET in step S202 by the number of the pay lines L (5, in the present embodiment), as the value of BETTING for each pay line L.

Next, the main CPU 41 determines whether or not the spin button 23 has been set to ON (step S204). In this processing, the main CPU 41 determines whether or not it has received an input signal output from the spin switch 23S when the spin button 23 has been pressed.

When the main CPU 41 determines that the spin button 23 has not been set to ON, the main CPU 41 returns the processing to the step S202.

Further, when the spin button 23 has not been set to ON (for example, a command for ending the game has been inputted without setting the spin button 23 to ON), the main CPU 41 cancels the result of the subtraction in step S203.

In the present embodiment, there will be described a case where the processing for subtracting the number of credits (step S203) is conducted, after coins are BET (step S202), and before the determination as to whether or not the spin button 23 has been set to ON (step S205). However, the present invention is not limited to the case. For example, the determination as to whether or not the spin button 23 has been set to ON may be performed (step S205) after coins are BET (step S202) and, when it is determined that the spin button 23 has been set to ON (step S205: YES), the processing for subtracting the number of credits (step S203) may be performed.

On the other hand, when the main CPU 41 determines in step S205 that the spin button 23 has been set to ON, the main CPU 41 conducts processing for displaying a normal effect image (for example, a normal effect image 94*a*). In the present embodiment, the normal effect image 94 is continuously displayed since before the spin button 23 is set to ON and, after the spin button 23 is set to ON, a different normal effect image 94 is displayed. Also, in the present invention, the normal effect image 94 may be displayed after the spin button 23 is set to ON.

Next, the main CPU 41 conducts to-be-stopped symbol determination processing (step S207). In the to-be-stopped symbol determination processing, the main CPU 41 executes a to-be-stopped symbol determination program stored in the RAM 43 (storage device) to determine the Code Nos. of symbols to be stop-displayed when the respective reels 14 are stopped. Thus, the combination of symbols to be stop-displayed is determined. This processing will be described in more detail later, with reference to FIG. 22 and FIG. 25. Further, in the present embodiment, there will be described a case where a combination of symbols to be stop-displayed is determined to determine a single combination out of a plurality of types of winning combinations. However, in the present invention, for example, a single combination to be selected out of a plurality of types of winning combinations may be determined at random using random numbers and, thereafter, a combination of symbols to be stop-displayed may be determined on the basis of the aforementioned winning combination.

Next, the main CPU 41 conducts reel rotation control processing (step S208). This processing is processing for starting the rotation of all the reels 14 and then stopping the rotation of the respective reels such that the combination of symbols corresponding to the winning combination determined in step S207 is stop-displayed along a pay line L. This processing will be described in more detail later with reference to FIGS. 23 to 25. Next, the main CPU 41 displays, to the lower image display panel 16, an effect image corresponding to the symbols or the combination of symbols which has been stop-displayed (step S209).

Next, the main CPU 41 determines whether or not a jackpot trigger has been established (step S220). When the main CPU 41 determines that a jackpot trigger has been established, then the main CPU 41 selects anyone of four jackpots "GRAND", "MAJOR", "MINOR" and "MINI" using random numbers and pays out a number of coins defined for the jackpot (step S221). In the case of storing the coins, the main CPU 41 conducts processing for adding the number of credits stored in the RAM 43. On the other hand, in the case of paying out the coins, the main CPU 41 conducts processing for transmitting a control signal to the hopper 66 so as to pay out a predetermined number of coins. At this time, the coin detecting portion 67 counts the number of coins paid out from the hopper 66 and, when the number counted reaches a specified value, transmits a payout end signal to the main CPU 41. Thus, the main CPU 41 stops driving the hopper 66 to end the coin payout processing. Thereafter, the present subroutine ends.

On the other hand, when the main CPU 41 determines in step S220 that no jackpot trigger has been established, then the main CPU 41 determines whether or not a winning combination has been established along any of the pay lines L (step S222). When the main CPU 41 determines that no winning combination has been established along any of the pay lines L, the main CPU 41 ends the present subroutine.

On the other hand, when the main CPU 41 determines that a winning combination has been established along any of the pay lines L, the main CPU 41 determines an amount of a payout for each of the pay lines L along which the winning combination has been established (step S223). More specifically, the main CPU 41 determines a value obtained by multiplication of the value of BETTING for each pay line L determined in step S204 by the payout rate defined for each winning combination (see FIG. 3), as the amount of the payout for each of the pay lines L.

Next, the main CPU 41 sums up the amounts of the payouts for the respective pay lines L determined in step S223 to determine an amount of an expected payout for this game (step S224).

Subsequently, the main CPU 41 determines the decimal fraction part of the amount of the expected payout determined in step S224, as a fractional value (step S225).

Then, the main CPU 41 conducts processing for paying out, to the player, coins in amount obtained by subtraction of the fractional value determined in step S225 from the amount of the expected payout determined in step S224 (step S226).

Next, the main CPU 41 determines whether or not the fractional value determined in step S225 is 0 (step S227). When the main CPU 41 determines that the fractional value is 0, then the main CPU 41 ends the present subroutine. On the other hand, when the main CPU 41 determines that the fractional value is not 0, the main CPU 41 shifts the processing to step S228.

In step S228, the main CPU 41 conducts processing for adding the number of games which have resulted in a fractional value by one. Namely, the main CPU 41 sets the value of the accumulative-number-of-games-resulting-in-fractional-value T to T=T+1.

Next, the main CPU 41 determines whether or not the value of T has reached a predetermined value (20, in the present embodiment), namely whether or not the number of games resulting in a fractional value has reached 20 (step S229). When the value of T has reached the predetermined value, the main CPU 41 shifts the processing to step S230.

In step S230, the main CPU 41 sets an insurance-mode flag stored in the RAM 43 to "ON" to shift the mode to the insurance mode.

The main CPU 41 then sets the number-of-games C to zero (the number-of-games C=0) in the data storage area showing the number-of-games C which is provided in the RAM 43, and starts counting the number of games (step S231).

Subsequently, the main CPU 41 displays the insurance mode images shown in [P03] (see FIG. 6) to the upper image display panel 33 and the lower image display panel 16 (step S232). The insurance mode image includes the image 93 showing the number of games left to be played until the number of games to be counted reaches the specific number, and some other images.

When the main CPU 41 has conducted the processing in step S232 or when the main CPU 41 determines in step S229 that the value of T has not reached the predetermined value, the main CPU 41 conducts processing for adding the fractional value determined in step S225 to the accumulative fractional value stored in the RAM 43 (step S233).

Next, the main CPU 41 determines whether or not the total sum of fractional values has reached a predetermined value (10 credits, in the present embodiment) (step S234). When the main CPU 41 determines that the total sum of fractional values has reached the predetermined value, the main CPU 41 shifts to step S235.

In step S235, the main CPU 41 sets the insurance-mode flag stored in the RAM 43 to "ON" to shift the mode to the insurance mode.

Next, the main CPU 41 sets the number-of-games C to 0 and starts counting of the number of games, in the storage area for data indicative of the number-of-games C which is provided in the RAM 43 (step S236).

Next, the main CPU 41 displays insurance-mode images illustrated in [P03] (see FIG. 6), to the upper image display panel 33 and the lower image display panel 16 (step S237). The insurance-mode images include an image 93 indicative of the number of remaining games to be counted until the number of counted games reaches the specific number, and the like.

When the main CPU 41 has conducted the processing in step S237 or when the main CPU 41 determines in step S234 that the total sum of fractional values has not reached the predetermined value, the main CPU 41 ends the present subroutine.

As described above, in the present embodiment, the condition required for shifting the mode to the insurance mode is the condition that the total sum of fractional values reaches the predetermined value or the condition that the number of games which have resulted in a fractional value reaches the predetermined value. However, in the present invention, the condition required for shifting the mode to the insurance mode is not limited to the case. For example, the mode may be shifted to the insurance mode only at the moment when the total sum of fractional values reaches the predetermined value. Also, the mode may be shifted to the insurance mode only at the moment when the number of games which have resulted in a fractional value reaches the predetermined value. Further, the condition required for shifting the mode to the insurance mode may be the condition that the total sum of fractional values reaches the predetermined value and also the number of games which have resulted in a fractional value reaches the predetermined number.

Further, in the present embodiment, the mode is automatically shifted to the insurance mode without a player's operation, when the condition required for shifting the mode to the insurance mode is satisfied. However, in the present invention, the player is allowed to perform a certain operation, upon shifting the mode to the insurance mode. For example, the player may be allowed to select shifting or not shifting the mode to the insurance mode, at the moment when the condition required for shifting the mode to the insurance mode is satisfied. In the case of employing the aforementioned configuration, when the player selects not shifting the mode to the insurance mode, N coins (N is a largest natural number which satisfies the relationship: the accumulative fractional value $\geqq$N credits, for example) may be paid out to the player, out of the accumulatively-stored fractional value.

As described above, in the present invention, it is possible to employ a configuration which allows the player to perform an operation for paying out coins of the accumulatively-stored fractional value to the player. In the case of employing the aforementioned configuration, the timing when the player may perform an operation for paying out coins of the fractional value is not limited to the timing when the condition required for shifting the mode to the insurance mode as described above is satisfied. For example, it is possible to employ a configuration in which, every time the total sum of fractional values reaches one credit, the player is allowed to perform an operation for paying out coins of the fractional value.

[Game Execution Processing B (Insurance Mode/Before Reaching of Notice Set Value)]

Figure 16:
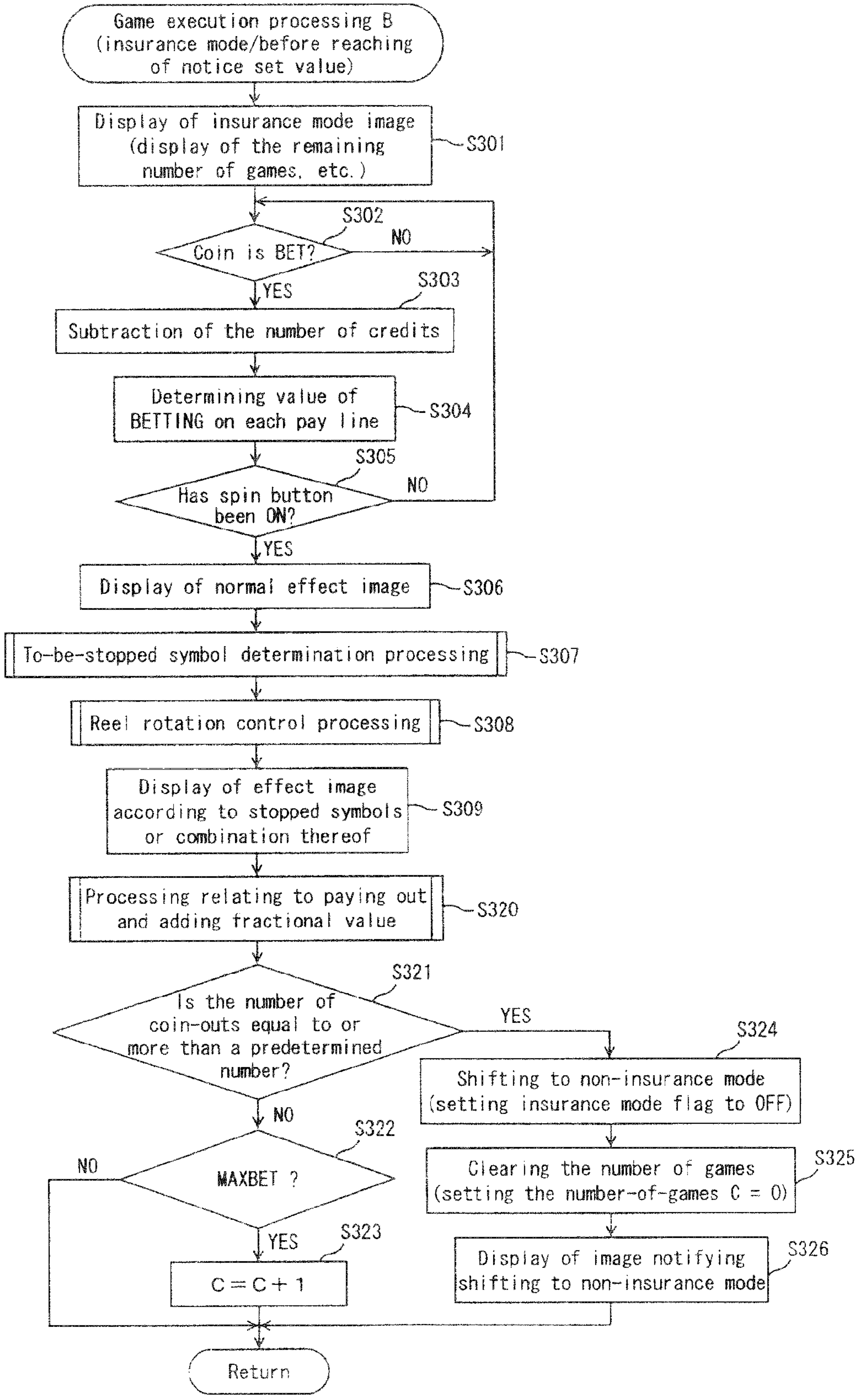
FIG. 16 is a flowchart showing a subroutine of game execution processing B (insurance mode/before reaching of notice set value).

FIG. 16 is a flowchart showing a subroutine of the game execution processing B which is called and executed in step S300 of the subroutine shown in FIG. 14.

First, the main CPU 41 conducts processing for displaying the insurance mode image (see [P03 in FIG. 6]) to the upper image display panel 33 and the lower image display panel 16 (step S301).

Subsequently, processing of steps S302 to S308 are conducted, and the processing are similar to the processing of steps S202 to S208 shown in FIG. 15.

Next, the main CPU 41 displays to the lower image display panel 16 an effect image (see [P04], [P05] in FIG. 6) according to stop-displayed symbols or a combination thereof (step S309).

Next, the main CPU 41 conducts processing relating to paying out and adding the fractional value (step S320).

Hereinafter, the processing relating to paying out and adding the fractional value will be described.

Figure 17:
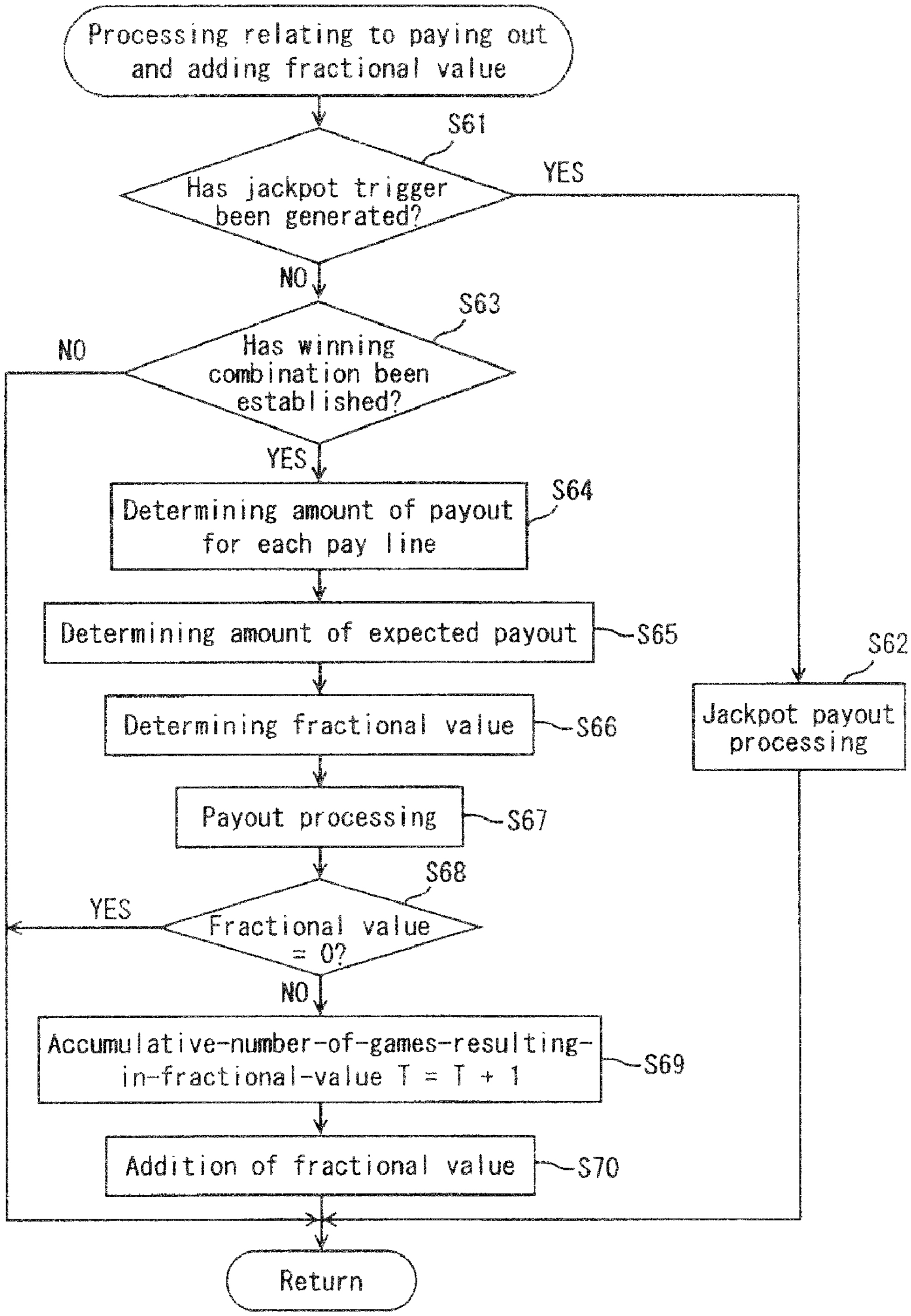
FIG. 17 is a flowchart showing a subroutine of processing relating to paying out and adding fractional values.

FIG. 17 is a flowchart illustrating the subroutine of the processing relating to paying out and adding the fractional value.

First, the main CPU 41 determines whether or not a jackpot trigger has been established (step S61). When the main CPU 41 determines that a jackpot trigger has been established, then the main CPU 41 conducts jackpot payout processing (step S62). After conducting the processing in step S62, the main CPU 41 ends the present subroutine.

On the other hand, when the main CPU 41 determines in step S61 that no jackpot trigger has been established, then the main CPU 41 determines whether or not a winning combination has been established along any of the pay lines L (step S63). When the main CPU 41 determines that no winning combination has been established any of the pay lines L, the main CPU 41 ends the present subroutine.

When the main CPU 41 determines that a winning combination has been established along any of the pay lines L, the main CPU 41 determines an amount of a payout for each of the pay lines L along which the winning combination has been established (step S64).

Next, the main CPU 41 sums up the amounts of the payouts for the respective pay lines L determined in step S64 to determine an amount of an expected payout for this game (step S65).

Subsequently, the main CPU 41 determines the decimal fraction part of credits of the amount of the expected payout determined in step S65, as a fractional value (step S66).

Then, the main CPU 41 conducts processing for paying out, to the player, coins of the value obtained by subtraction of the fractional value determined in step S66 from the amount of the expected payout determined in step S65 (step S67).

Next, the main CPU 41 determines whether or not the fractional value determined in step S66 is 0 (step S68). When the main CPU 41 determines that the fractional value is 0, then the main CPU 41 ends the present subroutine. On the other hand, when the main CPU 41 determines that the fractional value is not 0, the main CPU 41 shifts the processing to step S69.

In step S69, the main CPU 41 sets the value of the accumulative-number-of-games-resulting-in-fractional-value T, which is stored in the RAM 43, to T=T+1.

Next, the main CPU 41 conducts processing for adding the fractional value determined in step S66 to the accumulative fractional value stored in the RAM 43 (step S70).

After conducting the processing in step S70, the main CPU 41 ends the present subroutine.

After conducting the processing relating to paying out and adding the fractional value in step S320 in FIG. 16, the main CPU 41 determines whether or not the number of coin-outs in step S320 (step S62 or step S67) is equal to or more than a predetermined number (180, in the present embodiment) (step S321).

In step S330, when determining that the number of coin-outs is equal to or more than the predetermined number, the main CPU 41 sets the insurance mode flag stored in the RAM 43 to "OFF", to shift the mode to the non-insurance mode (step S324).

Next, in the storage area of data showing the number-of-games C which is provided in the RAM 43, the main CPU 41 sets the number-of-games C to zero (C=0) so as to clear the number of games (step S325).

Subsequently, the main CPU 41 displays, to the lower image display panel 16, the image 98 (see [P17] in FIG. 12) showing that the mode has been shifted from the insurance mode to the non-insurance mode (step S326), and ends the present subroutine.

When the main CPU 41 determines in step S321 that the number of coin-outs is less than the predetermined number, the main CPU 41 determines whether or not the current game is a game with a MAXBET (step S322). When the main CPU 41 determines that the current game is not a game with a MAXBET, the main CPU 41 ends the present subroutine.

When the main CPU 41 determines that the current game is a game with a MAXBET, the main CPU 41 increments the number-of-games C stored in the RAM 43 (C=C+1) (step S323). After conducting the processing in step S323, the main CPU 41 ends the present subroutine.

[Game Execution Processing C (Insurance Mode/After Reaching of Notice Set Value)]

Figure 18:
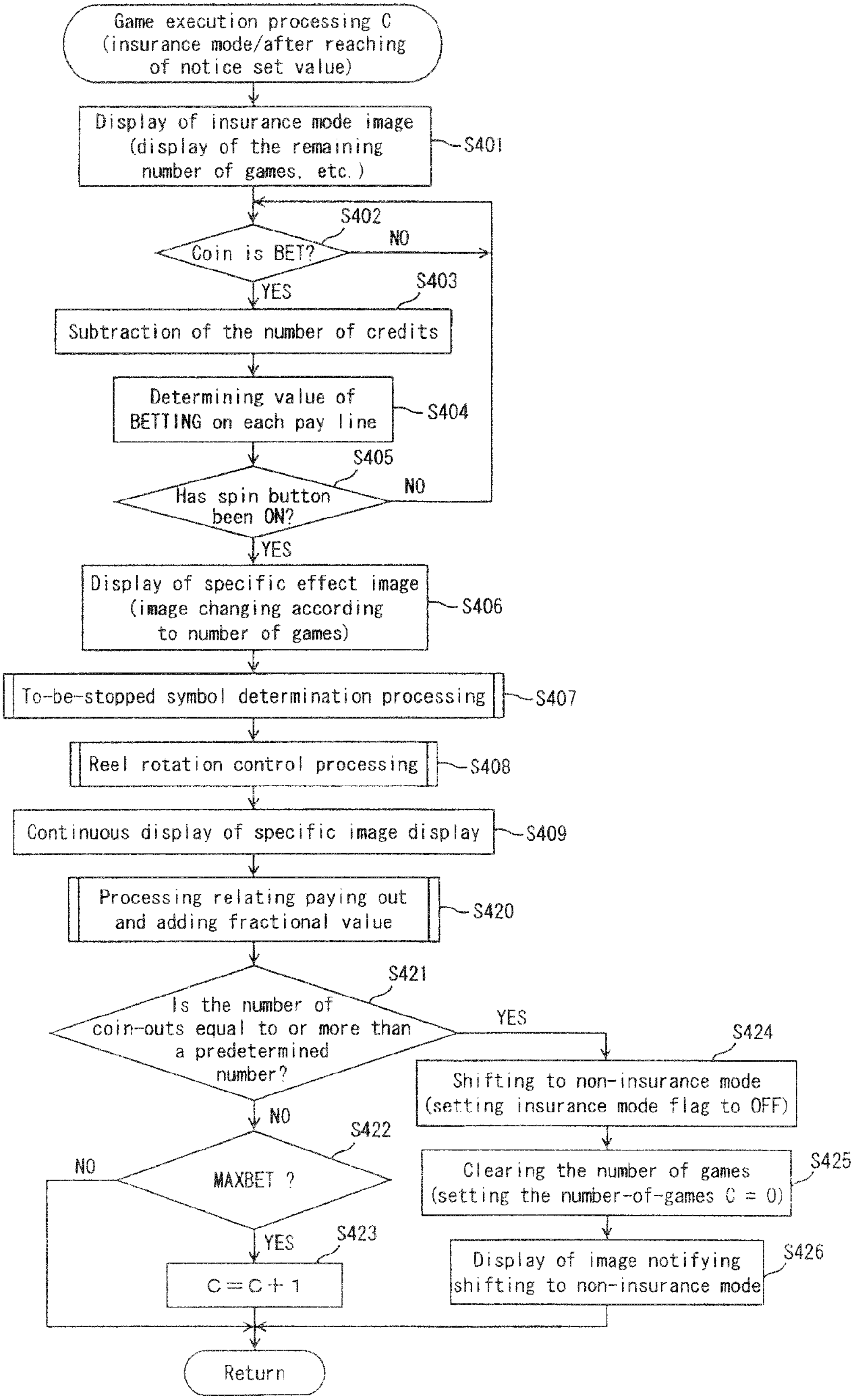
FIG. 18 is a flowchart showing a subroutine of game execution processing C (insurance mode/after reaching of notice set value).

FIG. 18 is a flowchart showing a subroutine of the game execution processing C which is called and executed in step S400 of the subroutine shown in FIG. 14.

First, the main CPU 41 conducts processing for displaying the insurance mode image to the upper image display panel 33 and the lower image display panel 16 (step S401).

Subsequently, processing of steps S402 to S405 are conducted, and the processing of those steps is similar to the processing of steps S202 to S205 shown in FIG. 15.

Next, the main CPU 41 displays specific effect images 95*a* to 95*i* (see [P06] to [P14] in FIGS. 7 to 10) to the lower image display panel 16 (step S406).

As described above, the specific effect image 95 is a video picture of an action of an angel as a character who appears and spreads her wings, and the specific effect images 95*a* to 95*j* are made by dividing the specific effect image 95 into a plurality of images along the time axis.

Therefore, with increase in number of games, the action of the angel as the character who appears and gradually spreads her wings is displayed by the specific effect image 95.

Subsequently, processing for steps S407 and S408 are performed, and the processing of these steps is similar to the processing of steps S207 and S208 shown in FIG. 15.

After the processing of step S408, the main CPU 41 conducts processing for continuously displaying the specific effect image 95 even after rotation of the reels 14 has been stopped (step S409).

It is to be noted that, in the processing shown in FIG. 18, when symbols or a combination thereof, accompanied by coin-outs, is established, the main CPU 41 does not display the effect image 94*e* which is displayed according to the symbols or the combination thereof as shown in [P18] (see FIG. 13). In place of that, the main CPU 41 displays the image 97*c* showing the number of coin-outs according to the symbols or the combination thereof while displaying the specific effect image 95 as shown in [P19] (see FIG. 13).

Subsequently, steps S420 to S426 are conducted, and the processing of these steps are similar to the processing of steps S320 to S326 shown in FIG. 15, respectively.

[Game Execution Processing D (Insurance Mode/at Reaching of Specific Number)]

Figure 19:
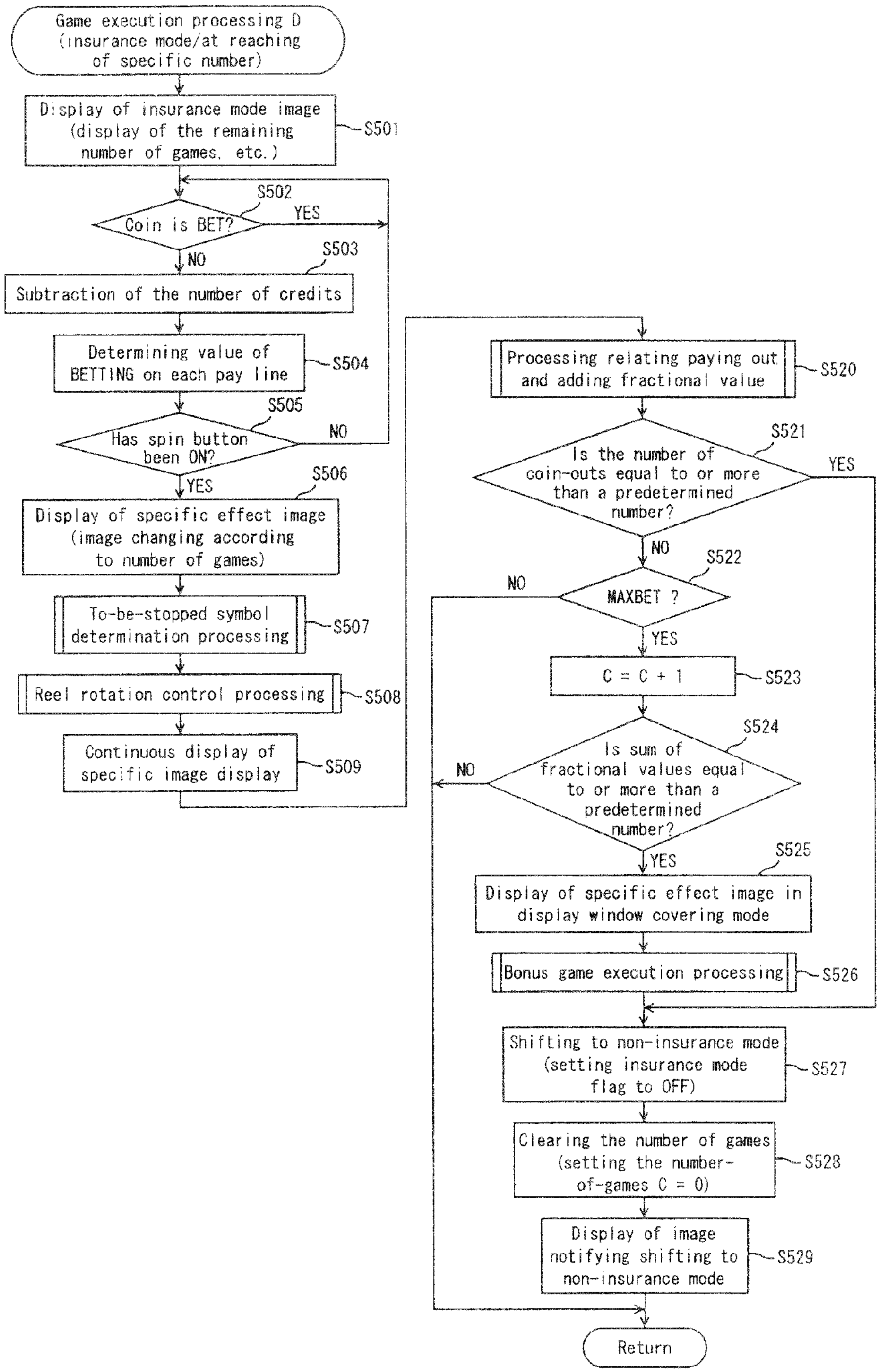
FIG. 19 is a flowchart showing a subroutine of game execution processing D (insurance mode/at reaching of a specific number).

FIG. 19 is a flowchart showing a subroutine of the game execution processing D which is called and executed in step S500 of the subroutine shown in FIG. 14.

First, the main CPU 41 conducts processing for displaying the insurance mode image to the upper image display panel 33 and the lower image display panel 16 (step S501).

Subsequently, processing of steps S502 to S505 are conducted, and the processing of these steps is similar to the processing of steps S202 to S205 shown in FIG. 15.

Next, the main CPU 41 displays a specific effect image 95*j* (see [P15] in FIG. 11) to the lower image display panel 16 (step S506).

The specific effect image 95*j* has contents continued from the specific effect images 95*a* to 95*i*, and displays an action of the angel as the character having spread her wings.

Subsequently, processing of steps S507 to S508 is conducted, and the processing of these steps is similar to the processing of steps S207 to S208 shown in FIG. 15.

After the processing of step S508, the main CPU 41 conducts processing for continuously displaying the specific effect image 95*j* even after rotation of the reels 14 has stopped (step S509).

It is to be noted that in the processing shown in FIG. 19, as in FIG. 18, when symbols or a combination thereof, accompanied by coin-outs, is established, the main CPU 41 displays the image 97*c* showing the number of coin-outs according to the symbols or the combination thereof while displaying the specific effect image 95 as shown in [P19] (see FIG. 13).

Next, the main CPU 41 conducts processing relating to paying out and adding the fractional value, which has been described with reference to FIG. 17 (step S520).

Next, the main CPU 41 determines whether or not the number of coin-outs in step S520 (step S62 or step S67) is equal to or more than the predetermined number (180, in the present embodiment) (step S521). When the main CPU 41 determines that the number of coin-outs is equal to or more than the predetermined number, then the main CPU 41 shifts the processing to step S527. On the other hand, when the main CPU 41 determines that the number of coin-outs is less than the predetermined number, then the main CPU 41 shifts the processing to step S522.

In step S522, the main CPU 41 determines whether or not the current game is a game with a MAXBET.

When the main CPU 41 determines that the current game is not a game with a MAXBET, the main CPU 41 ends the present subroutine.

On the other hand, when the main CPU 41 determines that the current game is a game with a MAXBET, the main CPU 41 increments the number-of-games C stored in the RAM 43 (C=C+1) (step S523).

Next, the main CPU 41 determines whether or not the total sum of fractional values is equal to or more than the predetermined value (360 credits, in the present embodiment), namely whether or not the accumulative fractional value stored in the RAM 43 is equal to or more than 360 credits (step S524).

When the main CPU 41 determines that the total sum of fractional values is less than the predetermined value, the main CPU 41 ends the present subroutine.

On the other hand, when the main CPU 41 determines that the total sum of fractional values is equal to or more than the predetermined value, the main CPU 41 displays the images illustrated in [P16], to the upper image display panel 33 and the lower image display panel 16 (step S525).

Namely, the upper image display panel 33 displays an image 97*a* indicative of shifting the game to bonus games on the basis of the fact that the number of games in the insurance mode has reached the predetermined number, and also, the lower image display panel 16 displays a similar image 97*b* at its lower left portion.

Moreover, the specific effect image 95*h* with contents continued from the specific effect images 95*a* to 95*j* is displayed to the lower image display panel 16. Furthermore, the specific effect image 95*h*' is displayed in the display windows 15 (15L, 15C, 15R).

Next, the main CPU 41 conducts bonus execution processing (step S526). The bonus execution processing will be described in more detail later, with reference to FIG. 20.

After conducting the bonus execution processing, the main CPU 41 sets the insurance-mode flag to "OFF" to shift the mode to the non-insurance mode (step S527).

Next, in the storage area of data showing the number-of-games C which is provided in the RAM 43, the main CPU 41 sets the number-of-games C to zero (C=0) so as to clear the number of games (step S528)

Subsequently, the main CPU 41 displays, to the lower image display panel 16, the image 98 (see [P17] in FIG. 12) showing that the mode has been shifted from the insurance mode to the non-insurance mode (step S529).

After conducting the processing of step S529, the main CPU 41 ends the present subroutine.

Subsequently, the bonus execution processing will be described using FIG. 20.

Figure 20:
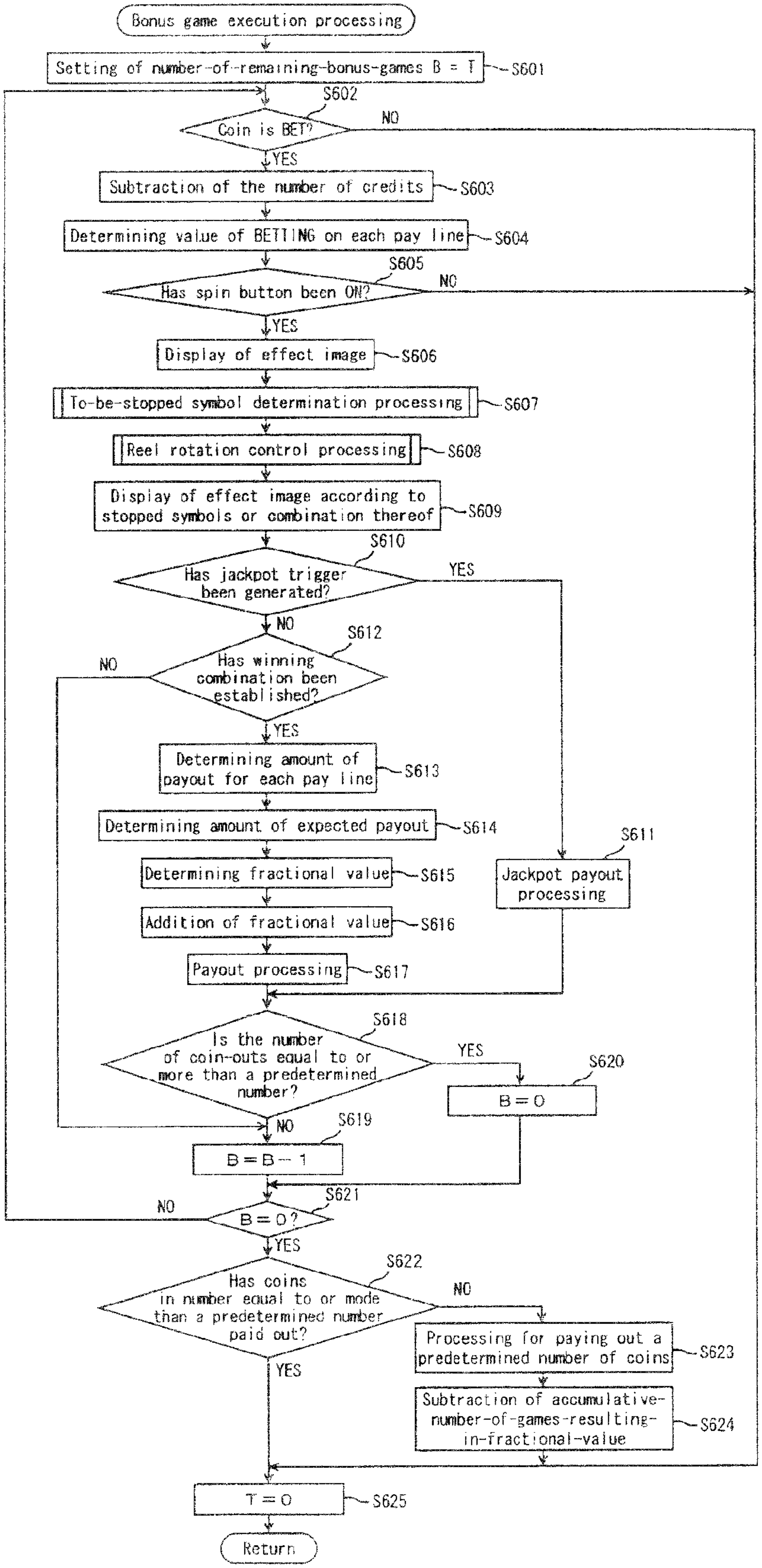
FIG. 20 is a flowchart showing the subroutine of bonus-game execution processing.

FIG. 20 is a flowchart illustrating the subroutine of the bonus execution processing.

First, the main CPU 41 sets the number-of-remaining-bonus-games B to B=T (step S601). In this case, the value of T is the value of the accumulative-number-of-games-resulting-in-fractional-value which is stored in the RAM 43, as the number of games which have resulted in a fractional value.

As described above, in the present embodiment, the number of bonus games to be executed equals to the number of games which have resulted in a fractional value, at a maximum. However, in the present invention, the number of bonus games is not limited to the case. For example, the number of bonus games may be determined such that it is proportional to the number of games which have resulted in a fractional value or may be preliminarily determined independently of the number of games which have resulted in a fractional value.

Next, the main CPU 41 determines whether or not coins have been BET (step S602). When the main CPU 41 determines that no coin has been BET for a predetermined time period, the main CPU 41 ends the present subroutine.

On the other hand, when the main CPU 41 determines in step S602 that coins have been BET, the main CPU 41 conducts processing for subtracting the number of credits stored in the RAM 43, according to the number of coins BET (step S603).

Next, the main CPU 41 determines the value of BETTING on each pay line L (step S604).

Next, the main CPU 41 determines whether or not the spin button 23 has been set to ON (step S605). When the main CPU 41 determines that the spin button 23 has not been set to ON for a predetermined time period, the main CPU 41 ends the present subroutine.

On the other hand, when the main CPU 41 determines in step S605 that the spin button 23 has been set to ON, the main CPU 41 conducts processing for displaying an effect image (for example, a normal effect image 94*a*) (step S606).

Subsequently, the main CPU 41 conducts processing of steps S607 to S609, which are the same as the processing of steps S207 to S209 illustrated in FIG. 15.

After conducting the processing in step S609, the main CPU 41 determines whether or not a jackpot trigger has been established (step S610). When the main CPU 41 determines that a jackpot trigger has been established, then the main CPU 41 conducts jackpot payout processing (step S611). After conducting the processing in step S611, the main CPU 41 shifts the processing to step S618.

On the other hand, when the main CPU 41 determines in step S610 that no jackpot trigger has been established, the main CPU 41 determines whether or not a winning combination has been established along any of the pay lines L (step S612).

When the main CPU 41 determines that no winning combination has been established along any of the pay lines L, the main CPU 41 shifts the processing to step S619.

On the other hand, when the main CPU 41 determines that a winning combination has been established along any of the pay lines L, the main CPU 41 determines an amount of a payout for each of the pay lines L along which the winning combination has been established (step S613).

Next, the main CPU 41 sums up the amounts of the payouts for the respective pay lines L determined in step S613 to determine an amount of an expected payout for this game (step S614).

Subsequently, the main CPU 41 determines the decimal fraction part of the amount of the expected payout determined in step S614, as a fractional value (step S615).

Next, the main CPU 41 conducts processing for adding the fractional value determined in step S615 to the accumulative fractional value stored in the RAM 43 (step S616).

Then, the main CPU 41 conducts processing for paying out, to the player, coins of the value obtained by subtraction of the fractional value determined in step S615 from the amount of the expected payout determined in step S614 (step S617).

Next, the main CPU 41 determines whether or not the number of coin-outs in step S611 or step S617 is equal to or more than a predetermined number (360, in the present embodiment) (step S618). When the main CPU 41 determines that the number of coin-outs is equal to or more than the predetermined number, the main CPU 41 sets the value of the number-of-remaining-bonus-games B to B=0 (step S620).

Namely, in the present embodiment, in the event of the occurrence of a game in which the number of coin-outs is equal to or more than 360 during a period of bonus games, the bonus games ends with the current game. However, in the present invention, it is not necessarily necessary that a condition that coins in number equal to or more than a certain number have been paid out is employed, as the condition required for ending bonus games.

After conducting the processing in step S620, the main CPU 41 shifts the processing to step S621.

When the main CPU 41 determines in step S618 that the number of coin-outs is less than the predetermined number or when the main CPU 41 determines in step S610 that no winning combination has been established along any of the pay lines L, the main CPU 41 sets the value of the number-of-remaining-bonus-games B to B=B−1.

After conducting the processing in step S619 or step S620, the main CPU 41 determines whether or not the value of the-number-remaining-bonus-games B is 0 (step S621). When the main CPU 41 determines that the value of B is not 0, the main CPU 41 shifts the processing to step S602.

On the other hand, when the main CPU 41 determines that the value of B is 0, the main CPU 41 determines whether or not the total number of coin-outs during a period of bonus games, which is stored in the RAM 43, is equal to or more than a predetermined number (360, in the present embodiment). When the main CPU 41 determines that the total number of coin-outs during the bonus-game time interval is less than the predetermined number, the main CPU 41 conducts processing for paying out coins in number obtained by subtraction of the total number of coin-outs during the period of bonus games from this predetermined value (step S623). The resource for payout performed in this case is the accumulatively-stored fractional value. The processing in step S623 corresponds to processing for paying out, to the player, game media in number corresponding to the accumulatively-added fractional value according to the present invention.

Further, in the present embodiment, in the payout processing which is conducted in step S611, step S617 and step S623, coins are actually paid out from the hopper 66, rather than credits are accumulatively added to the credits stored in the RAM 43. However, in the present invention, the payout processing may be conducted by accumulatively adding credits to the credits stored in the RAM.

After conducting the processing in step S623, the main CPU 41 conducts processing for subtracting the value of coin-outs in step S623 from the accumulative fractional value stored in the RAM 43 (step S624).

When the main CPU 41 has conducted the processing in step S624 or when the main CPU 41 determines in step S622 that the total number of coin-outs during the period of bonus games is equal to or more than the predetermined number, the main CPU 41 sets the accumulative-number-of-games-resulting-in-fractional-value stored in the RAM 43 to T=0. Thereafter, the main CPU 41 ends the present subroutine.

In the present embodiment, when the total number of coin-outs during the period of bonus games is less than the predetermined number, coins in number equal to the number by which the total number of coin-outs is smaller than the predetermined number are paid out, at the end of bonus games. Namely, the minimum number of coins to be paid out during bonus games is set to a predetermined number. However, in the present invention, it is not necessarily necessary that the minimum number of coins to be paid out during bonus games is the predetermined number. For example, the minimum number of coins to be paid out during bonus games may be determined on the basis of the accumulatively-stored fractional value. In this case, the minimum number of coins to be paid out may be N (N is a largest natural number which satisfies the relationship: the accumulative fractional value ≧N credits).

Also, in cases where there is a fractional value accumulated before the player playing bonus games starts games, the minimum number of coins to be paid out during bonus games may be determined on the basis of the sum of this fractional value and the fractional value which has been accumulated in games played by the player.

In the aforementioned example, the resource for a minimum number of coins to be paid out during bonus games is the accumulatively-stored fractional value. However, in the present invention, in the case of employing the accumulative fractional value as the resource for coins to be paid out during bonus games, there is no particular limitation on the objects for which payout is performed using the accumulative fractional value. For example, the accumulative fractional value may be employed as the resource for a payout based on the establishment of a winning combination and a jackpot.

Further, in the aforementioned example, it is ensured that at least a certain number of coins are paid out during bonus games. However, in the present invention, it is not necessarily necessary to ensure that a certain number of coins are paid out. Namely, the slot machine may be configured not to conduct the processing in step S622 and step S623 in FIG. 20 according to the present embodiment.

Further, in bonus games according the present embodiment, the payout rates are set to be twice the payout rates defined for normal games (games other than bonus games). However, there is no particular limitation on bonus games according to the present invention, provided that the bonus games are games advantageous for the player. For example, bonus games according to the present invention may be games which allow the player to acquire the greater number of game media than in normal games, games which allow the player to acquire game media with higher probabilities than in normal games, games which require the player to consume the smaller number of game media than in normal games, and the like. More specifically, exemplary bonus games are free games, second games, mystery games and the like.

[Activation Processing]

Figure 21:
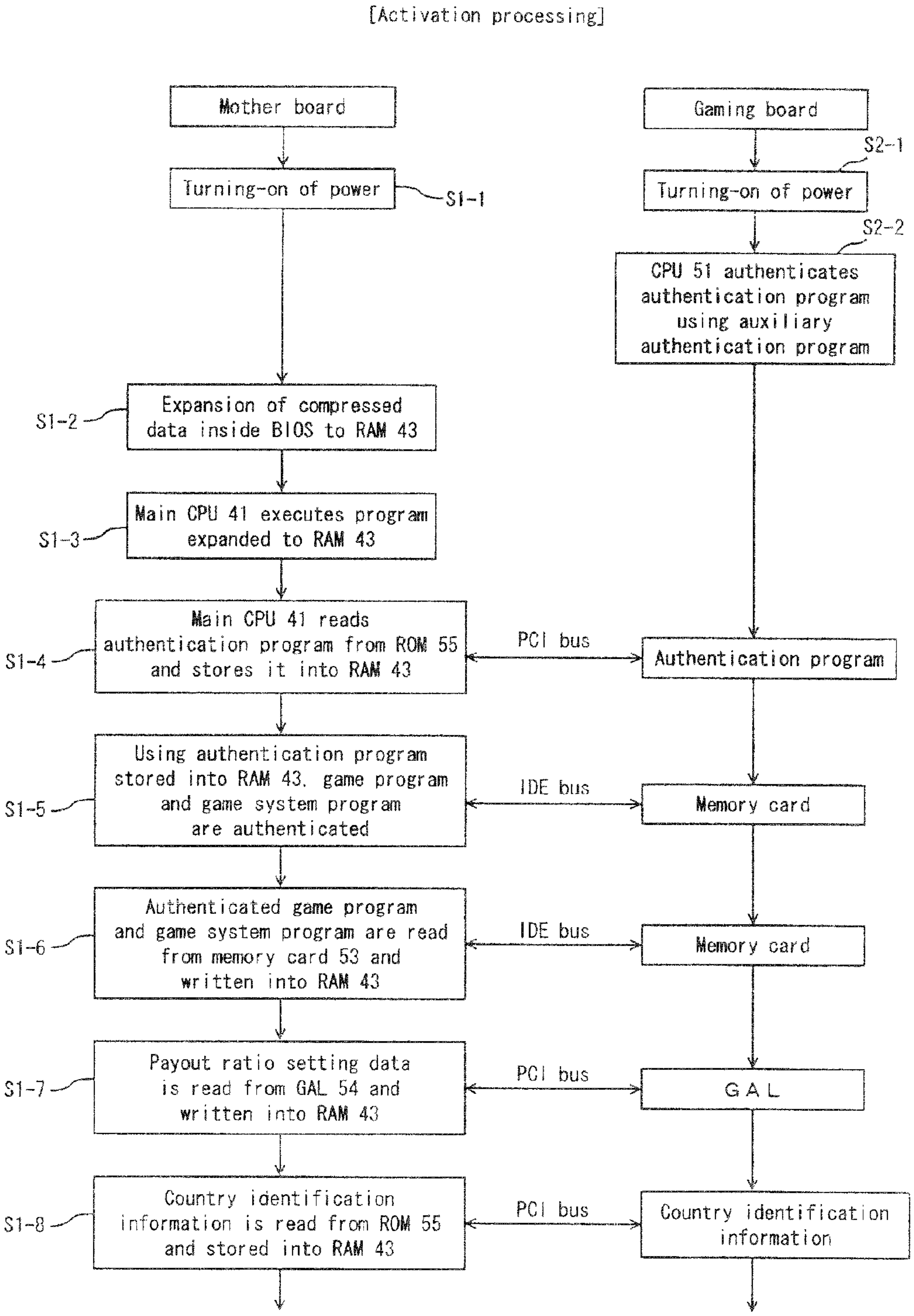
FIG. 21 is a chart showing a procedure of activation processing conducted by the mother board and the gaming board shown in FIG. 2

FIG. 21 is a flowchart showing a procedure called and executed in step S101 of the flowchart shown in FIG. 13. This activation processing is the processing conducted by the mother board 40 and the gaming board 50. It should be noted that the memory card 53 is inserted into the card slot 53S in the gaming board 50, and the GAL 54 is mounted onto an IC socket 54S.

First, when a power switch is turned on (power is turned on) in the power supply unit 45, the mother board 40 and the gaming board 50 are activated (steps S1-1, S2-1). Inactivation of the mother board 40 and the gaming board 50, respective individual processing is executed in parallel. Namely, in the gaming board 50, the CPU 51 reads the auxiliary authentication program stored in the boot ROM 52, and conducts auxiliary authentication according to the read auxiliary authentication program, to previously check and prove that the authentication program is not falsified before loading the program to the mother board 40 (step S2-2). Meanwhile, in the mother board 40, the main CPU 41 executes the BIOS stored in the ROM 42, and expands compressed data which is incorporated in the BIOS into the RAM 43 (step S1-2). The main CPU 41 then executes the BIOS expanded into the RAM 43 to diagnose and initialize a variety of peripheral devices (step S1-3).

Since the ROM 55 of the gaming board 50 is connected to the main CPU 41 via the PCI bus, the main CPU 41 reads the authentication program stored in the ROM 55, and stores the read authentication program into the RAM 43 (steps S1-4). At this time, according to the standard BIOS function of BIOS, the main CPU 41 takes a checksum by ADDSUM system (normal checking system) and stores the authentication program into the RAM 43, while conducting processing for confirming whether or not the storage is certainly conducted.

Next, after confirming what is connected to the IDE bus, the main CPU 41 accesses, via the IDE bus, the memory card 53 inserted in the card slot 53S, to read a game program or a game system program from the memory card 53. In this case, the main CPU 41 reads data constituting the game program and the game system program by 4 bytes. Subsequently, the main CPU 41 conducts authentication to check and prove that the read game program and game system program have not been falsified, following the authentication program stored in the RAM 43 (step S1-5). When this authentication processing is normally completed, the main CPU 41 writes and stores the game program and the game system program, which have been the authentication targets (which have been authenticated), into the RAM 43 (step S1-6). Next, the main CPU 41 accesses, via the PCI bus, the GAL 54 mounted on the IC socket 54S, reads payout ratio setting data from the GAL 54, and writes and stores the data into the RAM 43 (step S1-7). Subsequently, the main CPU 41 conducts processing for reading country identification information stored in the ROM 55 of the gaming board 50 via the PCI bus, and writes and stores the read country identification information into the RAM 43 (step S1-8).

After conducting the above-mentioned processing, the main CPU 41 sequentially reads and executes the game program and the game system program, to execute the processing shown in FIG. 13.

[To-be-Stopped Symbol Determination Processing]

Figure 22:
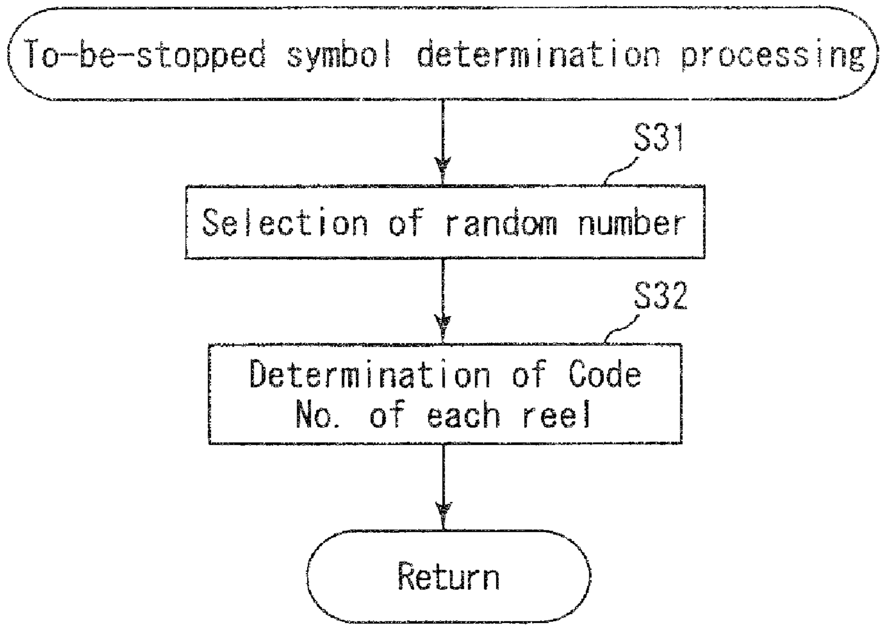
FIG. 22 is a flowchart showing a subroutine of to-be-stopped symbol determination processing.

FIG. 22 is a flowchart showing a subroutine of the to-be-stopped symbol determination processing called and executed in step S207 of the subroutine shown in FIG. 15. This is the processing conducted such that the main CPU 41 executes the to-be-stopped symbol determination program stored in the RAM 43.

First, the main CPU 41 executes a random number generation program included in the to-be-stopped symbol determination program, to select random numbers respectively corresponding to the three reels 14, out of the numbers falling in the numeric range of 0 to 255 (step S31). In the present embodiment, the case of generating random numbers on the program (the case of using a so-called software random number) is described. However, in the present invention, a random number generator may be provided and random numbers may be extracted from the random number generator (a so-called hardware random number may be used).

Next, the main CPU 41 (arithmetic processing unit) determines a code No. (see FIG. 23) of the respective reels 14 based on the selected three random numbers, by referring to symbol weighing data according to the payout ratio setting data outputted from GAL 54 and stored in the RAM 43 (storage device) (step S32). The code Nos. of the respective reels 14 correspond to code Nos. of symbols to be stop-displayed along the pay line L. It should be noted that later-described reel rotation control processing is conducted based on these code Nos. of the reels.

[Reel Rotation Control Processing]

Figure 23:
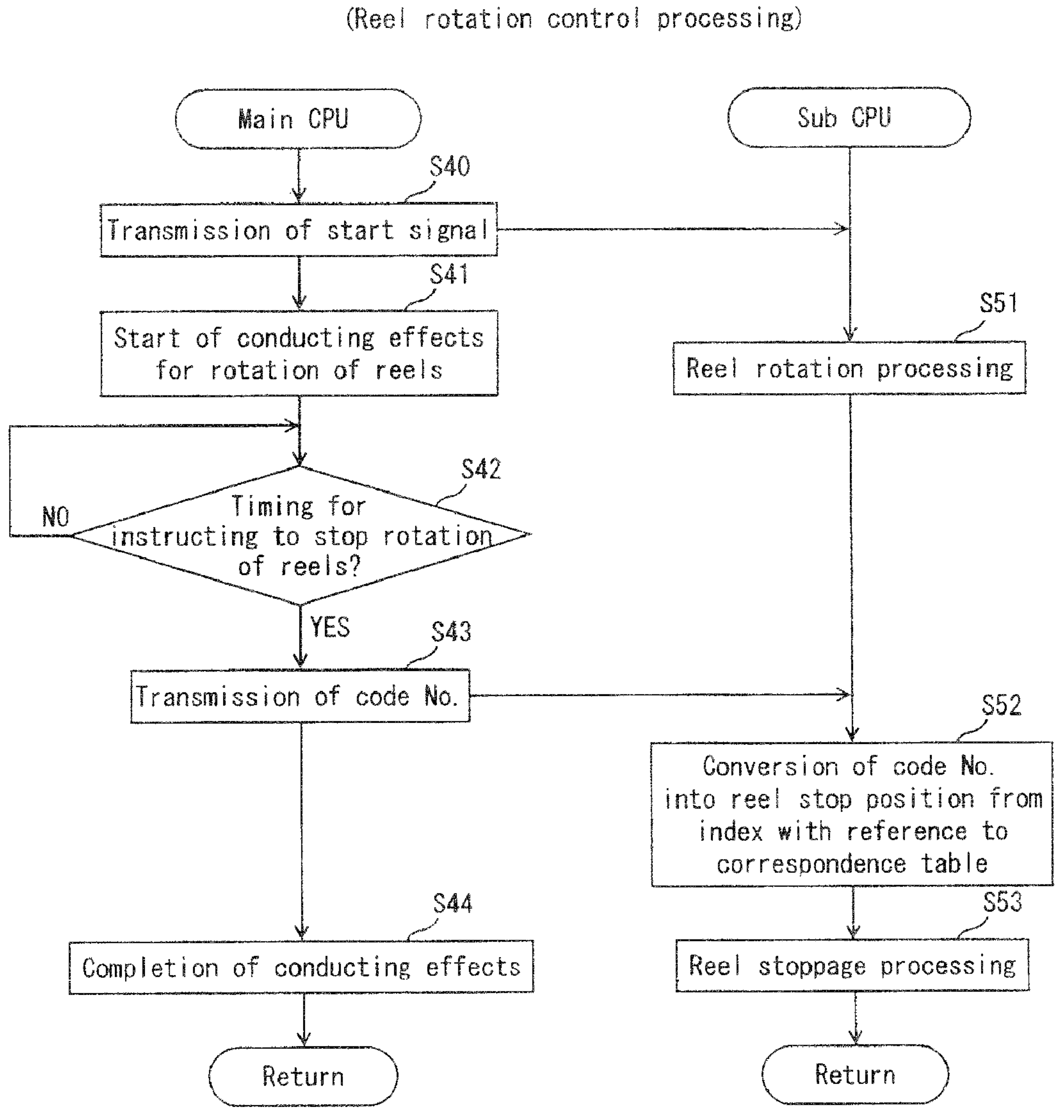
FIG. 23 is a flowchart showing a subroutine of reel rotation control processing.

FIG. 23 is a flowchart showing the reel rotation control processing called and executed in step S208 of the subroutine shown in FIG. 15A. It is to be noted that this is the processing conducted between the main CPU 41 and the sub CPU 61.

First, the main CPU 41 transmits to the sub CPU 61*a* start signal to start rotation of the reels (step S40). Upon receipt of the start signal from the main CPU 41, the sub CPU 61 conducts the reel rotation processing (step S51). In this processing, the sub CPU 61 supplies a pulse to the motor driving circuit 62. The pulse outputted from the sub CPU 61 is amplified by the driver 64, and then supplied to each of the stepping motors 70 (70L, 70C, 70R). This results in rotation of each of the stepping motors 70, along with which each of the reels 14 (14L, 14C, 14R) is rotated. In the one-two phase excitation stepping motor 70, a step angle is 0.9 degrees and the number of steps per rotation is 400. Therefore, when 400 pulses are supplied to the stepping motor 70, the reel 14 rotates one turn.

In starting rotation of the reels 14, the sub CPU 61 supplies a low frequency pulse to the motor driving circuit 62, and gradually increases the pulse frequency. Along with this, a rotational speed of the reels 14 increases. After a lapse of a predetermined period of time, the pulse frequency is made constant. This results in rotation of the reel 14 at a constant speed.

Here, the rotational operation of the reel 14 is described by using FIGS. 24A to 24D.

FIGS. 24A to 24D are side views for explaining the rotational operation of the reel 14.

Figure 24A:
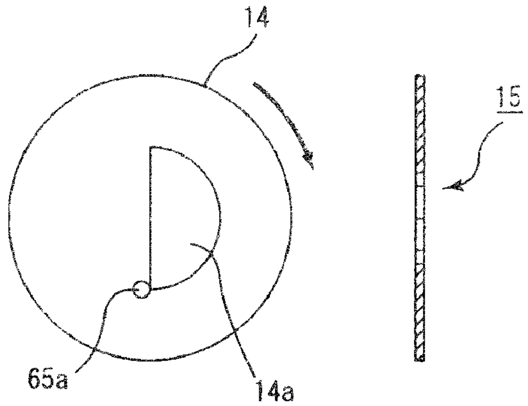
FIGS. 24A to 24D are side views for explaining the reel rotating operation.

As shown in FIG. 24A, a semicircular metal plate 14*a* is provided on the side face of the reel 14. The metal plate 14*a* is rotated along with the reel 14. Further, 22 symbols are provided on the peripheral face of the reel 14. Three symbols out of the 22 symbols drawn on the peripheral face of the reel 14 become visually identifiable via the display window 15 formed in front of the reel 14. In the figure, heavy-line arrows indicate the rotational direction of the reel 14. Further, an adjacent sensor 65*a* is provided on the side face of the reel 14. The adjacent sensor 65*a* is for detecting the metal plate 14*a*. The adjacent sensor 65*a* does not move or rotate along with rotation of the reel 14.

Figure 24B:
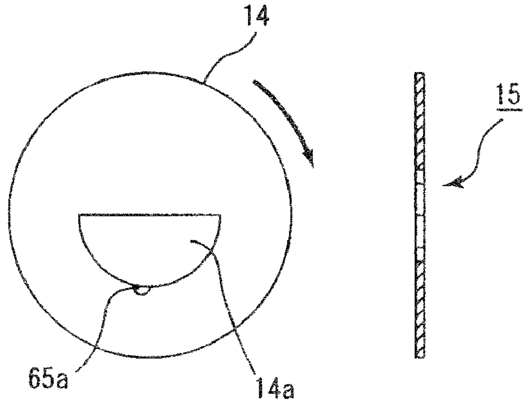
Figure 24C:
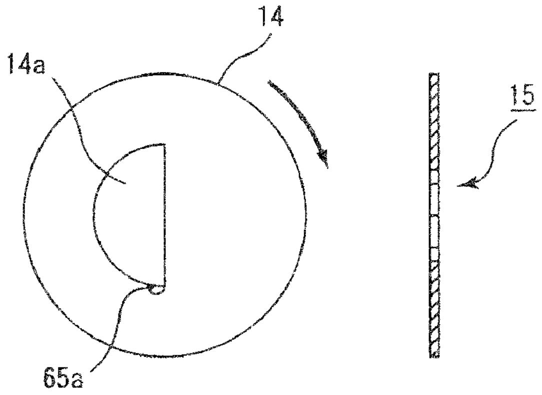

FIG. 24A shows a position (hereinafter also referred to as position A) of the metal plate 14*a* at the time point when the adjacent sensor 65*a* starts detecting the metal plate 14*a*. When the reel 14 rotates with the metal plate 14*a* located in the position A, the metal plate 14*a* moves to a position shown in FIG. 24B. FIG. 24B shows a position (hereinafter also referred to as position B) of the metal plate 14*a* when the adjacent sensor 65*a* is detecting the metal plate 14*a*. When the reel 14 rotates with the metal plate 14*a* located in the position B, the metal plate 14*a* moves to a position shown in FIG. 24C. FIG. 24C shows a position (hereinafter also referred to as position C) of the metal plate 14*a* at the time point when the adjacent sensor 65*a* stops detecting the metal plate 14*a*.

Figure 24D:
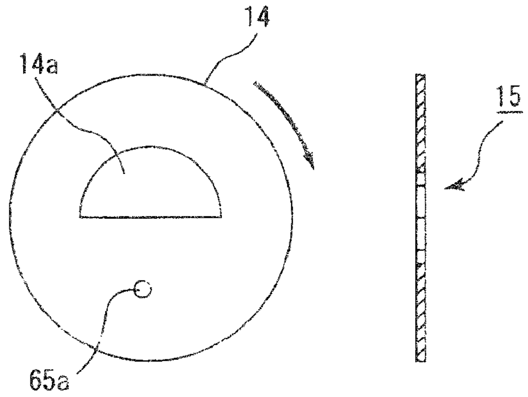

When the reel 14 rotates with the metal plate 14*a* located in the position C, the metal plate 14*a* moves to a position shown in FIG. 24D. FIG. 24D shows a position (hereinafter also referred to as position D) of the metal plate 14*a* when the adjacent sensor 65*a* is not detecting the metal plate 14*a*. When the reel 14 rotates with the metal plate 14*a* located in the position D, the metal plate 14*a* returns to the position A. As thus described, the position of the metal plate 14*a* changes sequentially from the position A, the position B, the position C, the position D, the position A, and so forth, along with rotation of the reel 14.

The adjacent sensor 65*a* constitutes the index detecting circuit 65 (see FIG. 2). Assuming that the state where the adjacent sensor 65*a* is detecting the metal plate 14*a* is referred to as "High" and the state where the adjacent sensor 65*a* is not detecting the metal plate 14*a* is referred to as "Low", the index detecting circuit 65 is in the "High" state when the metal plate 14*a* is located in the position A→the position B→the position C, and the index detecting circuit 65 is in the "Low" state when the metal plate 14*a* is located in the position C→the position D→the position A. It is to be noted that the sub CPU 61 identifies the rotational position of the reel 14 such that a leading edge from "Low" to "High" as index (original point) 1 and a falling edge from "High" to "Low" as index (original point) 2.

After transmitting a start signal to the sub CPU 61 in step S40, the main CPU 41 executes effects in rotation of the reels (step S41). This is the processing for displaying an image to the lower image display panel 16, outputting sound from the speaker 29, and the like, during a period (e.g. 3 seconds) set according to a result of the to-be-stopped symbol determination processing (FIG. 15, step S207) or the like.

Next, the main CPU 41 determines whether or not the current time point is the timing for instructing to stop rotation of the reels 14 (step S42).

Here, the timing for instructing to stop rotation of the reels 14 is the timing before the time point of stopping the performance of effects in rotation of the reels only by the minimum time required for stopping rotation of the reels 14. It is to be noted that the minimum time required for stopping rotation of the reels 14 is previously set.

In step S42, when determining that the current time point is not the timing for instructing to stop rotation of the reels 14, the main CPU 41 returns the processing to step S42, and continuously executes the performance of effects in rotation of the reels. On the other hand, when determining that the current time point is the timing for instructing to stop rotation of the reels 14 in step S42, the main CPU 41 transmits code No. stored in the RAM 43 to the sub CPU 61 (step S43). Upon receipt of code No. of the reels from the main CPU 41, the sub CPU 61 converts code No. into the stop position (the number of steps) of each reel from the index, based on the correspondence table of the number of steps stored in ROM (not shown) comprised in CPU 61 and code No. (step S52).

FIG. 25 is a schematic view showing a correspondence table of the number of steps and code No. Each code No. is corresponded to index and the number of steps.

It should be noted that each code No. corresponds to a symbol drawn on the peripheral face of the reel 14. Symbols of code No. "00" to "10" correspond to index 1. Symbols of code No. "11" to "21" correspond to index 2. Further, the numbers of steps in the correspondence table shown in FIG. 25 are the numbers of steps set with index 1 as a reference. For example, when code No. is "08", a position 145 steps from index 1 is the stop position of the reel. Further, when code No. is "12", a position 218 steps from index 1 is the stop position of the reel.

Next, the sub CPU 61 executes a reel stoppage processing (step S53). In this processing, the sub CPU 61 detects the leading edge (index 1) from "Low" to "High" of each reel 14 in the index detecting circuit 65, and supplies the index detecting circuit 65 with pulses corresponding to the number of steps into which code No. has been converted in step S52, at the timing of detecting index 1, and thereafter, the supply of the pulse is stopped.

For example, when it is determined that the stop position of the reel is a position 145 steps from index 1 in step S52, the sub CPU 61 supplies the index detecting circuit 65 with 145 pulses at the timing of detecting index 1, and then stops the supply of the pulse. Further, in step S52, when it is determined that the stop position of the reel is a position 218 steps from index 1, the sub CPU 61 supplies the index detecting circuit 65 with 218 pulses at the timing of detecting index 1. As a result, the reels 14 stop with the code numbers as determined in step S32 in FIG. 22, and a combination of symbols corresponding to the winning combination determined in step S32 in FIG. 22 is stop-displayed along the pay line L. Meanwhile, the main CPU 41 ends the performance of effects in rotation of the reels. After completing the processing of steps S44 and S53, the present processing is terminated.

It is to be noted that, when index corresponding to code No. transmitted in step S43 differs from index detected by the index detecting circuit 65 in stopping rotation of the reels 14, a loss of synchronism has occurred in the reels 14, and therefore, the main CPU 41 conducts processing for displaying an error message to the lower image display panel 16, or the like, to discontinue the game.

For example, when the index 1 is detected by the index detecting circuit 65 in stopping rotation of the reels 14 although the main CPU 41 conducts the processing for stopping reels 14 at code No. 12 which is corresponding to index 2, the game is discontinued.

The slot machine 10 according to the present embodiment is a stand-alone type slot machine counting the number of games. However, in the present invention, the gaming machine is not necessarily a stand-alone type gaming machine, and a server connected to a plurality of gaming machines via a network may count the number of games played in each gaming machine.

Figure 26:
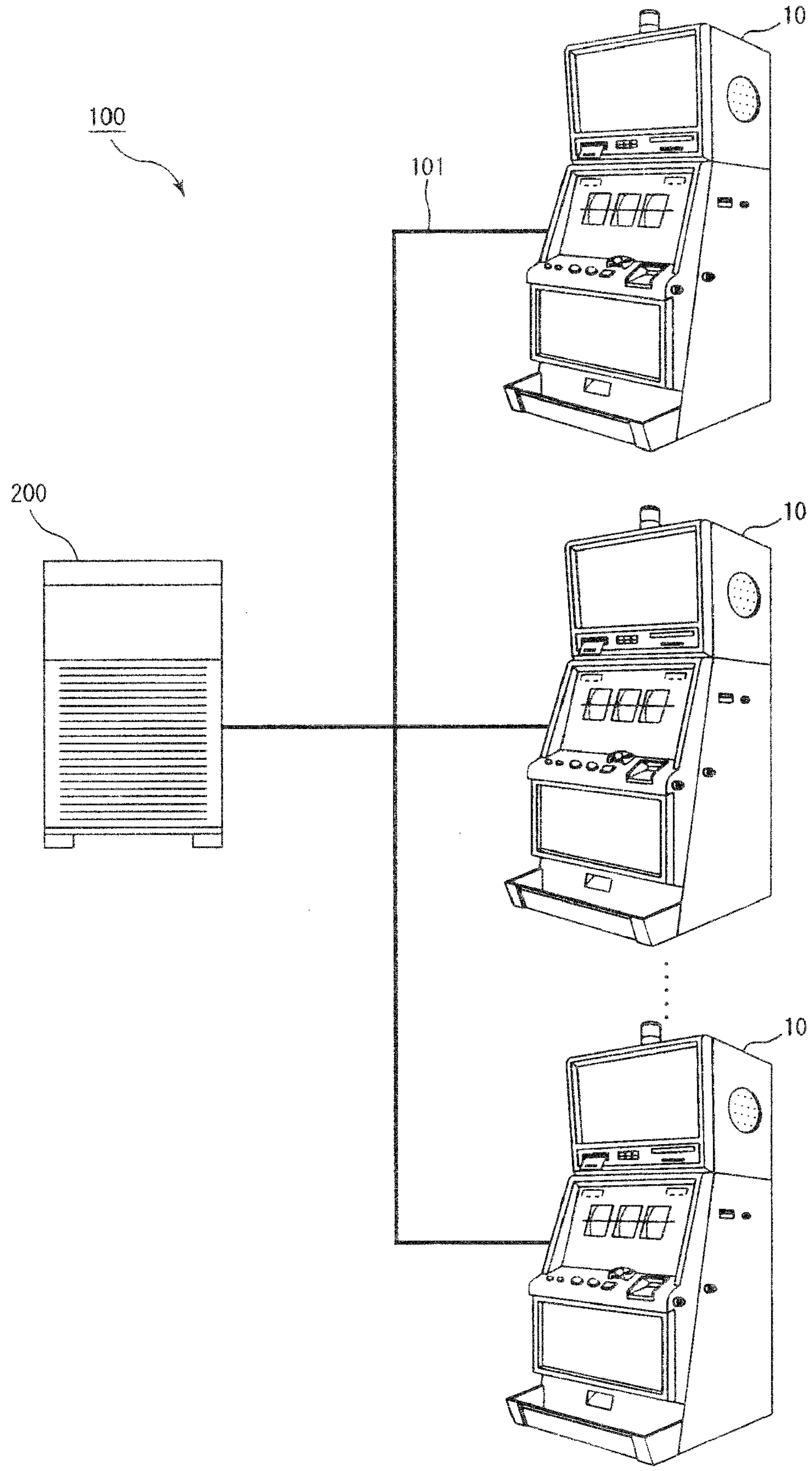
FIG. 26 is a schematic view showing an entire configuration of a game system according to one embodiment of the present invention.

FIG. 26 is a schematic view showing an entire configuration of a game system according to one embodiment of the present invention.

A game system 100 comprises a plurality of slot machines 10 and a server 200 connected with these slot machines 10 via a predetermined communication line 101. Such a game system 100 may be constructed inside one recreation facility where a variety of games can be played, such as a bar or a casino, or constructed among a plurality of recreation facilities. In the case of constructing the game system inside one recreation facility, the game system 100 may be constructed on each floor or in each section of the recreation facility. The communication line 101 is not particularly limited, and may be either wired or wireless, and an exclusive line, an exchange line or the like can be adopted.

The server 200 controls a plurality of slot machines 10. In the present embodiment, in particular, the server 200 conducts the processing for counting the number of games played in each slot machine 10. Further, the server 200 conducts processing for accumulatively adding fractional values generated in games in the respective slot machines 10. Further, the server 200 conducts processing for counting the number of games which have resulted in a fractional value in each of the slot machines 10. The server 200 may have a function as a so-called hall server which is installed in a recreation facility having a plurality of slot machines 10, a server to control a plurality of recreation facilities in block, or the like. It is to be noted that each slot machine 10 is provided with a unique identification number, and the server 200 determines from which slot machine data is transmitted according to the identification number. Also when data is transmitted from the server 200 to the slot machine 10, the server 200 specifies to which slot machine the data will be transmitted, by using the identification number.

As described above, in the case of employing slot machines connected to a network as a gaming machine according to the present invention, the server may be configured to accumulatively add the total sum of fractional values generated in the plurality of slot machines and accumulatively add the total sum of the numbers of games which have resulted in a fractional value in the plurality of slot machines.

In the above-mentioned example, the case of using mechanical reels 14 has been described. However, in the present invention, symbols may be displayed to a display device such as a liquid crystal display device in place of the mechanical reels.

In the aforementioned embodiment, there has been described the case where the mode is shifted to the insurance mode from the non-insurance mode when a predetermined condition relating to fractional values is satisfied (when the accumulative fractional value reaches the predetermined value or when the accumulative number of games which have resulted in fractional values reaches the predetermined number) Further, the fractional value, which is related to the condition required for shifting the mode to the insurance mode from the non-insurance mode, is determined on the basis of the amount of the expected payout, namely a value relating to the payout. However, in the present invention, the value related to the condition required for shifting the mode to the insurance mode from the non-insurance mode is not limited to the case.

Hereinafter, there will be described a case where the value related to the condition required for shifting the mode to the insurance mode from the non-insurance mode is determined on the basis of a value relating to BETs. In this case, this value will be referred to as a BET fractional value.

A slot machine which will be described hereinafter is the same as the slot machine according to the aforementioned embodiment, except that a BET fractional value is used in addition to the fractional value described in the aforementioned embodiment as the values relating to the condition required for shifting the mode to the insurance mode from the non-insurance mode and also, a BET can be placed on the respective pay lines L. Namely, the slot machine which will be described hereinafter has substantially the same external appearance, the same circuit configuration and the like as those of the slot machine 10 described in the aforementioned embodiment and also executes substantially the same flowcharts. Accordingly, hereinafter, there will be described only the parts different from those in the aforementioned embodiment, namely only the parts relating to the BET fractional value and the parts relating to the BET methods. Further, the components corresponding to those of the slot machine 10 will be designated by the same reference characters, in the following description.

Hereinafter, there will be described the BET method and the BET fractional value according to another embodiment.

In the slot machine according to the present embodiment, a BET unit (1 BET=1 credit=0.5 dollar, in the present embodiment) is preliminarily defined for each pay line L. A MAXBET is 3 BETs. A player can input an arbitrary number of BETs, out of 1 BET, 2 BETs and 3 BETs, for each pay line L. The BET unit defined on the respective pay line correspondents to a BET object BET unit according to the present invention.

When credits are BET on a single or a plurality of pay lines L, the decimal fraction part of the total value of BETTING for a single game is a BET fractional value. For example, when 50 cents (0.5 dollar), which is 1 BET unit, is BET on three pay lines L, the total value of BETTING is 1.50 dollar so that 0.50, which is the part thereof not more than 1 dollar, is a BET fractional value. Also, in another example, the BET fractional value is determined as follows. For example, when the player places 1 BET on each of the 5 pay lines L, the total value of BETTING is 0.5 dollar×1 BET×5 lines=2.5 dollars. In this case, the decimal fraction part of the BET fractional value is 0.5 dollar, since the total value of BETTING is 2.5 dollars. Further, when the player places 2 BETs on each pay line, the total value of BETs is 0.5 dollars×2 BETs×5 lines=5 dollars. In this case, the BET fractional value is 5.0 dollars−5.0 dollars=0 dollar, thereby resulting in no fractional value. Further, when the player places a MAXBET (3 BETs) on each pay line L, the total value of BETs is 0.5 dollars 3 BETs×5 lines=7.5 dollars. In this case, the BET fractional value is 7.5−7.0=0.5 dollar.

Hereinafter, with reference to FIGS. 27A and 27B, there will be described a case where the mode is shifted to the insurance mode from the non-insurance mode according to another embodiment.

Figure 27A:
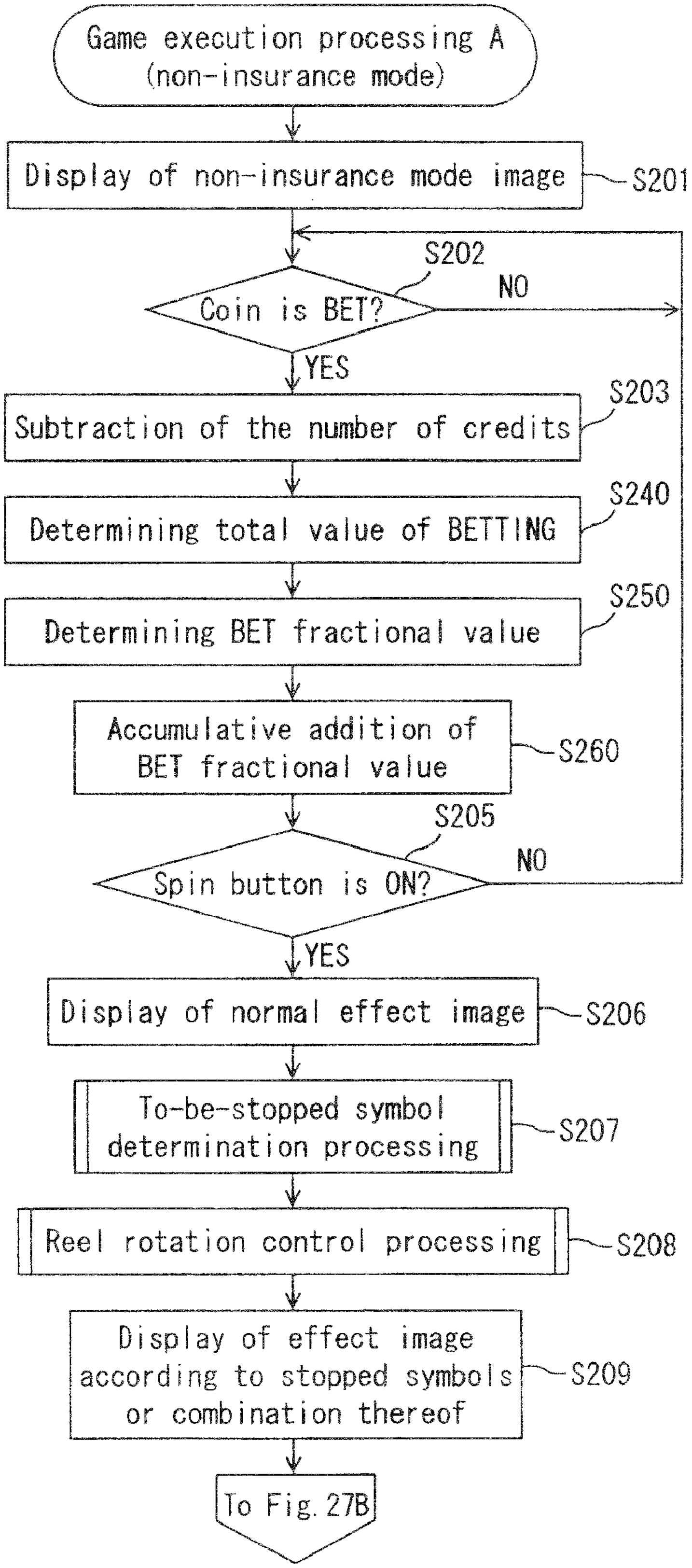
FIGS. 27A and 27B are flowcharts showing a subroutine of game execution processing A (non-insurance mode) according to another embodiment.
Figure 27B:
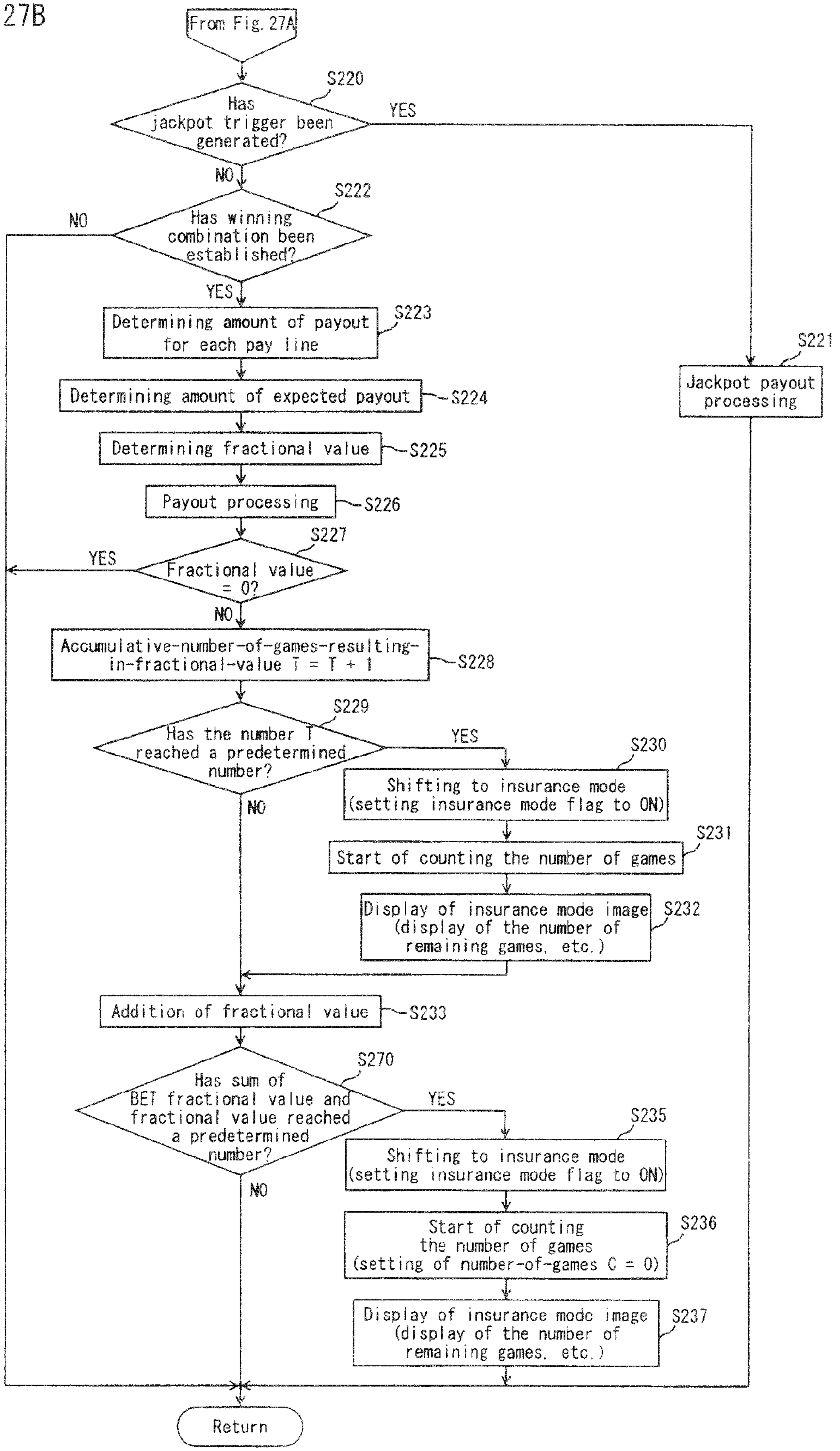

FIGS. 27A and 27B are flowcharts showing the subroutine of game execution processing A (the non-insurance mode) according to another embodiment.

Hereinafter, there will be described only steps S240, S250, S260 and S270, while the other steps will not be described since they are the same as those described in the aforementioned embodiment.

In step S240, the main CPU 41 sums up the respective amounts of BETTING on the respective pay lines L to determine the total amount of BETTING.

Next, in step S250, the main CPU 41 determines the BET fractional value.

As described above, the decimal fraction part of the total value of BETTING for a single game is the BET fractional value. Namely, in the present embodiment, the fractional value which is less than 1 dollar is determined as a BET fractional value, using a currency unit of dollar. As a matter of cause, the aforementioned idea can be applied to other currencies such as Euro, Yen, Won and Rub, and the BET fractional value may be determined through calculation processing by defining the part which is equal to or less than a certain digit place in dollar and the like, as a fractional value. In the case of defining the part equal to or less than 100 dollar as a fractional value and 1 BET unit is defined as 50 dollars, when 50 dollars are BET on three pay lines, the total amount of BETs is 150 dollars and, therefore, the BET fractional value is 50 dollars. As described above, the main CPU 41 determines the decimal fraction part of the total value of BETTING determined in step S240, as a BET fractional value.

Next, in step S260, the main CPU 41 conducts processing for adding the BET fractional value determined in step S250 to the accumulative fractional value stored in the RAM 43. In the present embodiment, the accumulative fractional value is the sum of accumulatively-added BET fractional values and accumulatively-added fractional values.

In step S270, the main CPU 41 determines whether or not the sum of accumulatively-added BET fractional values and accumulatively-added fractional values (the accumulative fractional value) has reached a predetermined value (10 credits, for example). When the main CPU 41 determines that the accumulative fractional value has reached the predetermined value, the main CPU 41 shifts the processing to step S235. On the other hand, when the main CPU 41 determines that the accumulative fractional value has not reached the predetermined value, the main CPU 41 ends the present subroutine.

As described above, in the present embodiment, the sum of BET fractional values and fractional values are accumulatively added, as an accumulative fractional value. Further, the accumulative fractional value is related to the condition required for shifting the mode to the insurance mode from the non-insurance mode. However, in the present invention, the condition required for shifting the mode to the insurance mode from the non-insurance mode is not limited to the case. For example, the total sum of BET fractional values may be stored separately from the total sum of fractional values and, when the total sum of BET fractional values reaches a predetermined value, the mode may be shifted to the insurance mode from the non-insurance mode. In the case of employing the aforementioned configuration, a condition relating to fractional values may be employed or not be employed as a condition required for shifting the mode to the insurance mode from the non-insurance mode.

Further, in the present embodiment, the player is allowed to input numbers of BETs for the respective pay lines L. Further, calculation processing is conducted for summing up the values of BETTING placed on a single or a plurality of pay lines L to determine the total value of BETTING, and the value of the part of the total value of BETTING determined by summing up which is not more than a predetermined place (the value less than 1 dollar, in the present embodiment) is accumulatively stored as an insurance BET. Further, when the number of games which has been accumulatively added in the insurance mode reaches a predetermined number, then processing relating to bonus games is executed in association with the value which has been accumulatively stored as the insurance BET. Namely, the BET fractional value is treated as an insurance BET.

Further, processing for shifting the mode to the insurance mode from the non-insurance mode may be conducted, every time the BET fractional value is generated. In the case of treating the BET fractional value as an insurance BET, since the player can not take out insurance consciously, the insurance mode may be set on a full-time basis.

Further, the calculation processing for the BET fractional value can be properly changed as required, such that, in a case where a constant value of BETs is placed on some lines, as another aspect of BETs, the constant value may be divided by the number of pay lines BET thereon, and the part of the resultant quotient which is equal to or less than one credit may be treated as a BET fractional value. The gaming machine according to the present invention can properly adopt a configuration that, for example, a part of the total sum of BETTING placed by the player is subjected to some sort of calculation processing for calculating a BET fractional value and a part of a resulting BET fractional value is accumulatively stored as an insurance BET. Further, the gaming machine according to the present invention can properly adopt a configuration that, for example, bonus games are executed based on the value of the accumulatively-stored insurance BET on condition that the predetermined trigger condition is satisfied, the predetermined trigger condition being that, for example, the accumulative number of games reach a predetermined number.

Further, the foregoing detailed descriptions centered the characteristic parts of the present invention in order to facilitate understanding of the present invention. The present invention is not limited to the embodiments in the foregoing specific descriptions but applicable to other embodiments with a variety of application ranges. Further, terms and phrases in the present specification were used not for restricting interpretation of the present invention but for precisely describing the present invention. It is considered easy for the skilled in the art to conceive other configurations, systems, methods and the like included in the concept of the present invention from the concept of the invention described in the specification. Therefore, it should be considered that recitations of the claims include uniform configurations in a range not departing from the range of technical principles of the present invention. Moreover, an object of the abstract is to enable a patent office, a general public institution, an engineer belonging to the technical field who is unfamiliar with patent, technical jargon or legal jargon, and the like, to smoothly determine technical contents and an essence of the present application with simple investigation. Accordingly, the abstract is not intended to restrict the scope of the invention which should be evaluated by recitations of the claims. Furthermore, for thorough understanding of an object of the present invention and an effect specific to the present invention, it is desired to make interpretation in full consideration of documents already disclosed and the like.

The foregoing detailed descriptions include processing executed on a computer or a computer network. Explanations and expressions above are described with the aim of being most efficiently understood by the skilled person in the art. In the specification, each step for use in deriving one result should be understood as the self-consistent processing. Further, in each step, transmission/reception, recording or the like of an electrical or magnetic signal is performed. While such a signal is expressed by using a bit, a value, a symbol, a letter, a term, a number or the like in processing of each step, it should be noted that those are used simply for the sake of convenience in description. While there are cases where processing in each step may be described using an expression in common with that of action of a human, processing described in the specification is essentially executed by a variety of devices. Further, another configuration requested for performing each step becomes apparent from the above descriptions.

Although the embodiments of the present invention were described above, they were just illustrations of specific examples, and hence do not particularly restrict the present invention. A specific configuration of each step and the like is appropriately changeable in terms of design. Further, the effects described in the embodiments of the present invention are just recitations of the most suitable effects generated from the present invention. The effects of the present invention are thus not limited to those described in the embodiments of the present invention.

What is claimed as new and desired to be secured by Letters Patent of the United States is:

1. A gaming machine comprising:

a controller programmed to conduct processing of;

(A) determining, when game media in number corresponding to a natural-number multiple of a predetermined minimum BET unit are BET on a plurality of BET objects of which game results are determined independently of each other, a value of BETTING on each of said BET objects based on the amount of game media BET and the number of said BET objects, and said game results of said respective BET objects, determining an amount of a payout for each of the BET objects on the basis of said value of BETTING and said game result thereof, and determining an amount of an expected payout for a single unit game by summing up the amounts of the payouts;

(B) determining a fractional value obtained by division of the amount of the expected payout for the single unit game determined in said processing (A) by said predetermined minimum BET unit;

(C) paying out, to a player, an amount determined by subtraction of the fractional value determined in said processing (B) from the amount of the expected payout for the single unit game determined in said processing (A), as an amount of a payout for the single unit game;

(D) accumulatively adding the fractional value determined in said processing (B);

(E) shifting a mode to an insurance mode from a non-insurance mode, on condition that the fractional value accumulatively added in said processing (D) or the number of unit games in which the fractional value is accumulatively added in said processing (D) has reached a predetermined value; and (F) executing a bonus game which is relatively advantageous for the player, when a predetermined trigger condition is established in said insurance mode.

2. The gaming machine according to claim 1, wherein said controller is further programmed to conduct processing of (G) counting, in said insurance mode, the number of unit games executed after shifting the mode to said insurance mode, and said processing (F) is processing for executing said bonus game, when the number of unit games counted in said processing (G) reaches a specific number.

3. The gaming machine according to claim 1, wherein said controller is further programmed to conduct processing of (G) counting, in said insurance mode, the number of unit games played with BETs by game media in number equal to a maximum number of BETs, after shifting the mode to said insurance mode, and said processing (F) is processing for executing said bonus game, when the number of unit games counted in said processing (G) reaches the specific number.

4. The gaming machine according to any one of claims 1 to 3, wherein said controller is further programmed to conduct processing of paying out, to the player, game media in number corresponding to the fractional value accumulatively added in said processing (D), during said bonus game.

5. A game control method executed by one or more processors, the method comprising the steps of:

with the one or more processors:

(A) determining, when game media in number corresponding to a natural-number multiple of a predetermined minimum BET unit are BET on a plurality of BET objects of which game results are determined independently of each other, a value of BETTING on each of said BET objects based on the amount of game media BET and the number of said BET objects, and said game results of said respective BET objects, determining an amount of a payout for each of the BET objects on the basis of said value of BETTING and said game result thereof, and determining an amount of an expected payout for a single unit game by summing up the amounts of the payouts;

(B) determining a fractional value obtained by division of the amount of the expected payout for the single unit game determined in said step (A) by said predetermined minimum BET unit;

(C) paying out, to a player, an amount determined by subtraction of the fractional value determined in said step (B) from the amount of the expected payout for the single unit game determined in said step (A), as an amount of a payout for the single unit game;

(D) accumulatively adding the fractional value determined in said step (B);

(E) shifting a mode to an insurance mode from a non-insurance mode, on condition that the fractional value accumulatively added in said step (D) or the number of unit games in which the fractional value is accumulatively added in said step (D) has reached a predetermined value; and (F) executing a bonus game which is relatively advantageous for the player, when a predetermined trigger condition is established in said insurance mode.

* * * * *